US006532053B2

(12) United States Patent
Ohta et al.

(10) Patent No.: US 6,532,053 B2
(45) Date of Patent: *Mar. 11, 2003

(54) TRANSVERSE ELECTRIC FIELD SYSTEM LIQUID CRYSTAL DISPLAY DEVICE SUITABLE FOR IMPROVING APERTURE RATIO

(75) Inventors: Masuyuki Ohta, Mobara (JP);
Kazuhiro Ogawa, Mobara (JP);
Keiichiro Ashizawa, Mobara (JP);
Kazuhiko Yanagawa, Mobara (JP);
Masahiro Yanai, Mobara (JP);
Nobutake Konishi, Mobara (JP);
Nobuyuki Suzuki, Mobara (JP);
Masahiro Ishii, Mobara (JP); Makoto Yoneya, Hitachinaka (JP); Sukekazu Aratani, Hitachiohta (JP)

(73) Assignee: Hitachi, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/331,266

(22) PCT Filed: Dec. 18, 1996

(86) PCT No.: PCT/JP96/03691

§ 371 (c)(1),
(2), (4) Date: Jun. 18, 1999

(87) PCT Pub. No.: WO98/27454

PCT Pub. Date: Jun. 25, 1998

(65) Prior Publication Data

US 2001/0015783 A1 Aug. 23, 2001

(51) Int. Cl.[7] ............................................. G02F 1/1343

(52) U.S. Cl. ....................................... 349/141; 349/143
(58) Field of Search .................................. 349/141, 143

(56) References Cited

U.S. PATENT DOCUMENTS

| 4,345,249 | A | * | 8/1982 | Togashi | 349/103 |
|---|---|---|---|---|---|
| 5,841,499 | A | * | 11/1998 | Bauer et al. | 349/141 |
| 5,886,762 | A | * | 3/1999 | Lee et al. | 349/141 |
| 6,014,190 | A | * | 1/2000 | Kim et al. | 349/141 |
| 6,160,600 | A | * | 12/2000 | Yamazaki et al. | 349/138 |

* cited by examiner

Primary Examiner—William L. Sikes
Assistant Examiner—Dung Nguyen
(74) Attorney, Agent, or Firm—Antonelli, Terry, Stout & Kraus, LLP

(57) ABSTRACT

An active matrix type liquid crystal display device capable of accomplishing an angle of visual field equal to that of a CRT and controlling the display by an electric field substantially parallel to a substrate surface provides bright display and requires lower power consumption. Pixel electrodes and opposed electrode capable of applying an electric field substantially parallel to a substrate surface is constituted, the pixel electrodes or the opposed electrodes are constituted by transparent electrodes, and the orientation state of a liquid crystal and the axis of polarization of a polarizer are constituted so that dark display is effected at the time when no field is applied. In this way, there can be provided a transverse field system active matrix type liquid crystal display device having a wide visual field angle characteristics, excellent contrast ratio and aperture ratio and capable of improving maximum transmissivity.

1 Claim, 44 Drawing Sheets

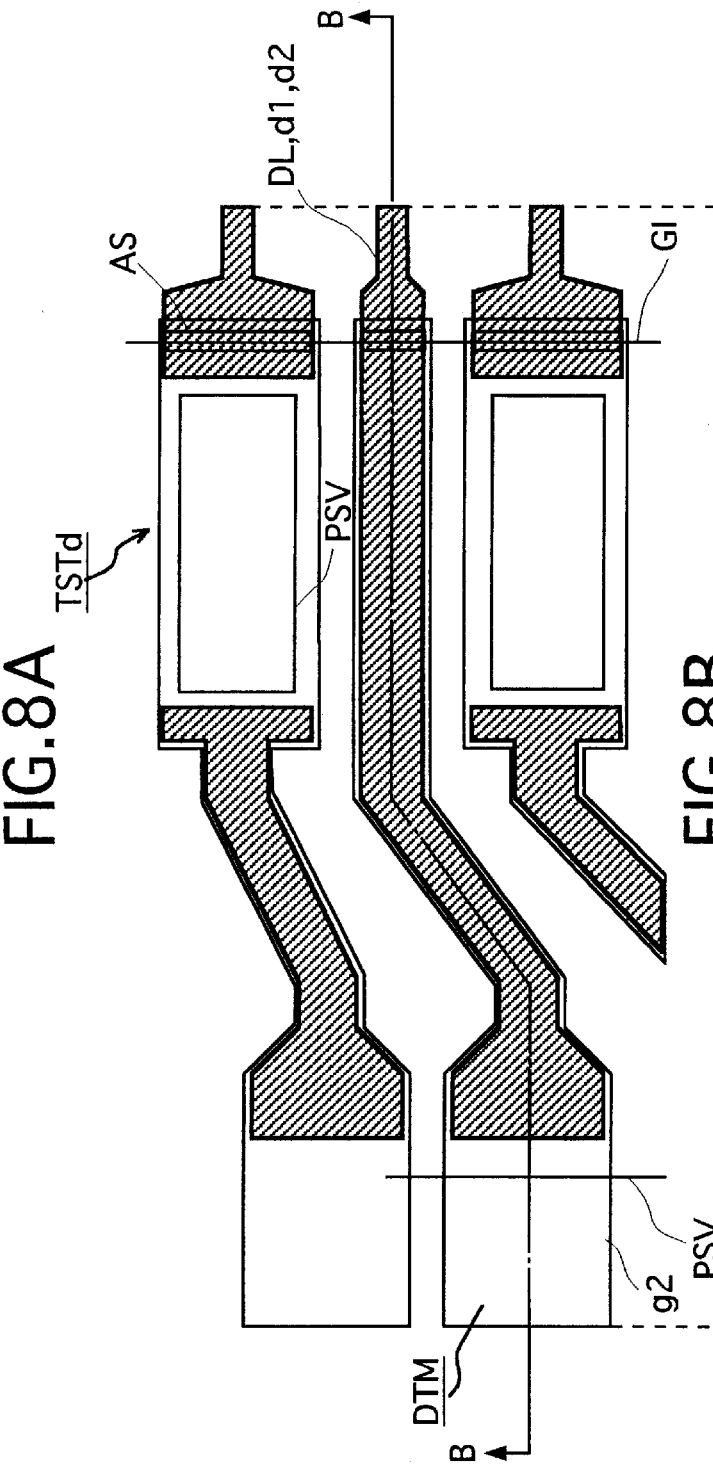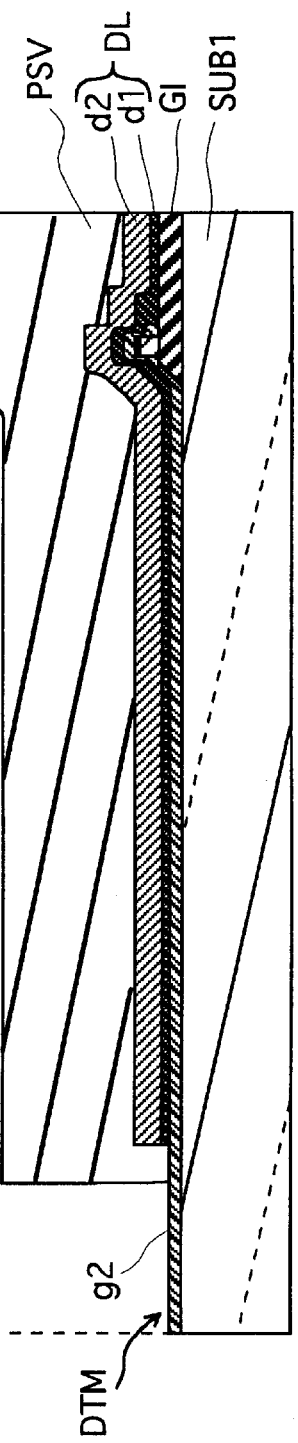

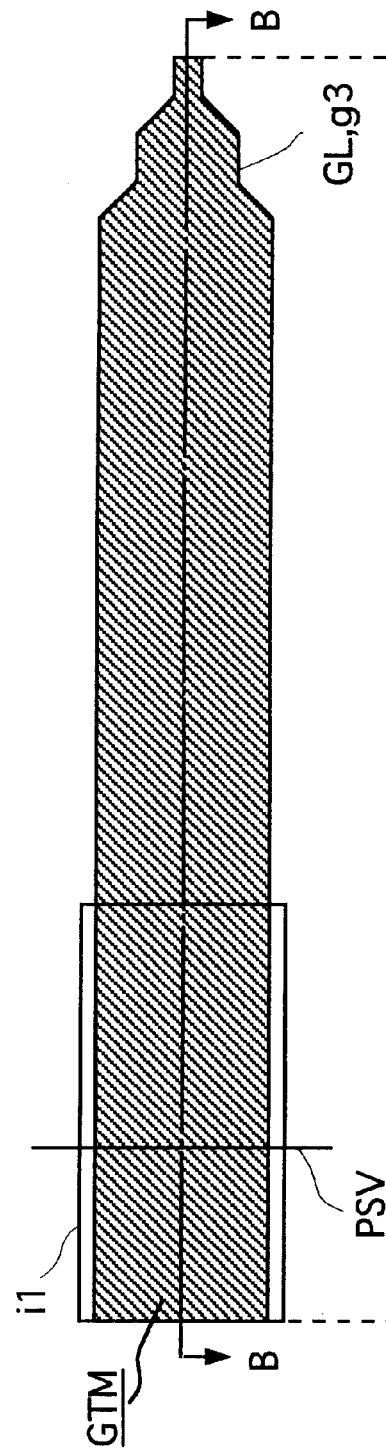
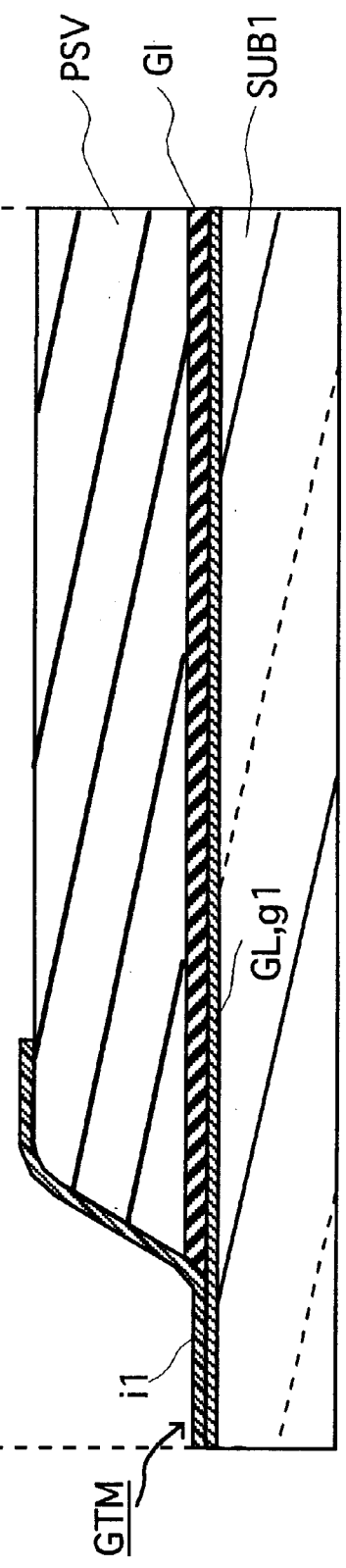
FIG.29A
FIG.29B

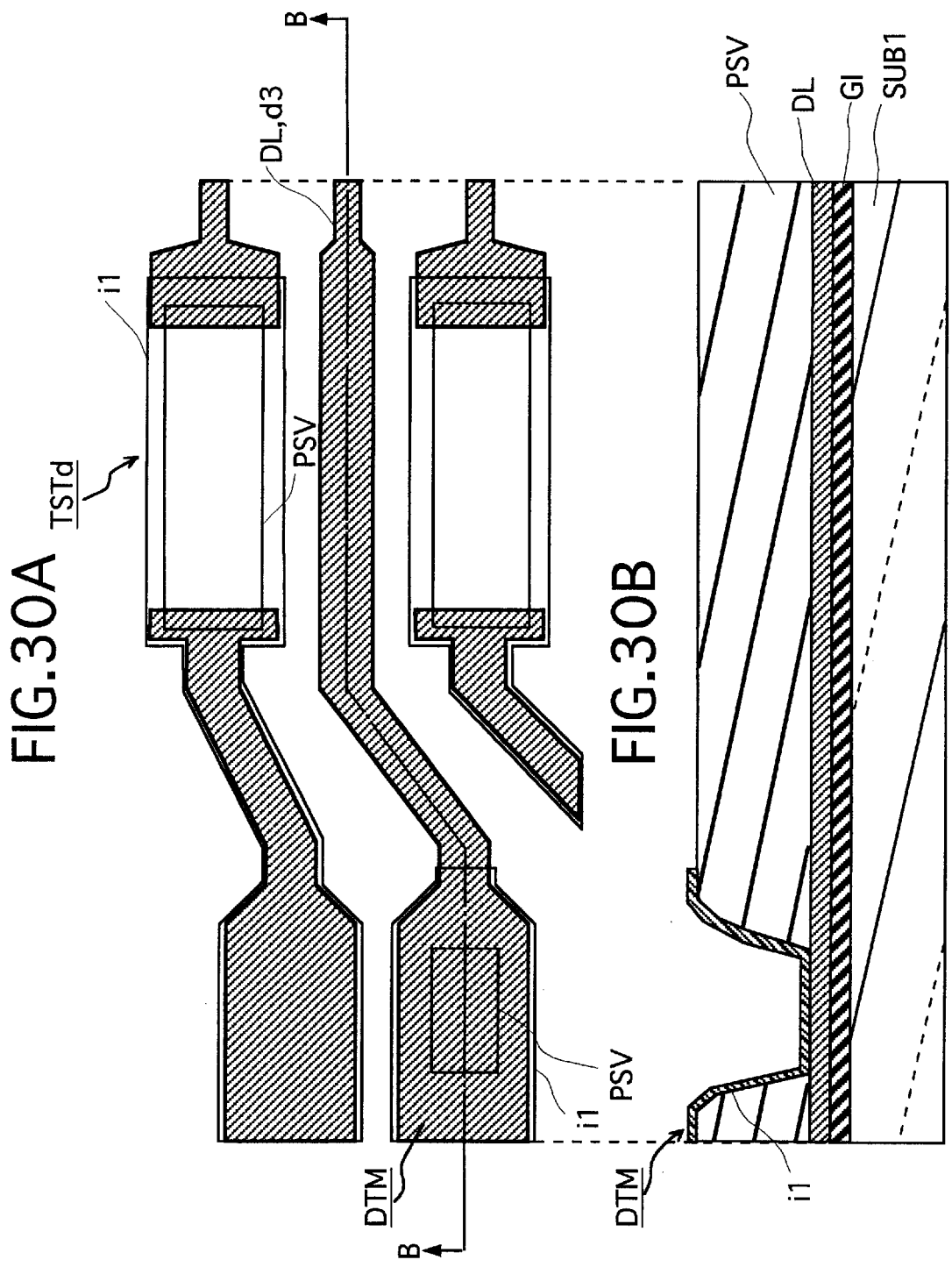

equipotential currve distance($\mu$m) from substrate surface to vertical direction of substrate surface tilt angle of LC moleculars

TRANSVERSE ELECTRIC FIELD SYSTEM LIQUID CRYSTAL DISPLAY DEVICE SUITABLE FOR IMPROVING APERTURE RATIO

BACKGROUND OF THE INVENTION

The present invention relates generally to active-matrix liquid crystal display devices and, more particularly, to liquid crystal display devices of the lateral electric field type having wide view-angle characteristics suitable for improvement of the aperture ratio.

Liquid crystal display devices of the active matrix type, which employ active elements typically, including thin-film transistors (TFTS), are becoming more important in the manufacture of display terminals for use with OA equipment in view of the fact that these devices offer enhanced displayability with superior image quality in comparison to cathode ray tubes, not to mention the flatness and lightweight features thereof. Such liquid crystal display devices are generally categorized into two types.

In one type, a liquid crystal material is sandwiched between two substrates, with a plurality of transparent electrodes being arranged thereon, so that application of a voltage to such transparent electrode causes an electric field to be generated transverse to the substrate, thereby modulating rays of light falling onto the liquid crystal after passing through the transparent electrodes, to thereby generate a display—all of the currently available products are designed to employ this scheme.

The other type of device was a scheme for causing the liquid crystal to be modulated by an electric field that is generated substantially in parallel to a substrate surface between two electrodes arranged on the same substrate, thereby modulating light incident on the liquid crystal from a space between the two electrodes, to thereby generate a display in which the viewing angle is extremely wide. This technology, which shows great promise for improvements in active-matrix liquid crystal display devices, is called a "lateral electric field" type or, alternatively, an "in-plane switching" type device.

Some features of the latter type of device have been disclosed in Domestically Published Japanese PCT Application No. 5-505247 Published Japanese Patent Application No. 63-21907 (JP-A-63-21907), and JP-A-6-160878.

However, in the in-plane switching type device, since an opaque metal electrode is arranged into a comb-like shape on one substrate, the resulting ratio of the opening region permitting light to pass therethrough (aperture ratio) is significantly low, which results in the problem that active-matrix liquid crystal display devices of the in-plane switching type have a display screen which is dark, or, alternatively, a bright backlight with great power dissipation must be used in order to brighten the display screen, resulting in an increase in the power dissipation of the devices.

Another problem associated with the in-plane switching type device is that the use of a metal electrode leads to an increase the reflectivity at the electrode, which in turn creates a problem in that an image or the like appears like a ghost image on the screen due to reflection at the electrode, reducing the recognizability of the display.

SUMMARY OF THE INVENTION

The present invention is designed to solve the problems mentioned above, and an objective of the present invention is to provide an active-matrix liquid crystal display device employing the in-plane switching scheme, which device is capable of realizing a viewing angle equivalent to that of cathode ray tubes, and wherein the active-matrix liquid crystal display device is bright due to a high aperture ratio and yet is low in power dissipation and in reflection for achieving increased displayability.

To attain the foregoing object, the present invention offers, as its first aspect, an arrangement in which at least one of a pixel electrode and a counter electrode is provided as a transparent electrode; the normally-black mode is established for providing dark display in the absence of an electric field as applied thereto; the initial alignment state of the twistable liquid crystal layer is the homogeneous alignment state upon application of no electric fields; liquid crystal molecules between said electrodes and those on the electrodes upon application of an electric field rotate controllably in a direction substantially parallel to the substrate surface; the maximum value of the optical transmissivity of a liquid crystal display panel is 4.0% or greater; and, the view-angle range of the contrast ratio of 10 to 1 or greater is within the range of all-directional coverage as tilted by 40 degrees or more from the vertical direction relative to the display plane.

As a second aspect of the invention, at least one of the pixel electrode and counter electrode is provided as a transparent electrode, the normally-black mode is set for providing dark display upon application of no electric fields, the initial alignment state of the twistable liquid crystal layer is the homogeneous state upon application of no electric fields, and the twist elastic modulus is not greater than $10 \times 10^{-12}$ N (Newton).

As a third aspect of the invention, at least one of the pixel electrode and counter electrode is provided as a transparent electrode, the normally-black mode is set for providing dark display upon application of no electric fields, the initial alignment state of the twistable liquid crystal layer is the homogeneous state upon application of no electric fields, the initial pretilt angle of those liquid crystal molecules at the upper and lower interfaces of the liquid crystal layer is not more than 10 degrees, and the initial tilt state of liquid crystal molecules within the liquid crystal layer are in the splay state.

As a fourth aspect of the invention, at least one of the pixel electrode and counter electrode is provided as a transparent electrode, the normally black mode is set for providing dark display upon application of no electric fields, the initial alignment state of the twistable liquid crystal layer is the homogeneous state upon application of no electric fields, and the average tilt angle of liquid crystal molecules of the liquid crystal layer on the transparent electrode is less than 45 degrees even when applying an electric field thereto.

As a fifth aspect of the invention, in any one of the arrangements described above, a double structure of a transparent electrode and an opaque electrode is employed for at least either the pixel electrode or the counter electrode.

As a sixth aspect of the invention, in any one of the arrangements described above, a structure is used in which neighboring ones of contra-voltage signal lines are connected by a counter electrode within a pixel via more than one through-hole.

As a seventh aspect of the invention, in any one of the arrangements described above, a protective film is provided for use in covering or coating active matrix elements, and at least one of said pixel electrode or said counter electrode is formed overlying said protective film while permitting electrical connection via more than one through-hole as formed in said protective film to either active matrix elements or contra-voltage signal lines.

As an eighth aspect of the present invention, in any one of the arrangements described above, the counter electrode is made of a transparent electrode, and further use is made of a structure having an optical shield pattern between a counter electrode and an image signal line.

As a ninth aspect of the invention, in any one of the arrangements described above, the contra-voltage signal line for electrical connection between counter electrodes is made of a metal.

As a tenth aspect of the invention, in any one of the arrangements described above, more than three counter electrodes are formed, two of which are formed adjacent to image signal lines, wherein the counter electrodes formed adjacent to the image signal lines are opaque.

As an eleventh aspect of the invention, in any one of the arrangements described above, a transparent conductive film for use as the transparent electrode is made of indium-tin-oxide (ITO).

As a twelfth aspect of the invention, the contra-voltage signal line is made of Cr, Ta, Ti, Mo, W, Al, or an alloy thereof, or, alternatively, a clad structure with such materials laminated.

As a thirteenth aspect of the invention, the contra-voltage signal line is a clad structure with a transparent conductive film such as indium-tin-oxide (ITO) or the like being laminated on Cr, Ta, Ti, Mo, W, Al, or an alloy thereof.

As a fourteenth aspect of the invention, in any one of the arrangements described above, the initial twist angle of said liquid crystal layer is substantially zero, wherein the initial alignment angle is greater than or equal to 45 degrees and yet less than 90 degrees when the dielectric anisotropy $\Delta\in$ of the liquid crystal material is positive in polarity, whereas it goes beyond zero degree and stays less than 45 degrees if the dielectric anisotropy $\Delta\in$ is negative.

As a first manufacturing method, the invention is featured by forming at least any one of a scan signal line end section, an image signal line end section or the uppermost layer of a counter electrode end section and at least one of a pixel electrode or counter electrode as a transparent conductive layer, and further by forming them in the same process step.

An example of the features of the present invention will be set forth below.

First of all, according to the first aspect of the invention, at least one of the pixel electrode or its counter electrode is made transparent to increase the light penetrating such portion, thereby to effect improvement of the maximum optical permeability or transmissivity during bright (white) display and make it possible to produce a brighter display than in cases where the electrodes are opaque so that the liquid crystal display panel's transmissivity can be improved in the value of the maximum transmissivity from 3.0 to 3.8%, in the case of employing opaque electrodes, to up to 4.0% or greater in accordance with the present invention. More specifically, assuming that the brightness or luminance of backlight incident light is at 3,000 cd/m$^2$ the maximum brightness value of bright-display luminance can attain 120 cd/m$^2$ or greater.

Further, as the liquid crystal molecules retain their initial homogeneous alignment state upon application of no voltages, when the layout of polarizer plates is designed to establish dark (black) display in such state (in normally-black mode), no rays of light pass through such portion even where the electrodes are made transparent, thereby making it possible to achieve a dark display of good quality, thus improving the contrast.

On the contrary, if the normally-white mode is set then dark displaying must be carried out upon application of a voltage, which results in an inability to completely block the light at portions overlying the electrodes upon application of a voltage, which in turn makes it impossible to provide a dark display with good quality due to the fact that the transmitted light at such portions increases the transmissivity of the dark display. For this reason, a sufficient contrast ratio cannot be attained.

Furthermore, wide viewing angle characteristics can be obtained because those liquid crystal display molecules between said electrodes and over the electrodes upon application of a voltage thereto behave to controllably rotate in a direction parallel to the substrate surfaces.

Accordingly, wide view-angle characteristics can be obtained in which the view-angle range of contrast ratios of 10 to 1 or more falls within an all-directional range with an inclination of 40 degrees or greater from the vertical direction with respect to the display plane.

According to the second aspect of the invention, the twist elastic modulus of a twistable liquid crystal layer is less than or equal to $10\times10^{-12}$ N (Newton) when applying a voltage between the pixel electrode and counter electrode, the angle α of rotation from the initial alignment direction increases on or over a transparent conductive film to allow the on-electrode transmissivity to complementally interact with the transmissivity between electrodes to substantially improve the aperture ratio. It is preferable that this twist elastic modulus K2 be smaller.

According to the third aspect of the invention, in view of the fact that the initial pretilt angle of liquid crystal molecules at the upper and lower interfaces of a liquid crystal layer is less than or equal to 10 degrees, while the initial tilt state of liquid crystal molecules inside of the liquid crystal layer is in a splay state, the tilt angle of liquid crystal molecules at the center of the liquid crystal layer becomes nearly zero degrees to thereby enable the liquid crystal layer contributing to the display to decrease in average tilt angle; thus, even upon application of a voltage, it becomes possible to establish low tilt angles of those liquid crystal molecules between electrodes and over transparent electrodes, which in turn makes it possible to realize both aperture ratio improvement and wide viewing angles.

According to the fourth aspect of the invention, both aperture ratio improvement and wide viewing angles can be realized due to the fact that the average tilt angle of the liquid crystal layer's liquid crystal molecules on or over the transparent electrode stays below 45 degrees even when applying a voltage thereto.

According to the fifth aspect of the invention, the use of a double or duplex structure of a transparent electrode and opaque metal electrode for either the pixel electrode or the counter electrode makes it possible to greatly prevent short-circuiting defects at this electrode, which will be advantageous for achievement of large screens.

According to the sixth aspect of the invention, the use of a structure for letting neighboring contra-voltage signal lines be connected by a counter electrode within a pixel via more than one through-hole permits respective contra-voltage signal lines to be electrically connected together in a net-mesh-like pattern, which makes it possible to reduce the resistivity of such contra-voltage signal lines, wherein serious defects will no longer take place even upon occurrence of open circuit failures.

The seventh aspect of the invention lies in an ability to let the protective film suppress reduction of an electric field acting on liquid crystal molecules, which makes it possible to lower the drive voltage(s).

According to the eighth aspect of the invention, the aperture ratio is improved by use of a structure in which the counter electrode made of a transparent electrode and an optical shield pattern is provided between the counter electrode and its associative image signal line(s).

According to the ninth aspect of the invention, lowering the resistivity of contra-voltage signal lines makes it possible to smoothen the transmission of a voltage between counter electrodes, thus reducing distortion of the voltage, which in turn enables suppression of cross-talk in the horizontal direction.

According to the tenth aspect of the invention, by making the counter electrode neighboring upon image signal lines opaque will suppress crosstalk associated with image signals. The reason for this is set forth below.

Forming a transparent counter electrode in close proximity to an image signal line forces an electric field (electric flux lines) from the image signal line to be absorbed by the counter electrode, with a result that the electric field from the image signal line hardly affects the electric field generated between the pixel electrode and counter electrode to thereby extremely suppress generation of crosstalk associated with image signals-in particular, crosstalk in the up/down direction of the substrates concerned. However, the behavior of the liquid crystal molecules on or over the counter electrode neighboring upon the image signal line is unstable due to variation of image signals; and, if the counter electrode that neighbors the image signal line is made transparent, then crosstalk is observed due to transmitted light at such an electrode portion. Accordingly, letting the counter electrode adjacent to the image signal line be opaque makes it possible to suppress crosstalk associated with image signals.

According to the eleventh aspect of the present invention, the transparent conductive film is indium-tin-oxide (ITO), which is suitable for improvement of the optical transmissivity.

According to the twelfth and thirteenth aspects of the present invention, the contra-voltage signal line is a laminated clad structure, and the resistance value decreases enabling reduction of open circuit defects.

According to the fourteenth aspect of the present invention, because the liquid crystal layer's initial twist angle is nearly zero, while the initial alignment angle is greater than or equal to 45° C., and yet is less than 90° C. if the dielectric anisotropy $\Delta\epsilon$ is positive in polarity and is above 0°, and yet is less than or equal to 45° if the dielectric anisotropy $\Delta\epsilon$ is negative, it is possible to improve the contrast by suppressing the domain and optimizing the range of a maximal application voltage, while at the same time enabling optimization of the response speed.

The first manufacturing method is designed to enable fabrication of pixel electrodes and counter electrodes using transparent conductive films without increasing the required number of process steps, by simultaneously forming both the transparent conductive layer of a scan signal line terminate end portion, an image signal line end, or the counter electrode end's uppermost-layer and the transparent conductive film of the pixel electrode or counter electrode.

It should be noted that although the liquid crystal display device of the present invention is designed so that at least one of the pixel electrode and the counter electrode is formed of a transparent conductive film, a difference in configuration from a liquid crystal display device as recited in, for example, Richard A. Soref, Proceedings of the IEEE, December issue, 1974 at pp. 1710–1711 (referred to as "Reference 1" hereinafter) is as follows.

In Reference 1, a comb-shaped electrode corresponding to a pixel electrode and counter electrode is constituted from a transparent conductive film.

However, when forming the initial alignment state of liquid crystal molecules, SiO (silicon mono-oxide) is orthorhombically deposited at about 85 degree to intentionally form extremely high pretilt angles at the liquid crystal molecules in the interface between each electrode and the liquid crystal layer. For this reason, as shown in FIG. 1(b) of Reference 1, applying a voltage between comb-shaped electrodes from the homogeneous alignment with 90-degree twisting in the initial alignment state results in formation, as the realignment state, of a homogeneous alignment state that is substantially parallel to substrate surfaces in a region between the electrodes and of a homeotropic alignment state that is perpendicular to substrate surfaces in a region on or above the electrodes.

However, with this arrangement, there is a drawback in that, although complementary interaction of the two kinds of liquid-crystal molecule realignment states with an increase in electric field might result in achievability of brighter display, the resultant viewing angle characteristic becomes narrower due to a need to averagely increase the tilt angle of liquid crystal molecules.

On the contrary, with the liquid crystal display device of the lateral electric field type in accordance with the present invention, a specific configuration is employed wherein even when applying a voltage between the pixel electrode and counter electrode in order to obtain a wide view-angle characteristic and a good aperture ratio, those realigning portions of liquid crystal molecules contributing to a display image are forced to retain the homogeneous alignment state that maximally parallels the substrate surfaces while simultaneously letting, on or over electrodes of a transparent conductive film, the on-electrode transmissivity complementary interact with the interelectrode transmissivity in a way corresponding to the angle α of rotation from the initial alignment direction, resulting in substantial improvement of the aperture ratio.

It should be noted that in the description, the term "homogeneous alignment state" refers to a state in which the liquid crystal molecules within a liquid crystal layer have a tilt (rise-up) angle lying maximally parallel to either the substrate surface or the interface of such liquid crystal layer are practically, a specific alignment state in which the tilt angle from either the substrate surface or the liquid crystal layer's interface stays below 45 degrees. Accordingly, the "homeotropic alignment state" is defined as a case in which the tilt angle from either the substrate surface or the liquid crystal layer's interface exceeds 45 degrees.

FIG. 41A shows an example of a voltage potential distribution within a liquid crystal layer in an electrode arrangement for creation of an electric field extending nearly parallel to the substrate surface.

Solid lines in the drawing designate equal-potential lines, wherein an electric-field vector is given in a direction perpendicular to such equal-potential lines. While the electric field vector E permits production of only components Ey extending at right angles to the substrate surface on the electrode center, those components Ex extending horizontally relative to the substrate surface also appear in the remaining part other than the center. In a region in which such horizontal components—i.e. lateral electric field components—Ex are being generated, liquid crystal molecules between the electrodes behave to rotate through a rotation angle α from the initial alignment direction RDR in the direction of the lateral electric field Ex as shown in FIGS. 41B and 41C.

On the other hand, on-electrode liquid crystal molecules behave to rotate with a rotation of the interelectrode liquid crystal molecules in the presence of a molecular field. Accordingly, although no lateral electric field is being applied to the central on-electrode liquid crystal molecules, these molecules attempt to rotate due to the molecular field in the same direction as that of their outlying liquid crystal molecules. In other words, the rotation angle α is large between the electrodes, decreases at locations on or above the electrodes, and becomes maximal over the electrode center portion.

A result of simulating this manner of operation is shown in FIGS. 42A–42C.

Note here that the simulation in this example was carried out using an exemplary arrangement in which the liquid crystal molecules' initial homogeneous alignment state is designed so that the liquid crystal layer's initial twist angle is substantially zero, whereas an initial alignment angle defined between the initial alignment direction RDR and the applied electric field Ex is set at φLC=75 degrees, while letting the initial pretilt angle of certain liquid crystal molecules near or around the liquid crystal layer's upper and lower interfaces be set at zero degrees, and further employing a Cross Nicol layout that lets the transmission axis of one of polarizer plates be identical to said initial alignment direction RDR with the transmission axis of the other polarizer plate being at right angles, thereby performing displaying in a double refraction mode.

The optical transmissivity $T/T_0$ at this time may be represented by the following equation:

$$T/T_0 = \sin^2(2\alpha_{eff}) \cdot \sin^2(\Pi d_{eff} \cdot \Delta n/\lambda) \quad (1)$$

Here, $\alpha_{eff}$ is the angle defined between the liquid crystal layer's effective light axis and the polarized-light transmission axis—in this example, this is the net value of the liquid crystal molecule rotation angle α in the direction along the thickness direction of the liquid crystal layer, which is a "virtual" value that is treatable as the average value under an assumption that the rotation is uniform.

Additionally, $d_{eff}$ is the effective thickness of a liquid crystal layer having double-refractivity, $\Delta n$ is the refractive anisotropy, and λ is the wavelength of light.

In Equation (1), at the time of application of an electric field Ex, the value of $\alpha_{eff}$ increases with an increase in the intensity thereof, and becomes maximal at 45 degrees.

Furthermore, in the simulation of this example, the liquid crystal layer's retardation $\Delta n \cdot d_{eff}$ is set at a selected value that is half of the wavelength λ of light for achievement of the double refraction zero-order mode, while setting the dielectric anisotropy $\Delta \epsilon$ to a positive polarity.

FIG. 42A is a characteristic diagram showing the state of equal-potential lines in the case of applying to a transparent ITO electrode a voltage at which bright display near the maximum is obtainable, wherein the vertical axis represents the thickness (4.0 μm thick) of a liquid crystal layer and the transverse axis indicates a relative electrode positional relationship. Note that the values in this drawing are indicative of the voltage potential strength standardized.

Also see FIG. 42B and FIG. 42C, which show the rotation angle α and tilt (rise-up) angle of liquid crystal molecules within a liquid crystal layer upon application of lateral electric field components Ex as formed from the state of the equal-potential lines.

As shown in FIG. 42C, the on-electrode liquid crystal molecules hardly rise up even when applying a voltage thereto In this example, the tilt angle stays below 8° in the entire direction along the thickness of the liquid crystal layer. Further, as shown in FIG. 42B, those liquid crystal molecules on or over the electrodes also have rotated about 15 to 35°. It is noted that the sign of the tilt angle shown in FIG. 42C is determined so that the rightward rise-up in the drawing is positive whereas leftward rise-up is negative for purposes of convenience in illustration and discussion herein. Therefore, with the scheme of the present invention, it becomes possible to allow the liquid crystal molecules to vary in rotation angle α even on or over the electrodes to thereby change the transmissivity.

The one character that is most pertinent to this operation is the liquid crystal is twist elastic modulus K2, which is preferably as small as possible in view of the fact that as this modulus K2 gets smaller, liquid crystal molecules on or over electrodes receive influence of the interelectrode liquid crystal molecules to rotate approaching the rotation angle α of such interelectrode liquid crystal molecules.

Referring to FIG. 41D, there is shown a model of a distribution of the on-electrode transmissivity and the interelectrode transmissivity in a case where the twist elastic modulus K2 is set at about $10 \times 10^{-12}$ N (Newton).

In case the electrodes concerned are transparent, the on-electrode liquid crystal molecules' realignment operation discussed above allows 5 to 30% of the average transmissivity of transmissivities at part "A" between electrodes to become the average-value transmissivity of transmissivities at part "B" on or over the electrodes.

In addition, as will be described later, it has been found that if the twist elastic modulus K2 is less than or equal to $2.0 \times 10^{-12}$ N (Newton), then more than 50% of the average transmissivity of transmissivities at the part "A" between the electrodes becomes equal to the average-value transmissivity of transmissivities at the part B on or over the electrodes. Therefore, the average transmissivity over the entire part is raised up to become the average-value transmissivity of the transmissivities at the A+B portions.

In summary, when compared to electrodes which have been traditionally comprised of a metal layer that permits no light rays to pass through, it becomes possible to substantially improve the aperture ratio per pixel.

With the simulation of this example, calculation is carried out with the initial pretilt angle being set at zero degrees; however, in actual implementation, it will be required that the initial pretilt angle near or around the interfaces of the liquid crystal layer with its associative alignment film(s) be set by rubbing treatment at approximately 10 degrees or less; and, more preferably, it is set at 6 degrees or below. Additionally, in an embodiment to be later described, it is set at about 5 degrees.

With the initial pretilt angle falling within such a range, it is possible to control the liquid crystal molecules at the liquid crystal layer interfaces so that they align in the substrate in-plane direction, thereby making it possible to allow the average tilt angle of the liquid crystal layer on or over electrodes to stay below 45 degrees even upon application of electric fields thereto. In other words, it becomes possible even when applying electric fields to prevent on-electrode liquid crystals from exhibiting so-called homeotropic alignment.

FIG. 44 is an example of a characteristic diagram of a simulation result, which shows tilt angles of liquid crystal molecules within a liquid crystal layer in the liquid crystal display device of the lateral electric field type, along with a view-angle range in which the contrast ratio becomes 10 or greater in all directions concerned.

More specifically, even when the tilt angle is about 30 degrees, the resultant contrast ratio stays at or above 10 in all the directions within the view-angle range with about 40-degree inclination from the vertical direction relative to the display plane, which results in achievement of the intended characteristics that are substantially identical to those in prior art liquid crystal display devices of the longitudinal electric-field type. Furthermore, the less the tilt angle, the greater will be the view-angle range. If the former is about 10 degrees, then the latter expands to exhibit a view-angle range with inclination of about 80 degrees; whereas, if the former is 5 degrees or less, then the latter expands to fill almost the entire range-thus, wide view-angle characteristics are obtained.

In this embodiment, since this aspect of the invention is designed to reduce at any event the average tilt angle of the liquid crystal molecules within the liquid crystal layer between the electrode and on or over the transparent electrode when applying no electric fields and when applying an electric field thereto, the rubbing direction of alignment films ORI1, ORI2 to be later described are set in an initial alignment state so that the initial pretilt angle of the liquid crystal molecules at the interfaces of the liquid crystal layer on the sides of the two substrates SUB1, SUB2 is in a is state to thereby ensure that certain liquid crystal molecules at or near the center of the liquid crystal layer exhibit maximized parallelism with respect to the interfaces.

BRIEF DESCRIPTION OF THE DRAWINGS

FIG. 8A is a diagrammatic plan view showing a nearby part of a connection section of a drain terminal DTM and image signal line DL; and FIG. BB is a side sectional view thereof.

FIG. 29A is a plan view showing a nearby part of a connection section of a gate terminal GTM and gate lead GL; and FIG. 29B is a sectional view thereof.

FIG. 30A is a plan view showing a nearby part of a connection section of a drain terminal DTM and image signal line DL; and FIG. 30B is a sectional view thereof.

FIGS. 41A–D are diagrams showing principles of the present invention, wherein FIG. 41A is a characteristic diagram showing a voltage potential distribution within a liquid crystal layer when a voltage is applied to electrodes, FIG. 41B is a diagram showing a realignment state of those liquid crystal molecules near or around the center of the liquid crystal layer, FIG. 41C is a characteristic diagram showing rotation angles a of liquid crystal molecules shown in FIG. 41B, and FIG. 41D is one exemplary characteristic diagram showing a distribution of the transmissivity of rays of light passing through the liquid crystal layer on or over the upper and lower polarizer plates and upper/lower substrates plus electrodes as well as between electrodes concerned.

FIG. 42A is a characteristic diagram showing the state of equal-potential "contour" lines each connecting the points of the same potential when applying a voltage to a transparent electrode, whereas

FIGS. 43A to 43D are diagrams showing principles relating to improvement of the aperture ratio of an active-matrix color liquid crystal display device in accordance with an embodiment 11 of the present invention, wherein FIG. 43A is a characteristic diagram showing a voltage potential distribution within a liquid crystal layer when a voltage is applied to an electrodes), FIG. 43B is a diagram showing a realignment state of those liquid crystal molecules near or around the center of the liquid crystal layer, FIG. 43C is a characteristic diagram showing rotation angles a of liquid crystal molecules shown in FIG. 43B, and FIG. 43D is an example of a characteristic diagram showing a distribution of the transmissivity of rays of light passing through a liquid crystal layer on or over the upper and lower polarizer plates and upper/lower substrates plus electrodes as well as between electrodes concerned.

DESCRIPTION OF THE PREFERRED EMBODIMENTS

Figure 1:
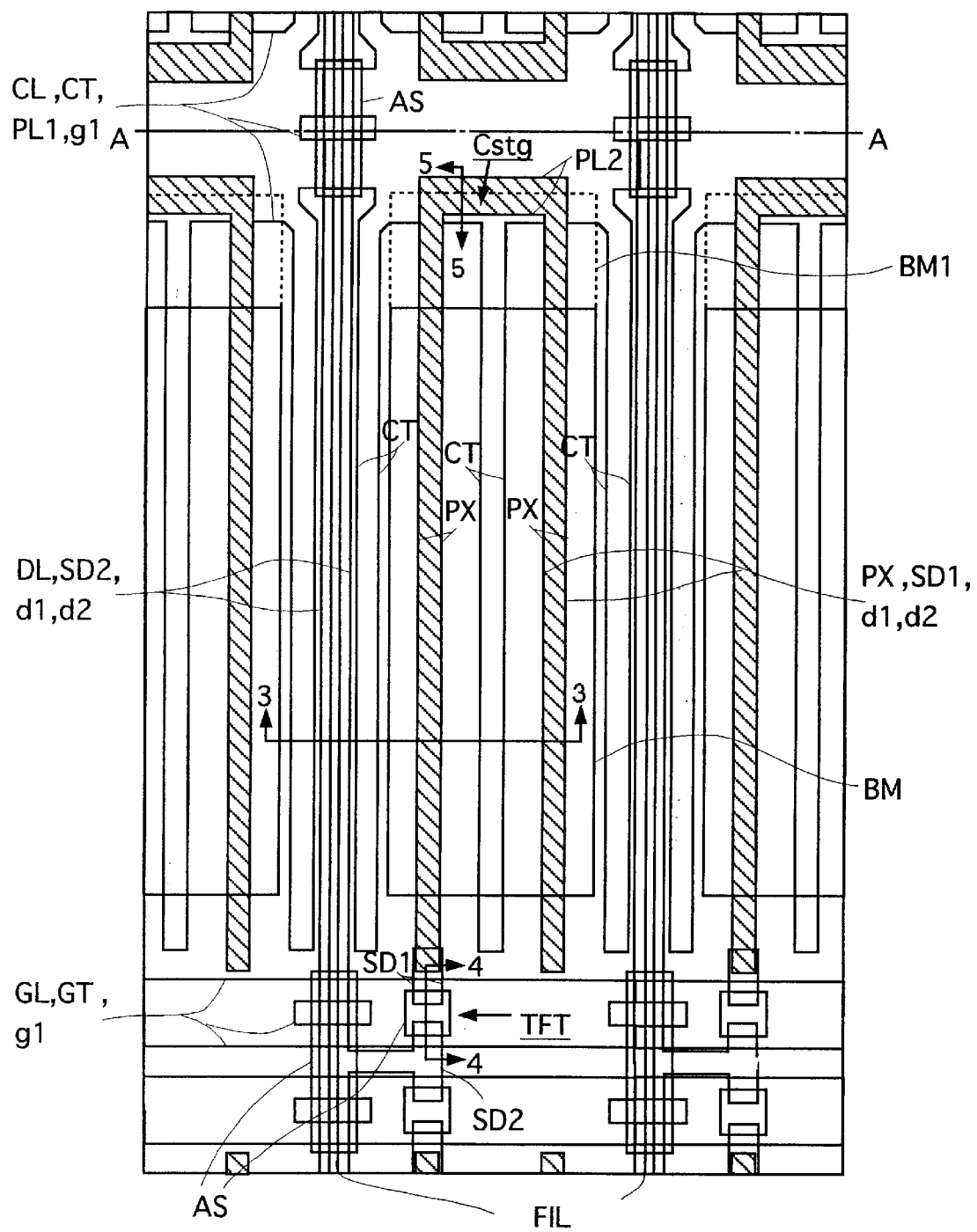
FIG. 1 is a diagrammatic plan view of a main part of one pixel along with nearby portions of a liquid crystal display section of a color liquid crystal display device of the active matrix type in accordance with an embodiment 1 of the present invention.

The present invention, still other objects of the present invention, and yet other features of the present invention will become more apparent from the explanation presented below with reference to the accompanying drawings.

(Embodiment 1)

An explanation will be given of a color liquid crystal display device of the active matrix type to which the present invention is applied. Note that in the drawings, as will be explained below, those elements the same function will be identified with the same reference symbol, and any repetitive explanation thereof will be omitted.

<<Planar Arrangement of Matrix Section (Pixel Section)>>

FIG. 1 is a plan view showing one pixel along with the nearby portions of an active-matrix color liquid crystal display device of the present invention. (Hatched portions in the drawing indicate a transparent conductive film g2.)

As shown in FIG. 1, each pixel is disposed within a crossover region (within an area as surrounded by four signal lines) of a scan signal line (gate signal line or horizontal signal line) GL and a contra-voltage signal line (counter electrode lead) CL plus two neighboring image signal lines (drain signal lines or vertical signal lines) DL. Each pixel includes a thin-film transistor TFT, a storage capacitor Cstg, a pixel electrode PX, and a counter electrode CT. The scan signal line GL and contra-voltage signal line CL are provided as a plurality of lines that extend in the lateral direction as seen in the drawing and are disposed in the upward/downward direction. A plurality of image signal lines DL are provided which extend in the up/down direction and are laid out in the rightward/leftward or lateral direction. The pixel electrode PX is connected via a source electrode SD1 to a thin-film transistor TFT, while the counter electrode CT is integral with the contra-voltage signal line CL.

Two neighboring pixels in the up/down direction along the image signal line DL are arranged as a mirror image of each other so as to overlap each other when folded along line "A" of FIG. 1. This is for reduction of the resistance of the contra-voltage signal line CL by providing a common contra-voltage signal line CL between two pixels that neighbor each other in the up/down direction along the image signal line DL to thereby increase the electrode width of the contra-voltage signal line CL. Whereby, it is easier to sufficiently supply a contra-voltage from external circuitry to the counter electrode CT of each of laterally adjacent pixels.

The pixel electrode PX and counter electrode CT oppose each other to control the optical state of liquid crystal LC by generating an electric field between each pixel electrode PX and counter electrode CT to thereby control generating of a display. The pixel electrode PX and counter electrode CT are designed to have a comb-like shape so that each becomes an elongate electrode in the up/down direction of the drawing.

The required number "O" of counter electrodes CT within a single pixel (i.e. the number of comb teeth) is arranged to have a relation of O=P+1 relative to the number "P" of pixel electrodes PX (comb teeth number) without failure in any event (in this embodiment, O=3, P=2). This is in order to alternately dispose the counter electrodes CT and pixel electrodes PX while forcing the counter electrode CT to reside adjacent to its associated image signal line DL with no failures. Whereby, it is possible to allow the counter electrode CT to shield those electric flux lines extending from the image signal line DL to thereby ensure that an electric field between the counter electrode CT and pixel electrode PX receive no influence from an electric field generated from the image signal line DL. Since the counter electrode CT is being constantly supplied with a voltage potential from the outside by a contra-voltage signal line CL as will be described later, its potential is stabilized. Due to this, even when it is immediately adjacent to its neighboring image signal line DL, the potential will hardly vary. In addition, with such an arrangement, the geometric position of the pixel electrode PX from the image signal line DL becomes farther so that the parasitic capacitance between the pixel electrode PX and image signal line DL decreases significantly thereby also enabling suppression of any possible variation of a pixel electrode potential Vs otherwise occurring due to an image signal voltage. With these arrangements, it is possible to suppress or reduce cross-talk (i.e. image quality defect called the "longitudinal smear") occurring in the up/down direction.

The pixel electrode PX and counter electrode CT measure 6 $\mu$m in electrode width. This is to provide a sufficiently larger setup than the thickness, 3.9 $\mu$m, of a liquid crystal layer to be described later in order to apply sufficient electric field to the entire liquid crystal layer with respect to the thickness direction of the liquid crystal layer while at the same time letting it be as fine as possible in order to increase the aperture ratio. In addition, in order to prevent electrical connection failure or open-circuiting, the electrode width of image signal line DL is designed to be wider by little more than that of the pixel electrode PX and counter electrode CT-typically, 8 $\mu$m. Here, the electrode width of the image signal line DL is set so, that it becomes less than or equal to twice the electrode width of its neighboring counter electrode CT. Alternatively, in cases where the electrode width of image signal line DL has been determined depending on the productivity of the yield, let the electrode width of the counter electrode CT neighboring upon the image signal line DL is made less than or equal to half of the electrode width of the image signal line DL. This is for allowing the counter electrodes CT on the opposite sides to absorb electric flux lines generated from the image signal line DL. To absorb electric flux lines generated from one certain electrode width, it is required to use an electrode having an electrode width that is greater than or equal to it. Accordingly, since the respective counter electrodes CT on the opposite sides are expected to absorb electric flux lines generated from half (4 $\mu$m for each) of the electrode of the image signal line DL, the electrode width of the counter electrode CT neighboring the image signal line DL is set to ½ or more. This prevents generation of crosstalk due to the influence of image signals, in particular, the up/down-direction (longitudinal crosstalk).

The scan signal line GL is designed to have an electrode width which satisfies a resistance value that permits application of a sufficient scanning voltage to a gate electrode GT of a pixel on the distal end side (on the opposite side of as can voltage terminal GTM to be described later). In addition, the contra-voltage signal line CL also is set at an electrode width which satisfies a resistance value that enables application of a sufficient contra-voltage to the counter electrode CT of such pixel on the distal end side (on the opposite side of a common bus line to be discussed later).

On the other hand, the electrode distance or interval between the pixel electrode PX and counter electrode CT changes depending on a liquid crystal material used. This is provided, in view of the fact that a different liquid crystal material results in a difference in electric field intensity required for achieving the maximum transmissivity, for setting the electrode distance depending on the liquid crystal material in order to insure obtainability of the maximum transmissivity within a range of the maximum amplitude of a signal voltage as set at the withstanding voltage of an image signal drive circuit (signal-side driver) used herein. Supposing that a liquid crystal material to be described later is used, the electrode distance becomes 16 $\mu$m.

<<Sectional Arrangement of Matrix Section (Pixel Section)>>

Figure 2:
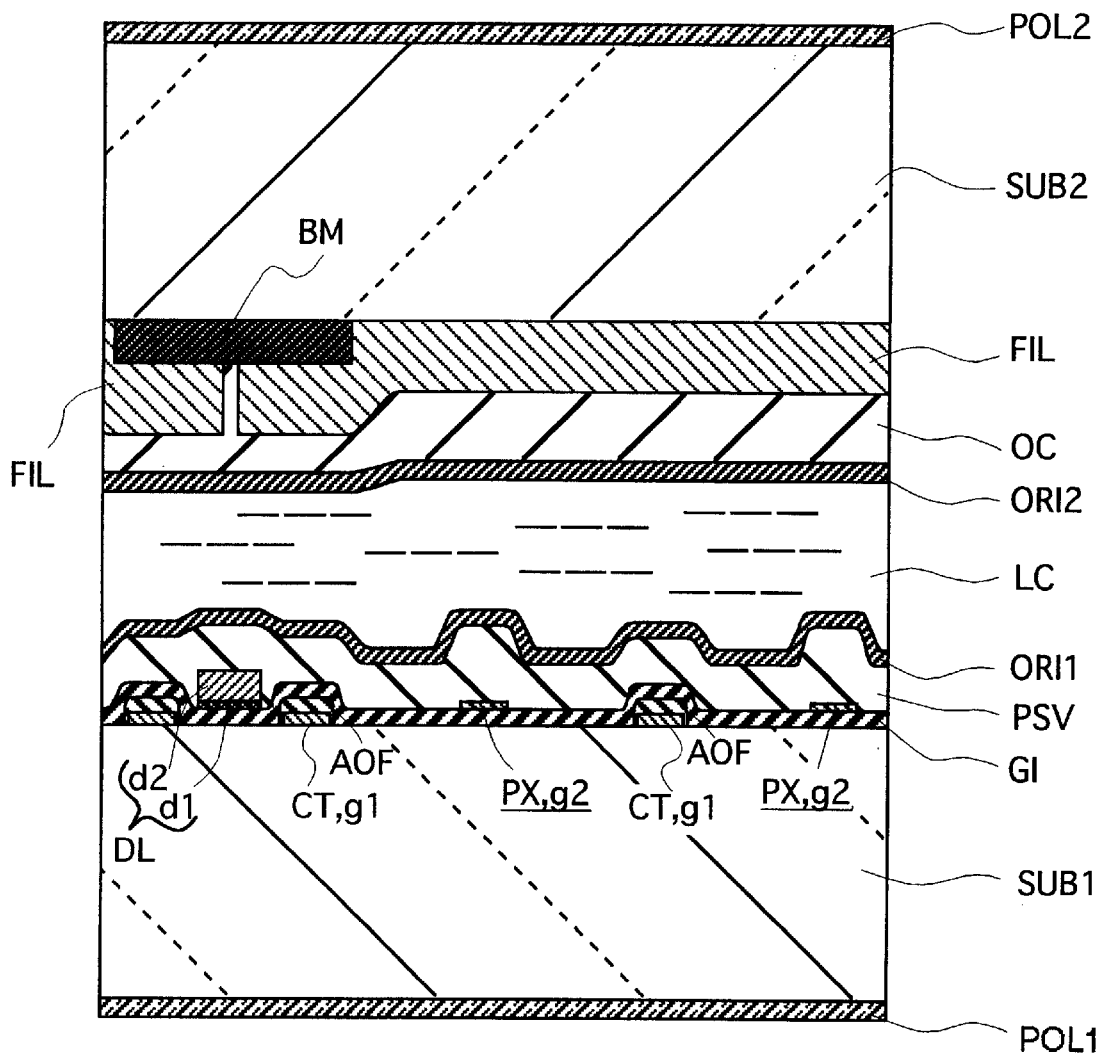
FIG. 2 is a diagrammatic sectional view of the pixel taken along line 3—3 of FIG. 1.
Figure 3:
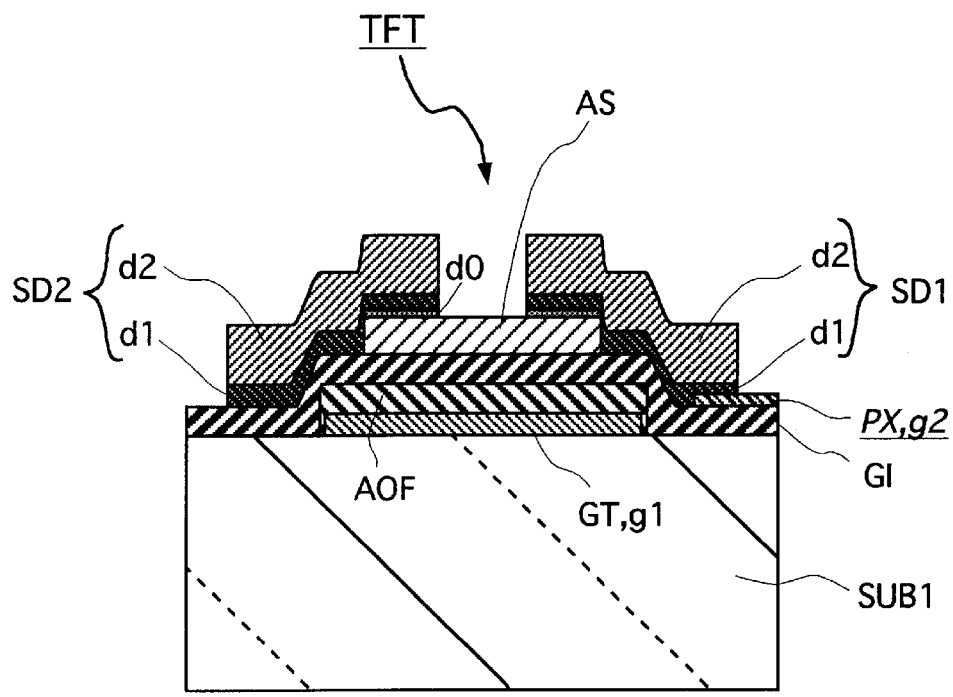
FIG. 3 is a diagrammatic sectional view of a thin-film transistor element TFT taken along line 4—4 of FIG. 1.
Figure 4:
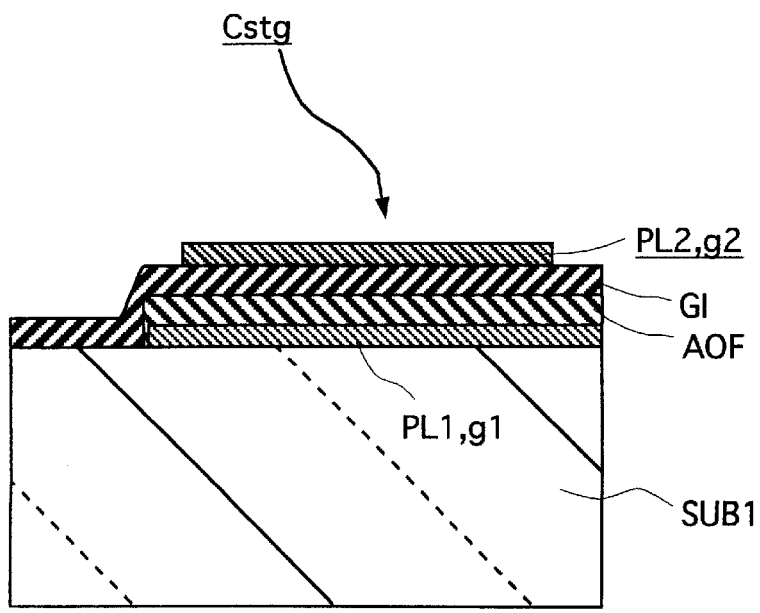
FIG. 4 is a diagrammatic sectional view of a storage capacitor Cstg taken along line 5—5 of FIG. 1.

FIG. 2 is a diagram showing a cross-section taken along cut line 3—3 of FIG. 1; FIG. 3 is a sectional view of a thin-film transistor TFT taken along line 4—4 of FIG. 1; and, FIG. 4 is a diagram showing in cross-section a storage capacitor Cstg taken along line 5—5 of FIG. 1. As shown in FIG. 2 to FIG. 4, a thin-film transistor TFT and storage capacitor Cstg plus an electrode group are formed on the side of a lower transparent glass substrate SUB1 with a liquid crystal layer LC being used as a reference, while a color filter FIL and optical shielding black matrix pattern BM are formed on the side of an upper transparent glass substrate SUB2.

In addition, orientation or "alignment" films ORI1, ORI2 for control of the initial alignment of liquid crystal are formed on the inside surfaces (on the liquid crystal LC side) of the transparent glass substrates SUB1, SUB2, respectively, while polarizer plates (Cross Nicol layout) are provided on the outside surfaces of respective ones of the transparent glass substrates SUB1, SUB2 in such a way that the polarization light axes are at right angles to each other.

<<TFT Substrate>>

A detailed explanation will first be given of an arrangement on the side of the lower transparent glass substrate SUB1 (TFT substrate).

<<Thin-Film Transistor TFT>>

A thin-film transistor TFT operates in a way such that, upon application of a positive bias to its gate electrode GT, the channel resistance between the source and drain decreases; and, when letting the bias be zero, the channel resistance increases.

As shown in FIG. 3, the thin-film transistor TFT has a gate electrode GT, gate insulation film GI, i-type semiconductor layer AS made of i-type (intrinsic, without doping of any conductivity-type determining impurity) amorphous silicon (Si), and a pair of active regions consisting of a source electrode SD1 and drain electrode SD2. Additionally, in view of the fact that the source and drain are inherently determinable by a bias polarity therebetween, the polarity thereof will be inverted during operations in the circuitry of this liquid crystal display device; thus, it should be understood that the source and drain are interchangeable during operations. However, in the explanation given below, one of them will be fixedly referred to as the "source" whereas the other will be referred to as the "drain" for purposes of convenience of discussion only.

<<Gate Electrode GT>>

The gate electrode GT is formed so that it is continuous with a scan signal line GL, wherein a partial region of the scan signal line GL is arranged to become the gate electrode GT. The gate electrode GT is the part that goes beyond the active regions of the thin-film transistor TFT, which is formed to be relatively larger than it to thereby completely cover the i-type semiconductor layer AS (when looking at from its lower part). In this way, it is possible to prevent any externally incoming light and backlight rays from hitting the i-type semiconductor layer AS, in addition to performing the function of the gate electrode GT. In this example, the gate electrode GT is formed of a single-layered conductive film g1. The conductive film g1 is made of an aluminum (Al) film formed by sputtering, for example, on which an anodized film AOF of Al is provided.

<<Scan Signal Line G1>>

The scan signal line G1 is formed of a conductive film g1. This conductive film g1 of the scan signal line G1 is fabricated in the same process step with the conductive film g1 of the gate electrode GT so that these elements are formed integrally with each other. This scan signal line G1 permits application of a gate voltage Vg from external circuitry to the gate electrode GT. In addition, an anodized film AOF of Al is also provided on the scan signal line G1. Note that a portion which intersects with an image signal line DL is narrowed for reduction of the possibility of short-circuiting with the image signal line DL; and, simultaneously, it is Y-bent to resemble a crotch in shape to enable cut-and-separation for electrical disconnection even when short-circuiting occurs.

<<Counter Electrode CT>>

The counter electrode CT is constituted from a conductive film g1 of the same layer as the gate electrode GT and scan signal line G1. In addition, an anodized film AOF of Al is also provided on the counter electrode CT. An arrangement is employed causing a contra-voltage Vcom to be applied to the counter electrode CT. In this embodiment, the voltage Vcom is set at a selected potential level which is lower by a specified degree than an intermediate DC voltage potential that is between the minimum level of the drive voltage Vdmin and the maximum level of the drive voltage Vdmax being applied to the image signal line DL, which specified degree corresponds to a feed-through voltage ΔVs as generated when the thin-film transistor TFT is turned off, although an AC voltage may alternatively be applied thereto in cases where it is required that the power supply voltage of an integrated circuit to be used in image signal drive circuitry is half-reduced in potential.

<<Contra-voltage Signal Line CL>>

The contra-voltage signal line CL is formed of a conductive film g1. This conductive film g1 of the contra-voltage signal line CL is fabricated at the same process step with the forming of the conductive film g1 of the gate electrode GT, scan signal line G1 and counter electrode CT, and also is arranged to be integral with the counter electrode CT. This contra-voltage signal line CL permits supplement of a contra-voltage Vcom from external circuitry to the counter electrode CT. In addition, an anodized film AOF of Al is provided on the contra-voltage signal line CL. Note here that a portion which intersects with the image signal line DL is narrowed, as in the case of the scan signal line G1, in order to decrease the possibility of short-circuiting with the image signal line DL; and, simultaneously, it is Y-bent to resemble a crotch in shape to permit cut-and-separation for electrical disconnection even upon occurrence of short-circuiting.

<<Dielectric Film GI>>

The dielectric film GI is for use as a gate insulation film for giving an electric field to the semiconductor layer AS along with the gate electrode GT in the thin-film transistor TFT. The dielectric film GI is formed to overlie the gate electrode GT and scan signal line G1. As the dielectric film GI, a silicon nitride film is chosen which was formed by plasma CVD, for example, to a thickness ranging from 1,200 to 2,700 Å (in this embodiment, 2,400 Å or more or less). The gate insulation film GI is formed to surround the entire matrix section AR while a peripheral section was removed thus exposing external connection terminals DTM, GTM. The dielectric film GI also contributes to electrical isolation of the image signal line DL with respect to the scan signal line G1 and contra-voltage signal line CL.

<<i-Type Semiconductor Layer AS>>

The i-type semiconductor layer AS is made of amorphous silicon formed to a thickness of from 200 to 2,200 Å (in this embodiment, approximately 2,000 Å). A layer d0 is an N(+) type amorphous silicon semiconductor layer with phosphorus (P) doped therein for ohmic contact, which is left only at a portion where the i-type semiconductor layer AS is present on the lower side, whereas a conductive layer d1 (d2) exists on the upper side thereof.

The i-type semiconductor layer AS is also provided between both cross points (crossover sections) of the image signal line DL with respect to the scan signal line G1 and contra-voltage signal line CL. The i-type semiconductor layer AS at these cross points suppresses short-circuiting between the scan signal line G1 and contra-voltage signal line CL on one hand and the image signal line DL on the other hand at such cross points.

<<Source Electrode SD1, Drain Electrode SD2>>

Each of the source electrode SD1 and drain electrode SD2 is constituted from a conductive film d1 disposed in contact with the N(+) type semiconductor layer d0 and a conductive film d2 formed thereon.

The conductive film d1 may be a chromium (Cr) film that is formed by sputtering to a thickness of from 500 to 1,000 Å (about 600 Å in this embodiment). In light of the fact that the Cr films increase in stress when formed with a large film thickness, this film is to be formed within a range that does not exceed a specified film thickness, such as about 2,000 Å. The Cr film is used in order to provide excellent adhesion with the N(+) type semiconductor layer d0 while at the same time preventing Al from the conductive film d2 from diffusing into the N(+) semiconductor layer d0 (at the aim of so-called barrier layer). The conductive film d1 may be made of a high-melting-point metal (Mo, Ti, Ta, W) film or a high-melting-point metal silicide ($MbSi_2$, $TiSi_2$, $TaSi_2$, $WSi_2$) film in place of the Cr film.

The conductive film d2 is formed by sputtering Al to a thickness of 3,000 to 5,000 Å (in this embodiment, about 4,000 Å). The Al film has less stress than the Cr film and is capable of fabrication to large film thicknesses; thus, it offers functionality to reduce the resistance values of the source electrode SD1 and drain electrode SD2, plus the image signal line DL, and also to insure a step-like difference ride-over (improve the step coverage) due to the gate electrode GT and/or i-type semiconductor layer AS.

After having patterned the conductive film d1 and conductive film d2 by use of the same mask pattern, the N(+) type semiconductor layer d0 is removed using the same mask or alternatively using the conductive film d1 and conductive film d2 as a mask therefor. In other words, residual portions of the N(+) type semiconductor layer d0 on the i-type semiconductor layer AS, other than the conductive film d1 and conductive film d2, are removed in a self-alignment fashion. At this time, since the N(+) type semiconductor layer d0 is etched so that the whole part corresponding to its thickness is removed, the i-type semiconductor layer AS also will be etched a little on its surface portion-such etching degree may be controlled by the etching time.

<<Image Signal Line DL>>

The image signal line DL is made up of a second conductive film d2 and a third conductive film d3, which are at the same layer of the source electrode SD1 and drain electrode SD2. In addition, the image signal line DL is formed integrally with the drain electrode SD2.

<<Pixel Electrode PX>>

The pixel electrode PX is formed of a transparent conductive layer g2. This transparent conductive film g2 is made of a transparent conductive film (Indium-Tin-oxide ITO: Nesa film) formed by sputtering to a thickness of 100 to 2,000 Å (in this embodiment, about 1,400 Å).

The pixel electrode being transparent, as in this embodiment, leads to improvement of the maximum optical transmissivity when producing a white display due to rays of light passing through such portion; thus, it becomes possible to produce a brighter display as compared to the case of using opaque pixel electrodes. At this time, as will be described later, the polarizer plate layout is arranged (in the normally-black mode) so that liquid crystal molecules retain their initial alignment state in the absence of a voltage applied thereto to achieve a black display under such conditions; and, consequently, even where pixel electrodes are made transparent, no light rays penetrate such portions, to thereby enable displaying of black with good quality. This in turn makes it possible to improve the maximum transmissivity while achieving sufficient contrast ratio.

<<Storage Capacitor Cstg>>

The pixel electrode PX is so formed as to overlap the contra-voltage signal line CL at an opposite end to the end at which it is connected to the thin-film transistor TFT. As apparent from FIG. 4 also, this overlapping results in the formation of a storage capacitor (electrostatic capacitive element) Cstg with the pixel electrode PX as its one electrode PL2 and with the contra-voltage signal line CL as its remaining electrode PL1. A dielectric film for this storage capacitor Cstg is formed of the anodized film AOF and dielectric film GI used as the gate insulation film of the thin-film transistor TFT.

As shown in FIG. 1, regarding the planar configuration, the storage capacitor Cstg is formed at a portion where the width of the conductive film g1 of contra-voltage signal line CL is widened.

<<Protective Film PSV1>>

A protective film PSV1 is provided on the thin-film transistor TFT. The protective film PSV1 is formed to mainly protect the thin-film transistor TFT from humidity or the like, and so one that is high in transparency and good in moisture vapor resistance is used. The protective film PSV1 is made of a silicon oxide film or silicon nitride film fabricated by a plasma CVD apparatus, for example, to a film thickness of approximately 1 µm.

The protective film PS1 is formed TO entirely surround the matrix section AR, whose peripheral section has been removed to expose the external connection terminals DTM, GTM. With regard to the relative of thicknesses of the protective film PSV1 and gate insulation film GI, the former is made thick in light of the protection effect, whereas the latter is made thinner in view of the mutual conductance of the transistors involved. Accordingly, the protective film PSV1 with a high protecting effect is formed so that it is larger than the gate insulation film GI to ensure that its periphery may also protect over an extended area that is as wide as possible.

<<Color Filter Substrate>>

Next, turning back to FIG. 1 and FIG. 2, a detailed explanation will be given of an arrangement of the upper transparent glass substrate SUB2 (color filter substrate).

<<Optical Shield Film BM>>

An optical shield film BM (so-called black matrix) is formed on the side of the upper transparent glass substrate SUB2 for preventing reduction of the contrast ratio or the like which otherwise occurs due to outward emission of transmission light from unnecessary gaps (gaps other than that between the pixel electrode PX and counter electrode CT) toward the display plane side. The optical shield film BM also functions to prevent rays of either external light or backlight from falling onto the i-type semiconductor layer AS. More specifically, the i-type semiconductor layer AS of the thin-film transistor TFT is sandwiched by the optical shield film BM and the gate electrode GT of larger size, which are at the upper and lower locations, to thereby eliminate hitting of external incoming natural light and backlight rays.

The contour line of a closed polygon of the optical shield film BM shown in FIG. 1 indicates an opening within which the optical shield film BM is not formed. This contour line pattern is a mere example, and in the case of enlarging the opening portion, it may be replaced with an optical shield film BM1 as shown by dotted lines in FIG. 1. Although the expanded region in FIG. 1 can experience a disturbance of the electric field direction, a display at such portion is in one-to-one correspondence to image information within pixels so that black is obtained in the case of black and white is obtained for white; accordingly, it can be utilized as part of such display. In addition, the boundary line in the up/down direction of the drawing is determined by the accuracy of positional alignment between the upper and lower substrates; and, in case the alignment accuracy is better than the electrode width of the counter electrode CT that neighbors the image signal line DL, it is possible to further enlarge the opening section by setting it between the widths of the counter electrode.

The optical shield film BM has a shielding effect with respect to light, and is made of a highly insulative film for elimination of any bad influence on an electric field between the pixel electrode PX and counter electrode CT—in this embodiment, it is made of a resist material with black pigment mixed thereinto and formed to a thickness of 1.2 µm, more or less.

The optical shield film BM is formed into a net mesh or lattice-like shape around each pixel so that this lattice is used for partitioning the effective display area of a single pixel. Thus, the contour line of each pixel is made clear by the optical shield film BM. In other words, the optical shield film BM functions as a black matrix while at the same time functioning to optically shield the i-type semiconductor layer AS.

The optical shield film BM is also formed at the periphery to have a window frame-like shape, whose pattern is formed in a way continuous with a pattern of the matrix section shown in FIG. 1 with a plurality of dot-like openings provided therein. The optical shield film BM at the periphery is extended toward the outside of a seal section SL thereby preventing leakage light, such as reflection light due to practical mount equipment, such as personal computers, from entering or "invading" the matrix section. On the other hand, this optical shield film BM is limited in location so that it resides within an inside area smaller by about 0.3 to 1.0 mm than the edge of the substrate SUB2, and also is formed excluding cutaway regions of the substrate SUB2.

<<Color Filter FIL>>

A color filter FIL is formed to have a stripe shape with red, green and blue being repeated at positions that correspond to pixels. The color filter FIL is formed to overlap edge portions of the optical shield film BM.

The color filter FIL can be formed in a way which follows. Firstly, a dyeing base material, such as acrylic resin, is formed on the surface of the upper transparent glass substrate SUB2; and then, using photolithography techniques the dyeing base material other than red-filter formation regions, is removed. Thereafter, the dyeing base is dyed with red pigment; and then, fixation processing is performed to form a red filter R. Next, similar processes are effected to sequentially form a green filter G and a blue filter B.

<<Overcoat Film OC>>

An overcoat film OC is provided for elimination of leakage of dye of the color filter FIL into the liquid crystal Lc and also for planarization of the step-like surface configuration due to the color filter FIL and optical shield film BM. The overcoat film OC is formed of a transparent resin material, such as, for example, acrylic resin, epoxy resin or the like.

<<Liquid crystal Layer and Polarizer Plate>>

An explanation will next be given of a liquid crystal layer and alignment films as well as polarizer plates and the like.

<<Liquid Crystal Layer>>

A nematic liquid crystal material is used as the liquid crystal material LC, which is positive in dielectric anisotropy $\Delta\in$ and measures 13.2 in value, while its refractive anisotropy $\Delta n$ is 0.081 (589 nm at 20° C.). The liquid crystal layer is 3.9 $\mu$m in thickness and 0.316 in retardation $\Delta n \cdot d$. Due to the value setup of this retardation $\Delta n \cdot d$, the maximum transmissivity can be obtained in combination with an alignment film(s) and polarizer plate(s) to be described later when letting liquid crystal molecules rotate in the direction of an electric field by 45° from the rubbing direction, thereby making it possible to obtain transmitted light with little or no waveform dependency within the range of visible light. Additionally, the thickness (gap) of the liquid crystal layer is controlled by polymer beads.

It should be noted that the liquid crystal material LC should not be limited to the one suggested above and that the dielectric anisotropy $\Delta\in$ may alternatively be negative in polarity. In addition, setting the dielectric anisotropy $\Delta\in$ at greater values enables the drive voltage to decrease in potential. In addition, reducing the refractive anisotropy $\Delta n$ makes it possible to increase the thickness (gap) of the liquid crystal layer, which in turn enables the liquid crystal sealing time to be shortened while reducing gap deviation.

Further, investigating the relation of the solid-state properties of the liquid crystal material versus the intensity of transmitted light at part of the transparent conductive film corresponding to either the counter electrode or the pixel electrode, it has been found that this relationship significantly depends on the twist elastic modulus K2 of the liquid crystal material used. This is because attenuation of in-plane twist deformation at the upper part of the electrode of the transparent conductive film due to a lateral electric field leading to transmission of light at an opening between electrodes takes place at its inherent curvature ratio in accordance with the twist elastic modulus K2 of the liquid crystal material. Thus, in order to improve the brightness or luminance of the entire opening, including the electrode of this transparent conductive film, by increasing the light transmission at the electrode portion of the transparent conductive film, a certain liquid crystal material having a lower twist elastic modulus K2 is employed for reduction of the attenuation curvature ratio. The effect of the twist elastic modulus K2 will be further described in an embodiment 11.

In this embodiment 1, the twist elastic modulus K2 is set at $5.1 \times 10^{-12}$ N (Newton) at room temperature.

Note that one typical method of measurement of the twist elastic modulus K2 has been disclosed in, for example, "LIQUID CRYSTALS.Fundamentals," by Kohji Okano and Shunsuke Kobayashi at pp. 216–220 (Baifu-Kan, 1985) cited herein as a reference, which teaches that the modulus is obtainable through measurement of the threshold voltage of a liquid crystal cell that has twisted.

<<Alignment Film>>

Figure 19:
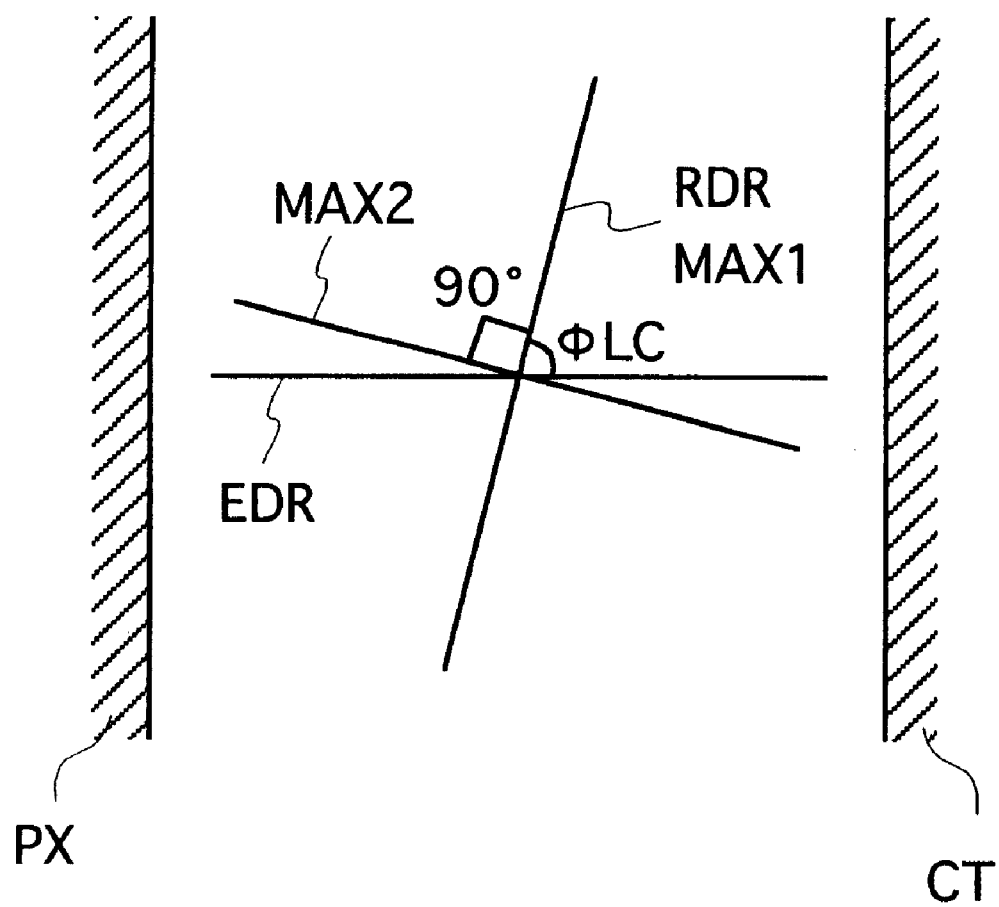
FIG. 19 is a diagram showing a relation of an electric field application direction and a rubbing direction as well as a polarizer plate's penetration axis.

Polyimide is used as the alignment films ORI, and the rubbing directions are parallel to each other for the upper and lower substrates while setting the initial alignment angle $\phi$LC at 75°, which angle is defined between the initial alignment direction RDR and the applied electric field direction EDR(Ex). Its relation is shown in FIG. 19.

Additionally, the initial alignment angle $\phi$LC defined between the initial alignment direction RDR and the applied electric field direction EDR is such that when the dielectric anisotropy $\Delta\in$ of the liquid crystal material is positive in polarity, it must be greater than or equal to 45° C. and yet less than 90° C.; whereas, if dielectric anisotropy $\Delta\in$ is negative, then it must exceed 0° and remains below 45°.

Further, in this embodiment, letting the rubbing directions be parallel to each other with respect to alignment films ORI1, ORI2 causes the initial pre-tilt angle of liquid crystal molecules at the upper and lower interfaces of the liquid crystal layer, contributing to display between electrodes and over electrodes, to be in the splay state, thereby allowing such liquid crystal molecules to exhibit an effect of mutually compensating for optical characteristics resulting in achievement of wide viewing-angle characteristics.

Alternatively, letting the rubbing directions be antiparallel to each other with respect to the alignment films ORI1 ORI2 causes the initial pretilt angle of liquid crystal molecules at the upper and lower interfaces of the liquid crystal layer to become in the parallel state resulting in an increase in average tilt angle inside of the liquid crystal layer. In such case, however, setting the pretilt angle at or below 10 degrees enables accomplishment of similar effects of the present invention.

<<Polarizer Plate>>

As the polarizer plates POL, G1220DU manufactured by Nitto Denko-Sha is used, wherein the polarized light transmission axis MAX1 of a lower side polarizer plate POLL is rendered identical to the rubbing direction RDR; whereas, the polarized light transmission axis MAX2 of an upper side polarizer plate POL2 is disposed at right angles thereto. The relation thereof is shown in FIG. 19. Thus, it becomes possible to obtain a normally-close characteristic which lets the transmissivity increase with an increase in a voltage being applied to the pixel in accordance with the present invention (voltage between the pixel electrode PX and counter electrode CT), while enabling achievement of a black display of good quality when applying no voltages thereto.

In addition, the polarizer plate POL2 per se is provided with a transparent conductive film that is formed on its entire surface for the purpose of eliminating the bad influence of static electricity from the outside to thereby reduce the specific resistance thereof. This transparent conductive film may alternatively be formed between the upper substrate SUB2 and the upper polarizer plate POL2.

<<Arrangement of Matrix Periphery>>

Figure 5:
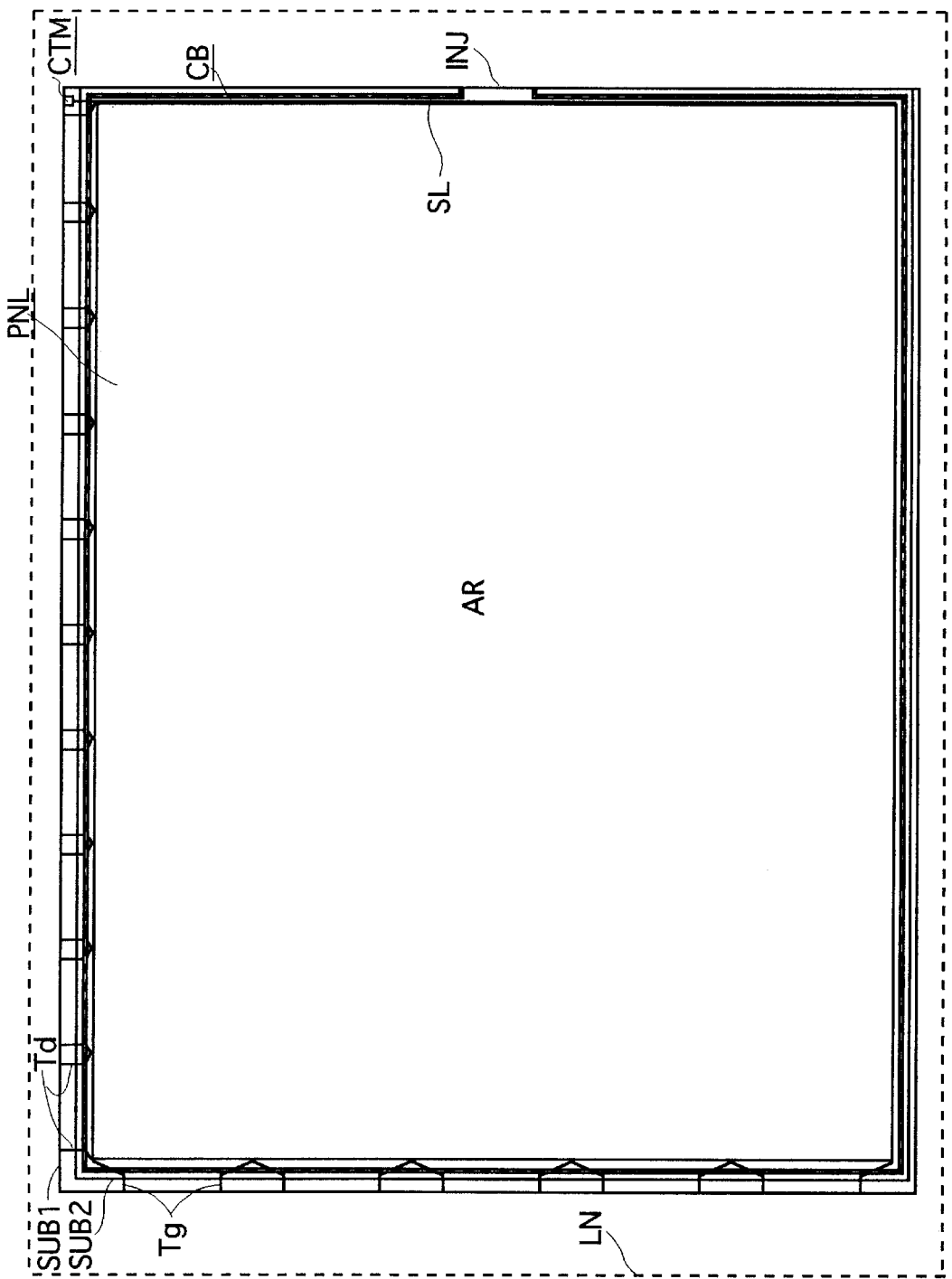
FIG. 5 is a plan view illustrating an arrangement of a matrix peripheral section of a display panel.
Figure 6:
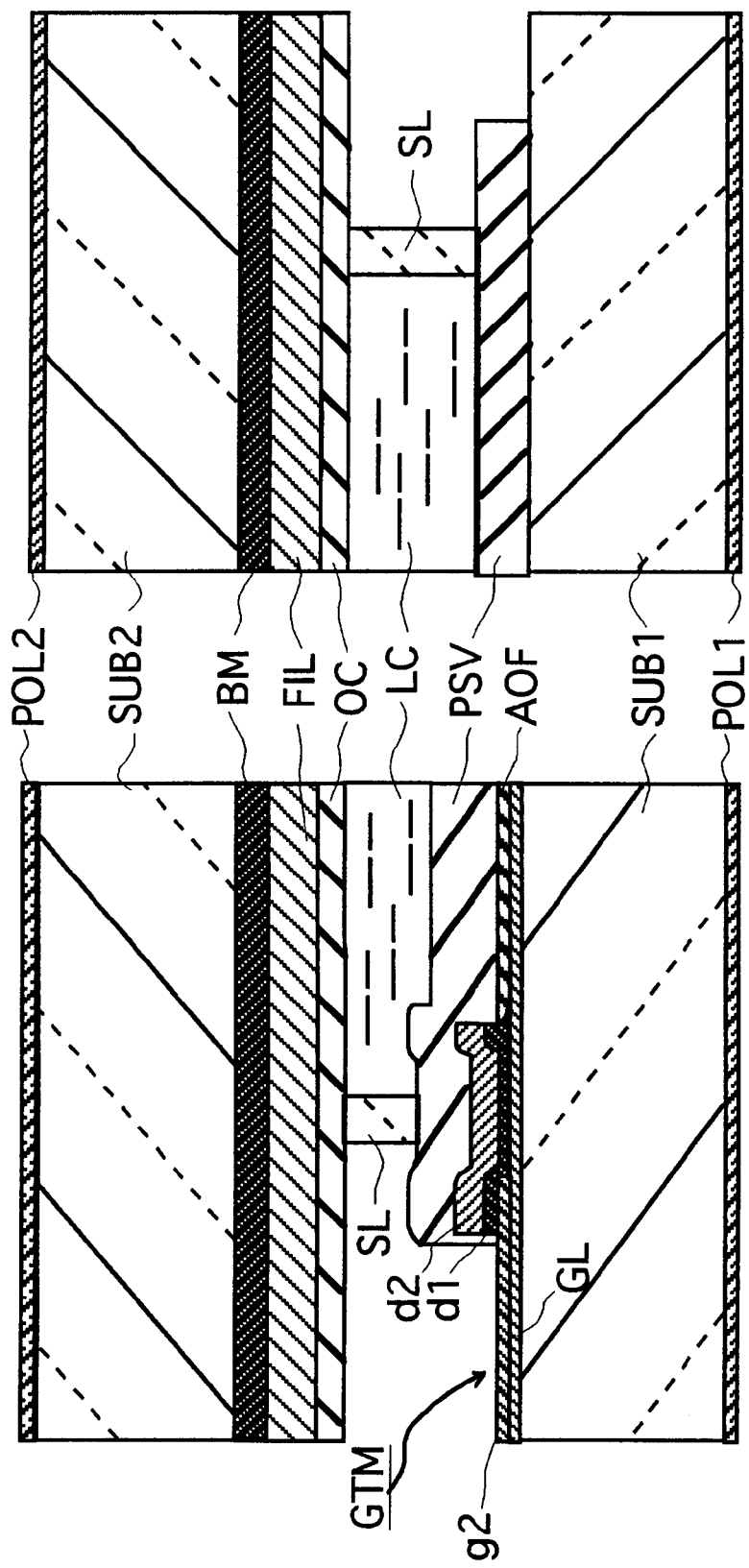
FIG. 6 is a diagrammatic sectional view showing panel edge sections with a scan signal terminal on its left-hand side and without any external connection terminal on the right-hand side thereof.

FIG. 5 is a diagram showing a plan view of a main part at the periphery of the matrix (AR) of the display panel PNL including the upper and lower glass substrates SUB1, SUB2. FIG. 6 is a diagram showing, on its left side, a cross-section near an external connection terminal GTM to which scan circuitry is to be connected, and also showing on its right side a cross-section near a seal section at which no external connection terminals are present.

With this panel structure, a glass sheet is cut into pieces through a series of process steps in such a way that, if it is small in size, then a single glass substrate is used for simultaneous fabrication of a plurality of devices thereon and then subject to subdivision by cutting processes in order to improve the throughput, or alternatively, if it is of large size, then a glass substrate of preselected size that is standardized for any type of product is processed and then made smaller into a required size adaptable for use with each product type in order to attain common usability of a manufacturing facility. FIG. 5 and FIG. 6 show an example of the latter case, wherein both FIG. 5 and FIG. 6 represent a structure obtained after having cut the upper and lower substrates SUB1, SUB2, and wherein LN denotes an edge before cutting. In either case, in the completed state, those portions (upper side and lower side in the drawing) at which the external connection terminal group Tg, Td and terminal COT (suffix eliminated) exist are limited so that the size of the upper side substrate SUB2 is inside of the lower side substrate SUB1 to thereby expose them. The terminal groups Tg, Td are each a bundle of plural lines including scan circuit connection terminals GTM and image signal circuit connect terminals DTM along with their extension lead section, as will be described later, in units of tape carrier packages TCP (FIG. 16, FIG. 17) each having an integrated circuit chip CHI mounted thereon. An extension lead from a matrix section of each group up to an external connection terminal section is slanted or tilted as it comes closer to both ends. This is in order to align the terminals DTM, GTM of the display panel PNL with the layout pitch of packages TCP and also with the connection terminal pitch at each package TCP. In addition, the counter electrode terminal CTM is a terminal for use in supplying a contra-voltage from external circuitry to the counter electrode CT. The contra-voltage signal line CL of the matrix section is drawn out toward the opposite side (right side in the drawing) of I the scan circuit terminal GTM while bundling together respective contra-voltage signal lines by a common bus line CB for connection to the counter electrode terminal CTM.

A seal pattern SL is formed between the transparent glass substrates SUB1, SUB2 along the edges thereof except for a liquid crystal sealing port INJ to permit sealing of the liquid crystal LC. The seal material is made of epoxy resin, for example.

Layers of alignment films ORI1, ORI2 are formed inside of the seal pattern SL. The polarizer plates POL1, POL2 are arranged on outer surfaces of the lower-part transparent glass substrate SUB1 and upper-part transparent glass substrate SUB2, respectively. The liquid crystal LC is sealed in a region that is partitioned by the seal pattern SL between the lower-part alignment film ORI1 and upper-part alignment film ORI2 for setting the direction of liquid crystal molecules. The lower-part alignment film ORI1 is formed at the upper part of the protective film PSV1 on the side of the lower-part transparent glass substrate SUB1.

This liquid crystal display device is assembled by laminating various layers independently on the side of the lower-part transparent glass substrate SUB1 and on the side of upper-part transparent glass substrate SUB2, forming the seal pattern SL on the substrate SUB2 side, overlapping the lower-part transparent glass substrate SUB1 and upper-part transparent glass substrate SUB2, injecting the liquid crystal LC from an opening INJ of the seal material SL, sealing the injection port INJ by epoxy resin or the like, and cutting the upper and lower substrates.

<<Gate Terminal>>

Figure 7A:
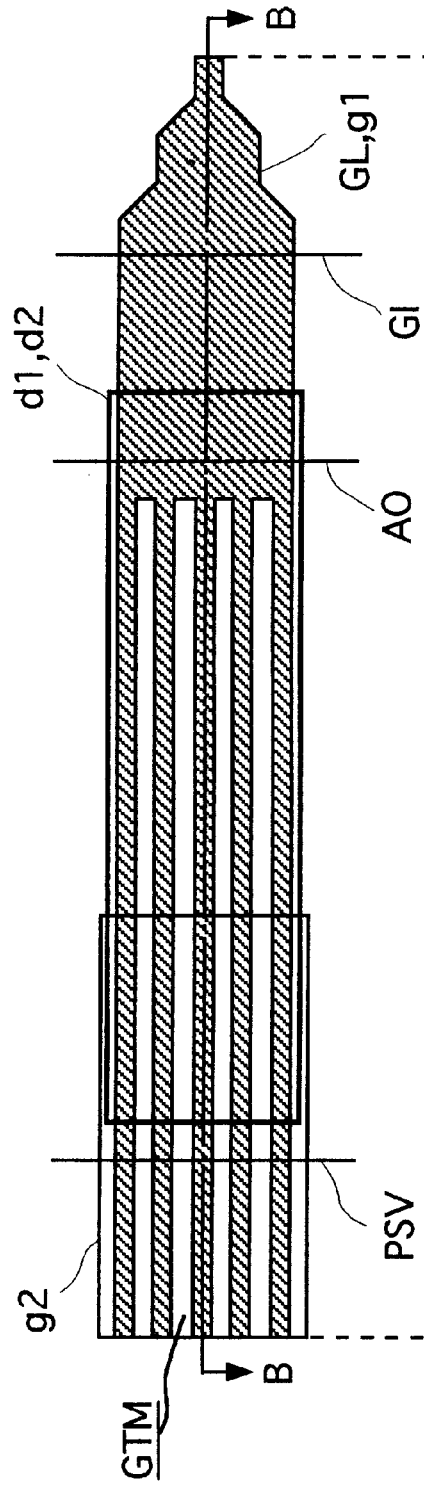
FIG. 7A is a diagrammatic plan view showing a nearby part of a connection section of a gate terminal GTM and gate lead GL.
Figure 7B:
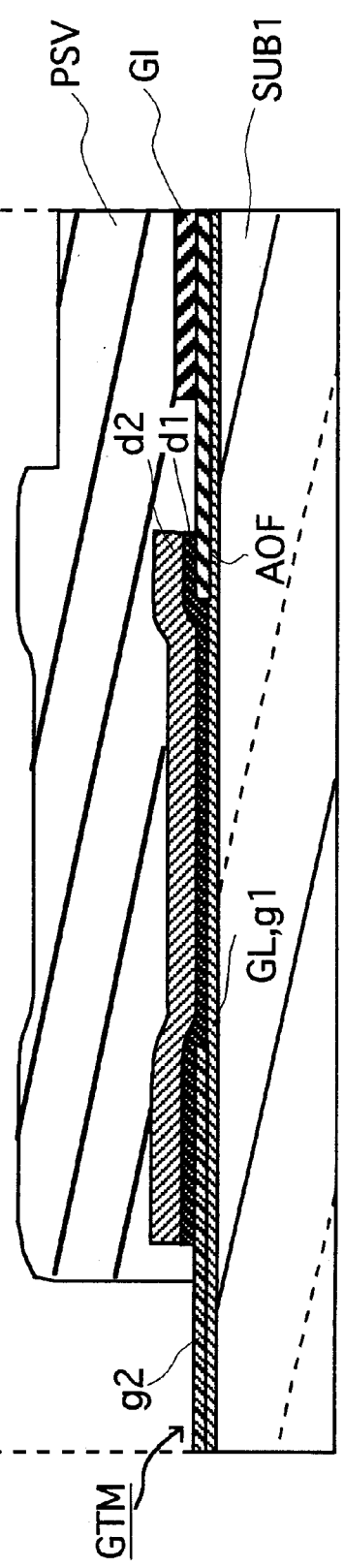
FIG. 7B is a side sectional view thereof.

FIG. 7A is a plan view showing a connection structure extending from the display matrix's scan signal line G1 up to its external connection terminal GTM; and FIG. 7B shows a cross-section at line B—B of FIG. 7A. Note that the same drawing corresponds to the FIG. 5 right center vicinity, wherein the hatched part is represented by a straight line shape for purposes of convenience.

"AO" is a boundary line of photoresist direct drawing—in other words, a photoresist pattern of selective anodization. Accordingly, this photoresist is to be removed after anodization, and the pattern AO shown in the drawing is not left as a complete product; however, its trace is left because the oxide film AOF is selectively formed at the gate lead G1 as shown in the sectional drawing. In the plan view diagram, the left side with the photoresist's boundary AO serving as a reference is the region that is covered with a resist and is not subject to anodization; and the ride side is the region that is exposed from the resist and is anodized. An Al layer g1 anodized has a surface on which the oxide $Al_2O_3$ film AOF is formed, wherein the lower conductor part decreases in volume. Of course, the anodization is performed after setting of an appropriate time and voltage to ensure that its conductor part remains.

Although in the drawing the Al layer g1 is hatched for clarity purposes, a non-anodized region is patterned into a comb-like shape. This is done to achieve suppression or minimization of the possibility of short-circuiting and/or any possible sacrifice of dielectric constant, while simultaneously preventing generation of whiskers otherwise occurring when the Al layer is large in width, by narrowing the width of every single one for provision of an arrangement of such plurality of lines bundled together.

The gate terminal GTM is comprised of the Al layer g1 and a further a transparent conductive layer g2 that is provided for protecting the surface thereof and for improving the reliability of connection with a TCP (Tape Carrier Package). This transparent conductive film g2 makes use of a transparent conductive film ITO that was formed at the same process step with the forming of the pixel electrode PX. In addition, the Al layer g1 and the conductive layers d1 and d2 formed on its lateral side are provided in an attempt to reduce the connection resistance by connecting a connectivity-excellent Cr layer d1 to both the Al layer and the transparent conductive layer g2 in order to compensate for any connection failures between the Al layer and the transparent conductive layer g2; and the conductive layer d2 is left due to the fact that it is formed using the same mask as that of the conductive layer d1.

In the plan view diagram, the gate insulation film GI is formed on the right side relative to its boundary line while the protective film PSV1 is also formed on the right side of its boundary, wherein the terminal section GTM placed on the left edge is arranged to be exposed and enable electrical contact with external circuitry. Although in the drawing only one pair of the gate line G1 and gate terminal is depicted, the actual implementation is such that a plurality of such lines are laid out in the up/down direction as shown in FIGS. 7A, 7B to constitute the terminal group Tg (FIG. 5), wherein the left end of the gate terminal is extended beyond the cutting region of the substrate to be short-circuited by a lead SHg (not shown) during the manufacturing processes. The provision of such a short-circuiting line SHg during the manufacturing processes is useful for power feed at the step of anodization and also for electrostatic breakdown during rubbing of the alignment film ORI1.

<<Drain Terminal DTM>>

FIG. 8A shows a plan view diagram showing connection from the image signal line DL to its external connection terminal DTM; and FIG. 8B shows a cross-section at line B—B of FIG. 8A. Note that the same drawing corresponds to the FIG. 5 upper right vicinity, and that although the direction of the drawing is changed for convenience purposes, the right end direction corresponds to the upper end section of the substrate SUB1.

"TSTd" is a test terminal to which external circuitry is not connected and which is widened to have a width greater than that of the lead section to permit contacting of a probe needle or the like. Similarly, the drain terminal DTM also is widened to have a width greater than that of the lead portion to enable connection with external circuitry. External connection drain terminals DTM are laid out in the up/down direction; and, as shown in FIG. 5, the drain terminals DTM constitute the terminal group Td (suffix eliminated) and are designed to further extend beyond the cut line of the substrate SUB1, all of which are short-circuited to one another by more than one lead SHd (not shown) during the manufacturing processes for prevention of electrostatic breakdown. As shown in FIG. 8A, test terminals TSTD are formed at alternate ones of the image signal lines DL.

The drain connection terminal DTM is formed of a single transparent conductive layer g2 and is connected to an image signal line DL at a certain part from which the gate insulation film GI is removed. This transparent conductive film g2 makes use of a transparent conductive film ITO that was formed at the same process step with the forming of pixel electrodes PX as in the case of the gate terminal GTM. A semiconductor layer AS formed on the end portion of the gate insulation film GI is provided for use in etching the edge of gate insulation film GI into a taper shape. Obviously, on or over the drain terminal DTM, the protective film PSV1 has been removed in order to perform connection with external circuitry.

An extension lead from the matrix section up to the drain terminal section DTM is such that those layers d1, d2 at the same level as the image signal line DL are arranged at a midway portion of the protective film PSV1 and are connected with the transparent conductive film g2 within the protective, film PSV1. This has the objective of obtaining maximized protection of the easily electrolytically corrodible Al layer d2 by use of the protective film PSV1 and/or seal pattern SL.

<<Counter Electrode Terminal CTM>>

Figure 9A:
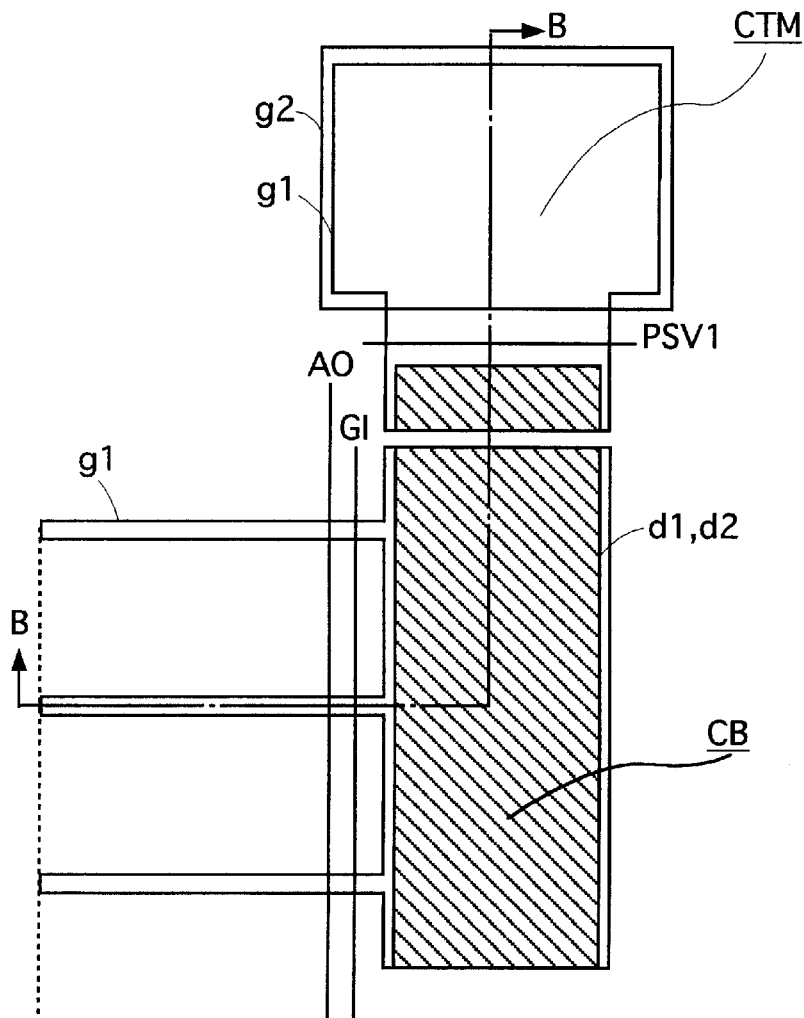
FIG. 9A is a diagrammatic plan view showing a nearby part of a connection section of a common electrode terminal CTM and common bus line CB as well as common voltage signal line CL.
Figure 9B:
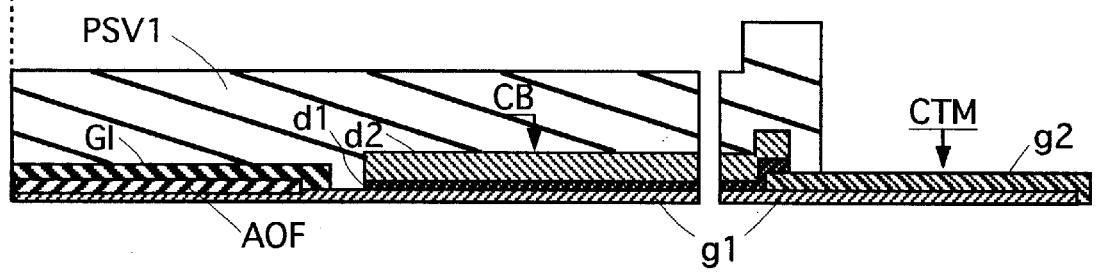
FIG. 9B is a side sectional view thereof.

FIG. 9A shows a plan view diagram showing connection from the contra-voltage signal CL up to its external connection terminal CTM; and FIG. 9B shows a cross-section at line B—B of FIG. 9A. Note that the drawing corresponds to the upper left part of FIG. 5 or therearound.

Respective contra-voltage signal lines CL are bundled by a common bus line CB to be drawn out toward the counter electrode terminal CTM. The common bus line CB is structured from a lamination of a conductive layer d1 and conductive layer d2 on the conductive layer g1. This is in order to reduce the resistivity of the common bus line CB to thereby ensure that a contra-voltage is sufficiently supplied from external circuitry to each contra-voltage signal line CL.

In the structure shown herein, a feature thereof lies in the ability to reduce the resistance of the common bus line without newly loading any specific conductive layers. The conductive layer g1 of the common bus line CB is eliminated from anodization to insure electrical connection with the conductive layers d1 and conductive layer d2. Additionally, it is exposed from the gate insulation film GI also.

The counter electrode terminal CTM is structured from the conductive layer g1 and the transparent conductive layer g2 as laminated thereon. This transparent conductive film g2 employs a transparent conductive film ITO that was formed at the same process step with the forming of pixel electrodes PX, as in the other terminals. The conductive layer g1 is covered with the transparent conductive layer g2 that is excellent in durability so that the transparent conductive layer g2 will protect its surface for elimination of electrolytic corrosion.

<<Display Device Overall Equivalent Circuit>>

Figure 10:
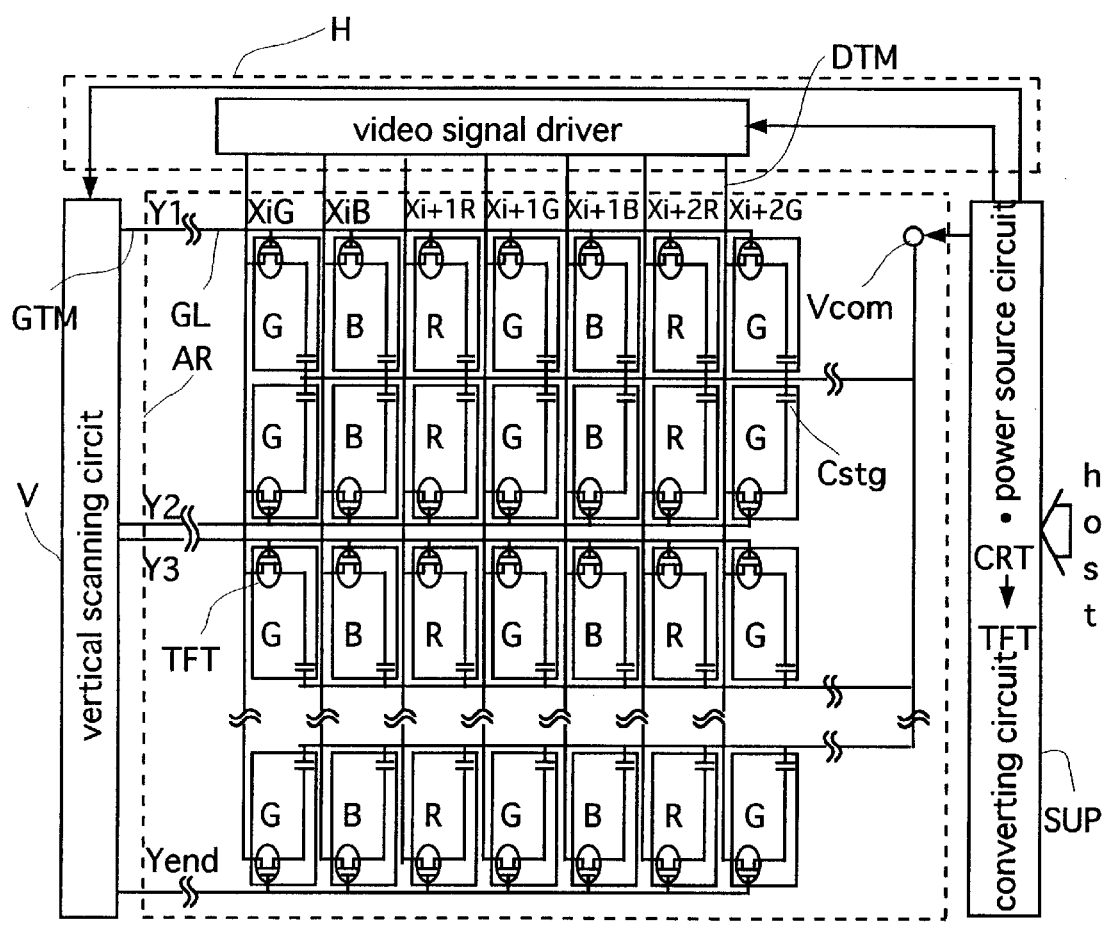
FIG. 10 is a circuit diagram including a matrix section and its periphery of the active-matrix color liquid crystal display device of the present invention.

An equivalent circuit of the display matrix section and its peripheral circuit's connection diagram are shown in FIG. 10. While this drawing is a circuit diagram, it has been illustrated in a way corresponding to the actual geometric layout. "AR" is a matrix array with a plurality of pixels laid out in a two-dimensional fashion.

In the drawing, "X" denotes image signal lines DL and has suffices "G", "B", and "R" appended thereto, which stand for green, blue and red pixels, respectively. "Y" denotes scanning signal lines G1 with suffices 1, 2, 3, . . . , "end", which denotes the order of sequence of the scan timing.

The scan signal lines Y (suffix eliminated) are connected to a vertical scan circuit V, while the image signal lines X (suffix omitted) are coupled to an image signal driving circuit H.

"SUP" denotes circuitry including a power supply circuit for obtaining a plurality of stabilized voltage sources voltage-divided from a single voltage source along with a circuit or circuits for conversion of information for a CRT (cathode-ray tube) from a host (upper-level or "supervisory" arithmetic processing device) into information for use with a TFT liquid crystal display device.

<<Driving Method>>

Figure 11:
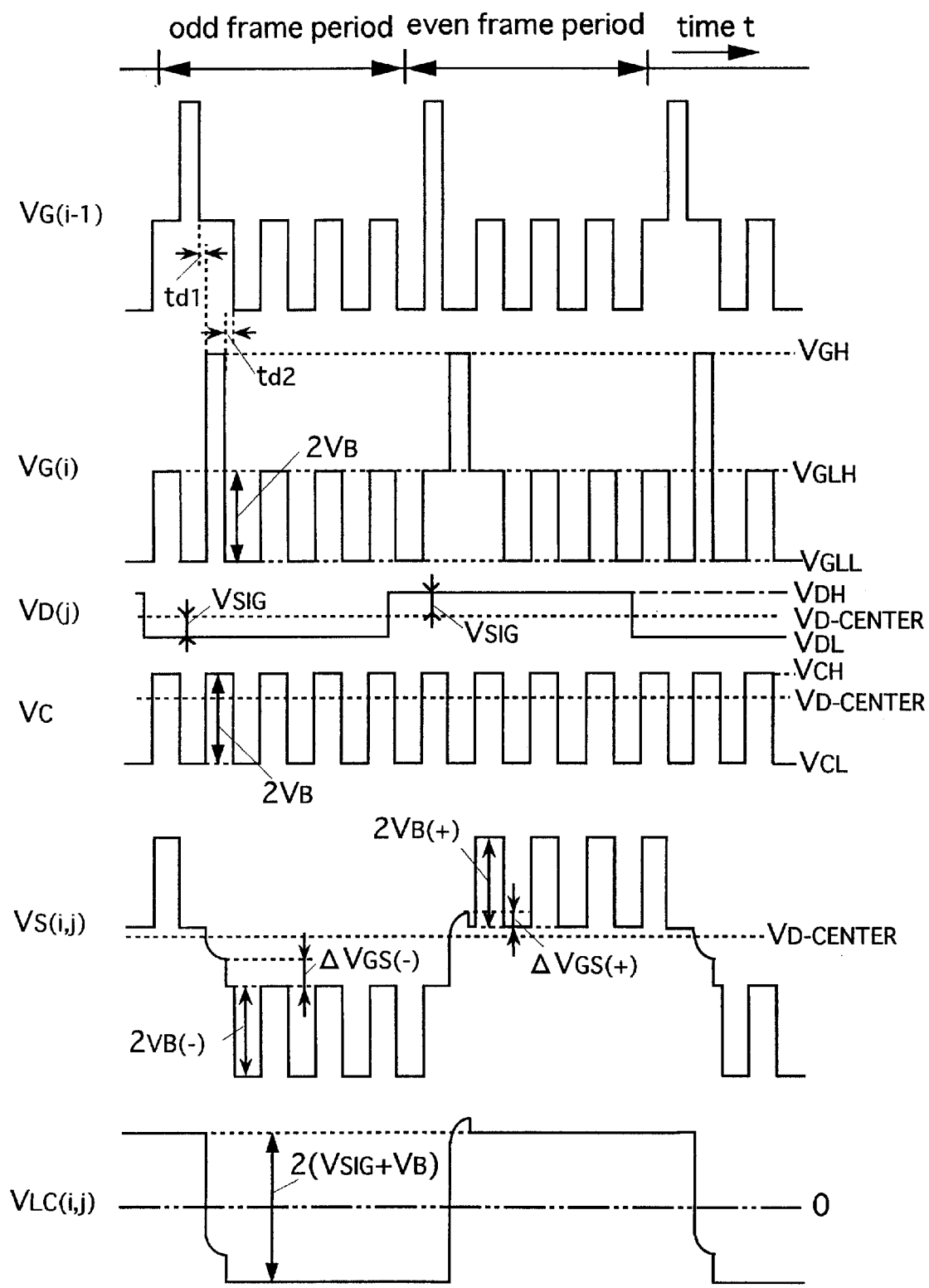
FIG. 11 is a diagram showing drive waveforms of the active-matrix color liquid crystal display device of the present invention.

Several drive waveforms of the liquid crystal display device of the present invention are shown in FIG. 11.

As in the embodiment 1 the contra-voltage signal line CL is made of the conductive film g1 of a low-resistivity metal such as aluminum, and the load impedance is less, thereby reducing waveform deformation of a contra-voltage. Due to this, it becomes possible to employ an AC voltage as the contra-voltage, which in turn advantageously reduces the signal line voltage.

More specifically, the contra-voltage is designed to have a rectangular AC waveform with binary values of Vdh and Vcl, while letting a non-selected voltage of scan signals Vg(i−1), Vg(i) change between binary values Vglh and Vgll in synchronism therewith once per scan period. The amplitude value of such contra-voltage is the same as the amplitude of the non-select voltage. An image signal voltage is the voltage equivalent to a desired voltage being applied to the liquid crystal layer from which ½ of the amplitude of the contra-voltage is subtracted.

While the contra-voltage may be a DC voltage, use of an AC voltage makes it possible to reduce the maximum amplitude of the image signal voltage, which in turn enables employment of a low-withstanding-voltage circuit for the image signal drive circuit (signal-side driver). In embodiments 2 and 3 to be described later, since the contra-voltage signal line CL is formed of a transparent conductive film g2, the resistance becomes comparatively high; and, in such cases, the contra-voltage is preferably of the DC scheme.

<<How Storage Capacitor Cstg Works>>

The storage capacitor Cstg is provided for accumulating therein image information written into a pixel (after the thin-film transistor TFT was turned off). In the scheme used by the present invention for applying an electric field in a direction parallel to the substrate surface, unlike the scheme for applying an electric field in a vertical direction relative to the substrate surface, the storage capacitor Cstg is incapable of accumulating image information in a pixel due to the fact that little or no capacitance (known as liquid crystal Capacitance) is formed by a pixel electrode and its counter electrode. Accordingly, with the when applying an electric field in a direction parallel to the substrate surface, the provision of a storage capacitor Cstg becomes an essential consideration.

In addition, when the thin-film transistor TFT performs switching, the storage capacitor Cstg also functions to reduce the influence of a gate potential variation Avg with respect to a pixel electrode potential Vs. This may be represented by:

$$\Delta Vs = \{Cgs/(Cgs+Cstg+Cpix)\} \times \Delta Vg,$$

where, Cgs is the parasitic capacitance as formed between the gate electrode GT and the source electrode SD1 of a thin-film transistor TFT, Cpix is the capacitance formed between a pixel electrode PX and its counter electrode CT, and $\Delta Vs$ is a variation component of the pixel electrode potential due to $\Delta Vg$, also known as a feed-through voltage. While this variation component $\Delta Vs$ becomes the cause of a DC component being applied to the liquid crystal LC, it is possible to decrease its value by increasing the storage capacitance Cstg. Reduction of DC components being applied to the liquid crystal LC leads to improvement of the lifetime of the liquid crystal LC while at the same time enabling suppression of the so-called "burn-in" or "seizing" phenomenon in which a prior image is retained after switching of a liquid crystal display screen.

As previously discussed, as the gate electrode GT is enlarged enough to completely cover the i-type semiconductor layer AS, an overlap area with the source electrode SD1 and drain electrode SD2 increases accordingly, resulting in an increase in parasitic capacitance Cgs, which in turn leads to creation of an adverse effect that the pixel electrode potential Vs can readily receive the influence of the gate (scan) signal Vg. However, provision of the storage capacitor Cstg makes it possible to avoid this problem.

<<Manufacturing Method>>

An explanation will next be given of a method of manufacturing the substrate SUB1 of the above-mentioned liquid crystal display device with reference to FIG. 12 to FIG. 14. Note that in these drawings, the characters centrally indicated therein are process names abbreviated, wherein a flow of fabrication process steps is shown while indicating on its left side a cross-section of the thin-film transistor TFT part shown in FIG. 3 along with a cross-section at or near the gate terminal shown in FIG. 7 on the right side. Except for a process step B and step D, step A-step I are partitioned in a way corresponding to each photographic processing, wherein any one of such process steps indicates the stage where the fabrication processing after the photographic process has been completed with a photoresist removed already. Note that the term "photographic processing" as used herein refers to a series of operations from deposition of a photoresist through selective exposure using a mask up to development thereof, and any repetitive explanation thereof will be eliminated. An explanation will be given in accordance with the process steps thus partitioned.

Figure 12:
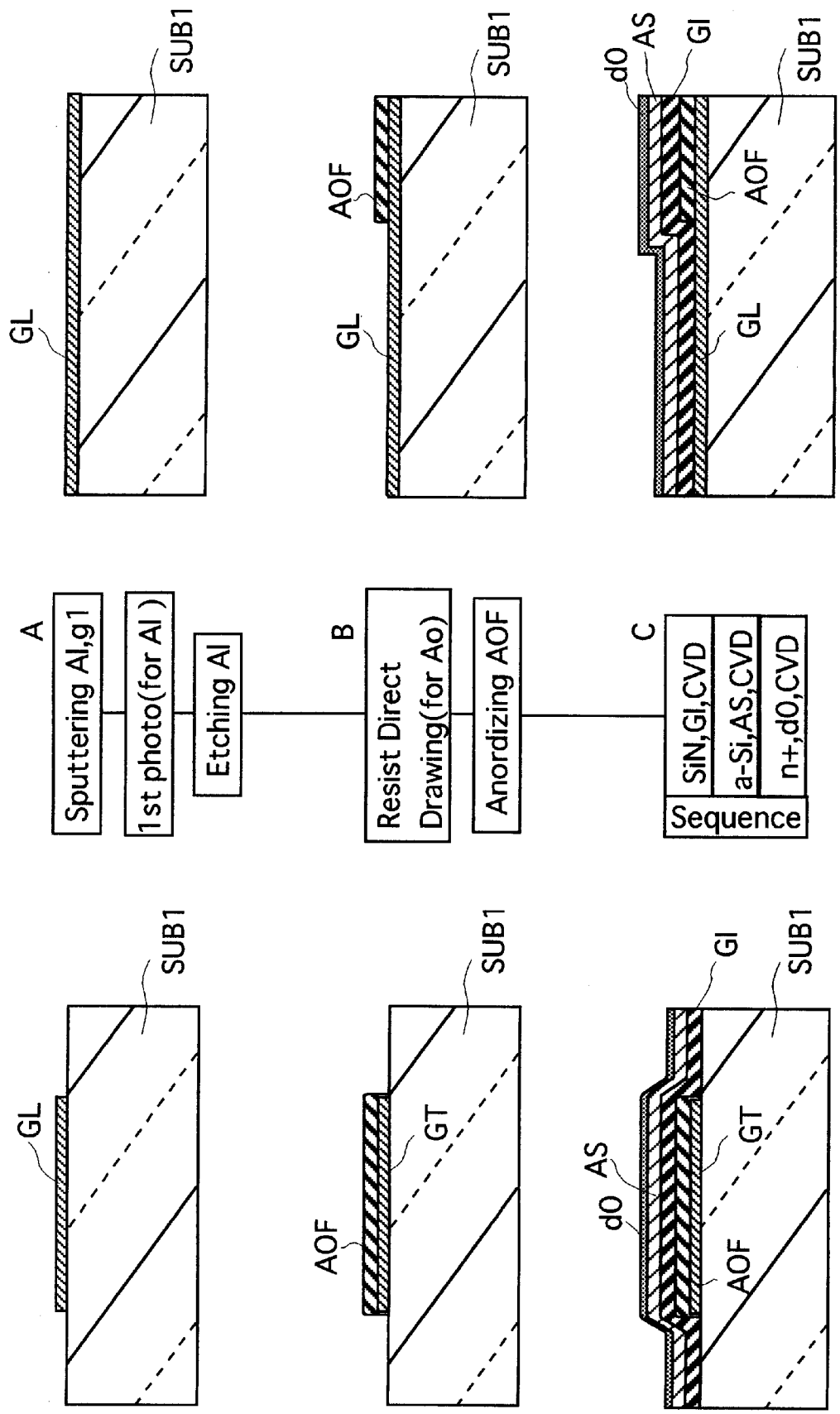
FIG. 12 is a flow chart showing some major steps A–C in the manufacture of a substrate SUB1 side part along with corresponding sectional views of a pixel section and of a gate terminal section.

Step A, FIG. 12

A conductive film g1 that is made of Al—Pd, Al—Si, Al—Ta, Al—Ti—Ta, or the like, is provided by sputtering on the lower transparent glass substrate SUB1 comprised of AN635 glass (Trade Name), to a thickness of 3,000 Å. After having effected photographic processing, the conductive film g1 is selectively etched by use of a mixed acid liquid consisting of phosphoric acid and nitric acid plus glacial acetic acid. Thus, gate electrodes GT, scan signal lines G1, counter electrodes CT, contra-voltage signal lines CL, electrodes PL1, gate terminals GTM, first conductive layer of common bus lines CB, first conductive layer of counter electrode terminals CTM, anodized bus lines SHg (not depicted) for connection of the gate terminals GTM, and anodized pads (not depicted) as connected to the anodized bus lines SHg are formed.

Step B, FIG. 12

After having formed an anodization mask AO due to direct painting, the substrate SUB1 is put into an anodization liquid that is comprised of a liquid of 3%-tartaric acid adjusted to a PH of 6.25±0.05 by ammonia, which liquid is in turn diluted to 1:9 using ethylene glycol liquid, to thereby perform an adjustment so that the formation current density is at 0.5 mA/cm² (constant current formation). Next, anodization is performed until it reaches the target formation voltage of 125V as required for achieving a predetermined $Al_2O_3$ film thickness. Thereafter, it is desirable that this condition be retained several tens of minutes (constant voltage formation). This is important for achieving a uniform $Al_2O_3$ film. Then, the conductive film g1 is anodized thereby forming an anodized film AOF, 1,800 Å thick, on the gate electrodes GT, scan signal lines G1, counter electrodes CT, contra-voltage signal lines CL and electrodes PL1.

Step C, FIG. 12

After having introduced into the plasma CVD apparatus an ammonia gas and shiran gas plus nitrogen gas to provide a Si nitride film of 2,200 Å thick, a shiran gas and hydrogen gas are introduced into the plasma CVD apparatus to provide an i-type amorphous Si film of 2,000 Å thick; and thereafter, a hydrogen gas and phosphine gas are introduced into the plasma CVD apparatus to thereby provide an N(+) type amorphous Si film to a thickness of 300 Å.

Figure 13:
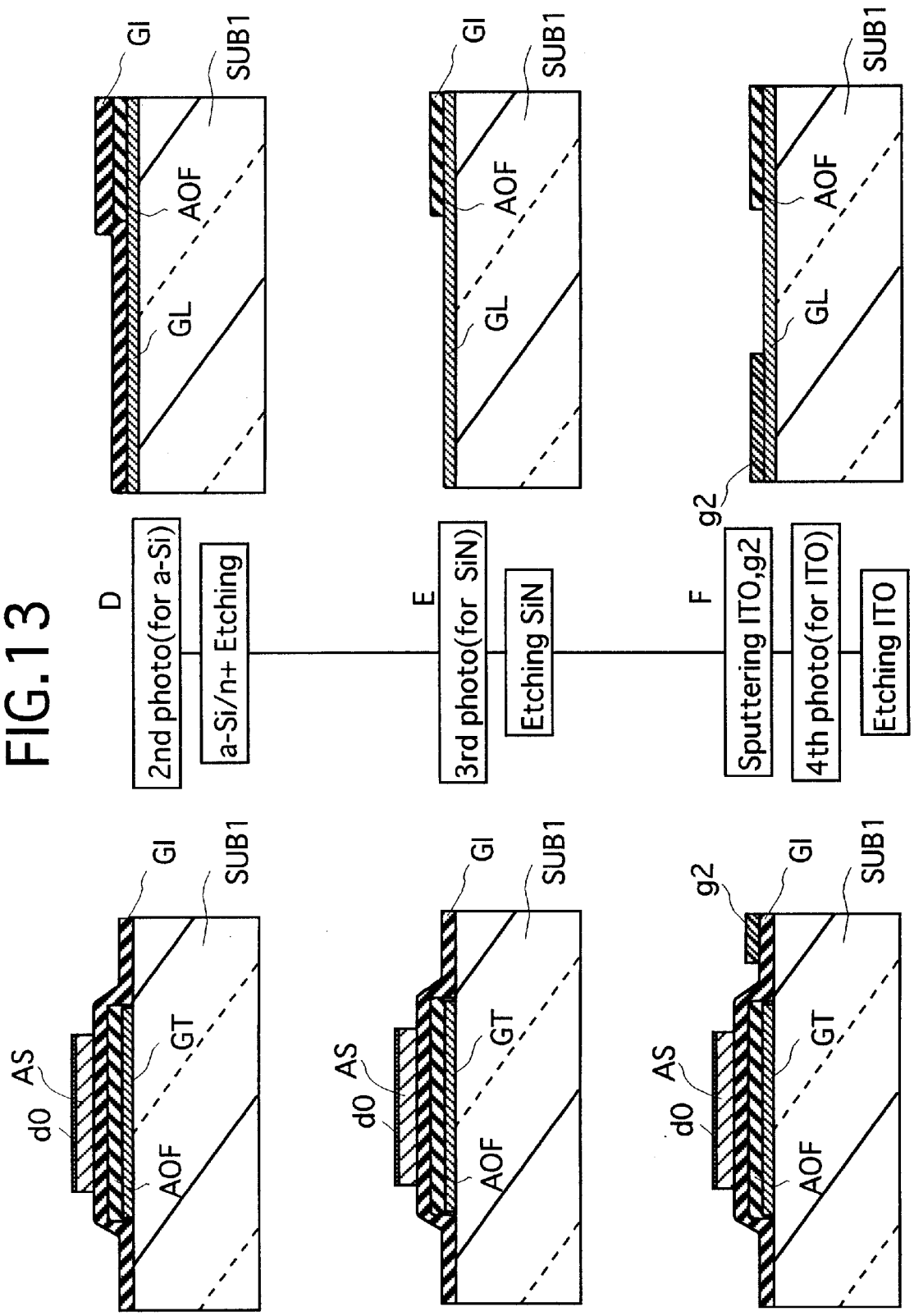
FIG. 13 is a flow chart showing some major steps D–F in the manufacture of the substrate SUB1 side part along with corresponding sectional views of the pixel section and gate terminal section.

Step D, FIG. 13

After having effected photographic processing, the N(+) type amorphous Si film and i-type amorphous Si film are selectively etched by using $SF_6$ and $CCl_4$ as dry etching gases to thereby form more than one island of i-type semiconductor layer AS.

Step E, FIG. 13

After the photographic processing, the Si nitride film is selectively etched by use of $SF_6$ as a dry etching gas.

Step F, FIG. 13

A transparent conductive film g2 made of an ITO film of 1,400 Å thickness is provided by sputtering. After photographic processing, the transparent conductive film g2 is selectively etched by using as etching liquid a mixed acid liquid of hydrochloric acid and nitric acid, thereby forming the uppermost layer of gate terminals GTM along with the second conductive layer of drain terminals DTM and counter electrode terminals CTM.

Figure 14:
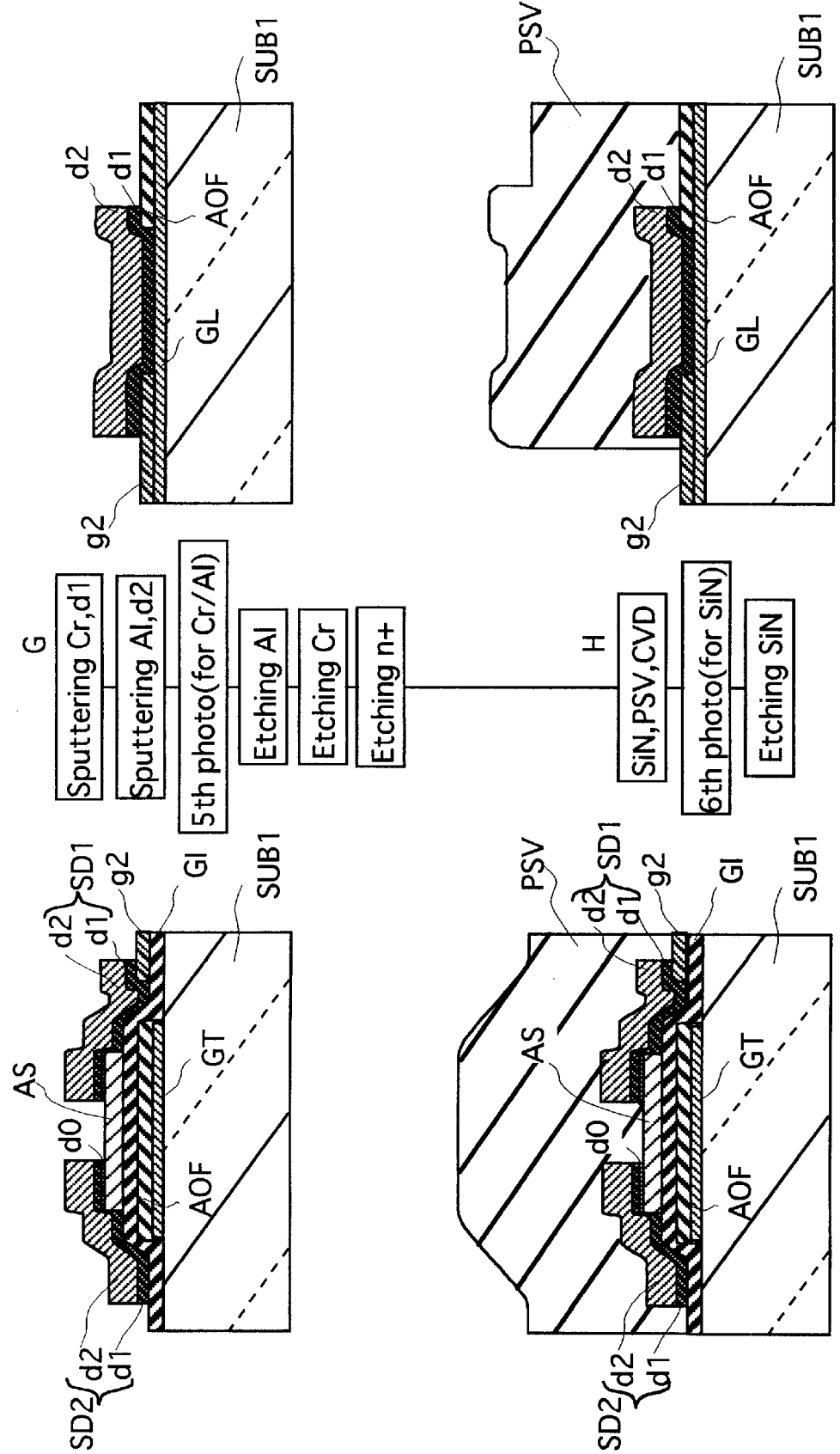
FIG. 14 is a flowchart showing some major steps G–H in the manufacture of the substrate SUB1 side part along with corresponding sectional views of the pixel section and gate terminal section.

Step G, FIG. 14

A conductive film d1 made of Cr is provided by sputtering to a thickness of 600 Å; and a conductive film d2, 4,000 Å thick, made of Al—Pd, Al—Si, Al—Ta, Al—Ti—Ta or the like is also provided by sputtering. After photographic processing, the same liquid as that used at the step B is used to etch the conductive film d2; then, the same liquid as that at the step A is used to etch the conductive film d1 to thereby form the second conductive layer, third conductive layer of image signal lines DL, source electrodes SD1, drain electrodes SD2, pixel electrodes PX, electrodes PL2 and common bus lines CB, along with more than one bus line SHd (not shown) for short-circuiting of the drain terminals DTM. Next, $CCl_4$ and $SF_6$ are introduced into the dry etching apparatus to etch the N(+) type amorphous Si film for selective removal of an N(+) type semiconductor layer d0 between the source and drain.

Step H, FIG. 14

An ammonia gas and shiran gas plus nitrogen gas are introduced into the plasma CVD apparatus to provide a 1 μm-thick Si nitride film. After photographic processing, a protective film PSV1 is formed by selectively etching the Si nitride film by photolithography techniques using $SF_6$ as a dry etching gas.

<<Display Panel PNL & Drive Circuit Board PCB1>>

Figure 15:
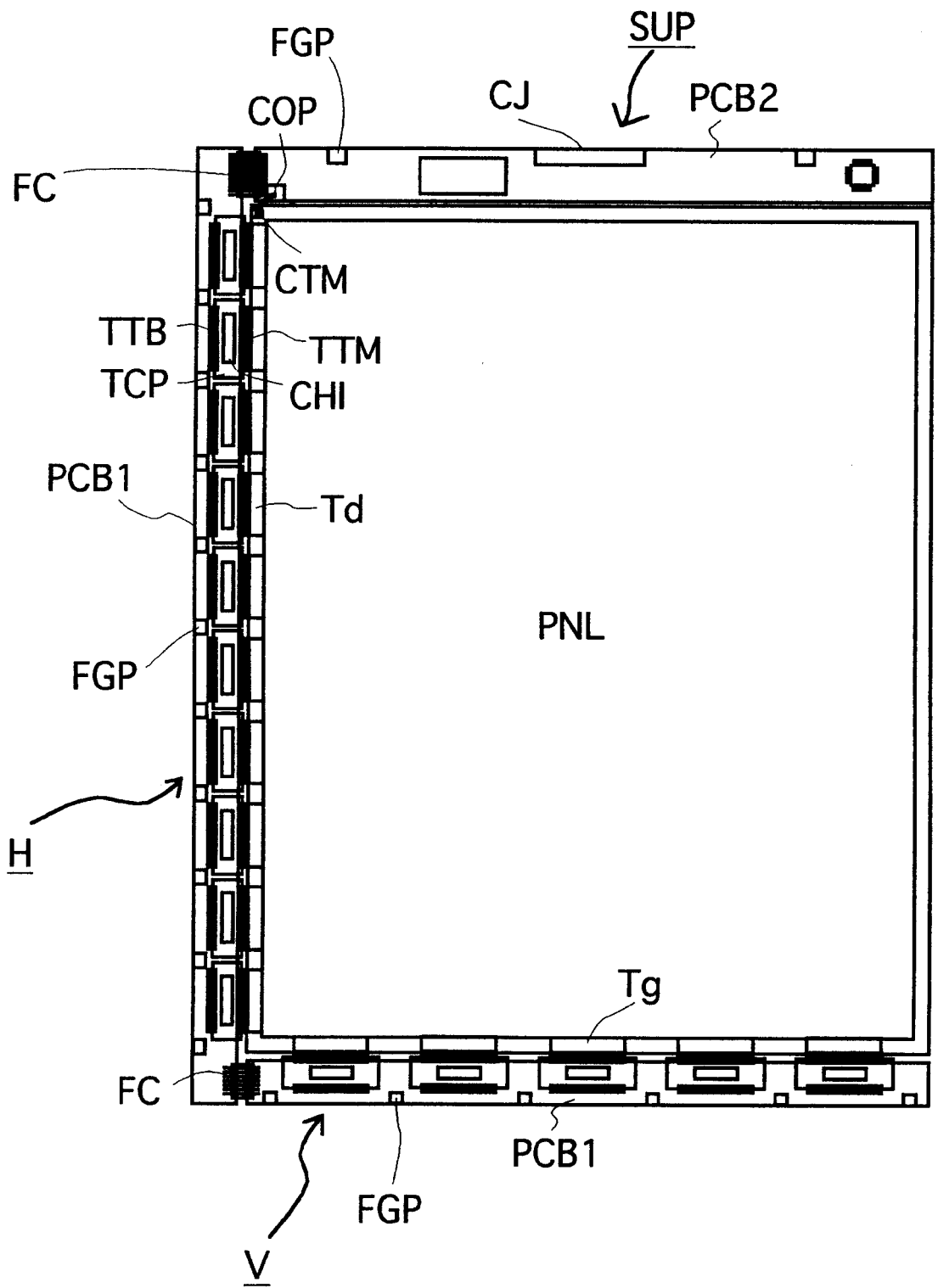
FIG. 15 is a diagrammatic top plan view showing the state in which peripheral drive circuitry is mounted on a liquid crystal display panel.

FIG. 15 is an upper-side plan-view showing the state in which the display panel PNL shown in FIG. 5 and the like is connected with an image signal drive circuit H and vertical scanning circuit V.

CH1 denotes driver IC chips for use in driving the display panel PNL (lower five ones are driver IC chips on the vertical scan circuit side, whereas every left-side group of ten are driver IC chips on the image signal drive circuit side). TCP denotes a tape carrier package with driver IC chips CHI mounted thereon by tape-automated bonding (TAB) methods as will be described later with reference to FIG. 16 and FIG. 17; and PCB1 is a driver circuit board with the TCP and capacitors mounted thereon, which is divided into two portions, one of which is for the image signal driver circuit and the other of which is for the scan signal driver circuit. FGP denotes frame ground pads to which spring-like fragments provided by cutting in a shield case SHD are to be soldered. FC denotes flat cables for electrical connection of the lower-side driver circuit board PCB1 and left-side driver circuit board PCB1. As shown in the drawing, the flat cables FC being employed are those which are each comprised of a plurality of lead lines (each made of Sn-metallized phosphor bronze) that are sandwiched between and supported by a stripe-shaped polyethylene layer and polyvinyl alcohol layer.

<<Connection Structure of TCP>>

Figure 16:
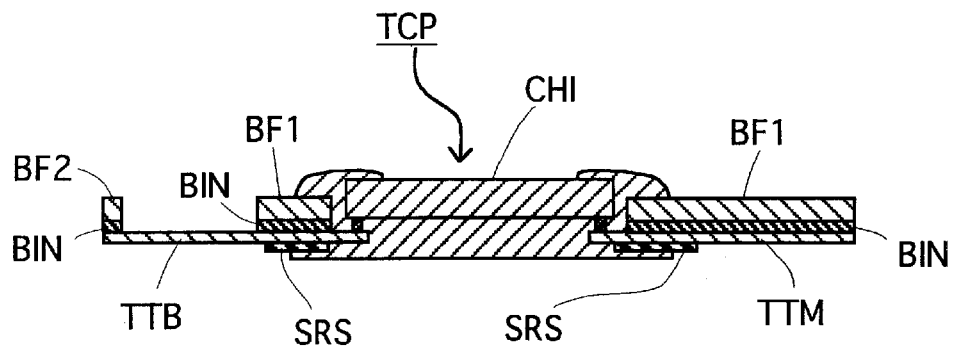
FIG. 16 is a diagrammatic sectional view of a tape carrier package TCP in which an integrated circuit chip CH1 constituting driver circuitry is mounted on a flexible printed circuit board.
Figure 17:
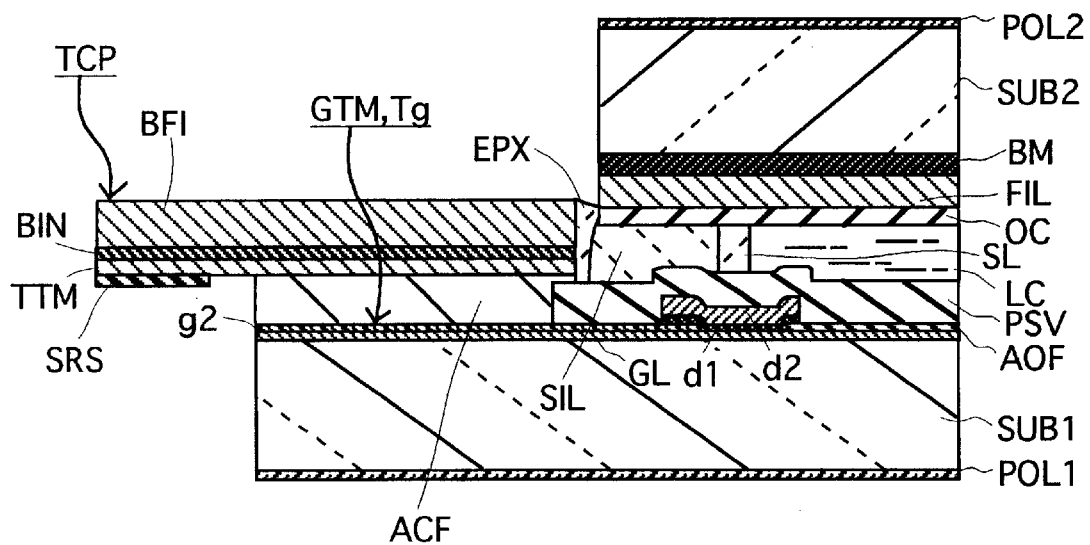
FIG. 17 is a main-part sectional view showing the state in which the tape carrier package TCP is connected to a scan signal circuit terminal GTM of a liquid crystal display panel PNL.

FIG. 16 is a diagram showing a sectional structure of the tape carrier package TCP wherein the integrated circuit chips CHI constituting the scan signal driver circuit V and image signal driver circuit H are mounted on a flexible printed circuit board; and FIG. 17 is a main-part sectional diagram showing the state of connecting them to the scan signal circuit terminals GTM of the liquid crystal display panel in this embodiment.

In the drawings, TTB denotes an input terminal/lead section of integrated circuit CHI, and TTM denotes an output terminal/lead section of integrated circuit CHI-for example, these are made of Cu, and bonding pads PAD of integrated circuits CHI are connected by so-called face-down bonding methods to respective inside distal end portions (generally called "inner leads"). Outside distal end portions of terminals TTB, TTM (generally called "outer leads") correspond to inputs and outputs of semiconductor integrated circuit chips CHI, respectively, which are connected by soldering or the like to CRT/TFT converter circuit/power supply circuit SUP and are connected by an anisotropic conductive film ACF to the liquid crystal display panel PNL. The package TCP has its distal end portion which is connected to the panel in such a way as to cover the protective film PSV1 that exposes the connection terminals GTM on the panel PNL side; thus, the external connection terminals GTM (DTM) are covered with at least one of the protective film PSV1 and the package TCP to thereby increase durability against electrolytic corrosion.

BF1 is a base film made of polyimide or the like; and SRS is a solder resist film for masking to prevent a solder from adhering to unwanted extra portions during the soldering processes. A gap space between the upper and lower glass substrates outside of the seal pattern SL is protected by an epoxy resin EPX after having effected cleaning treatment, wherein a silicon resin SIL is further filled between the package TCP and the upper-side substrate SUB2 for multiplexing of protection.

<<Driver Circuit Board PCB2>>

A driver circuit board PCB2 is designed to have mounted thereon electronics parts or components including ICs and capacitors as well as resistors. Also mounted on this driver circuit board PCB2 are a power supply circuit for obtaining a plurality of stabilized voltage sources voltage-divided from a single voltage source along with circuitry SUP that includes a circuit for converting information for a CRT (cathode-ray tube) from the host (upper-level arithmetic processing device) into information for use with the TFT liquid crystal display device. CJ denotes a connector connect section to which a connector, not shown, to be connected to the outside will be connected.

The driver circuit board PCB1 and driver circuit board PCB2 are electrically connected together by one or more flat cables FC.

<<Overall Arrangement of Liquid Crystal Display Module>>

Figure 18:
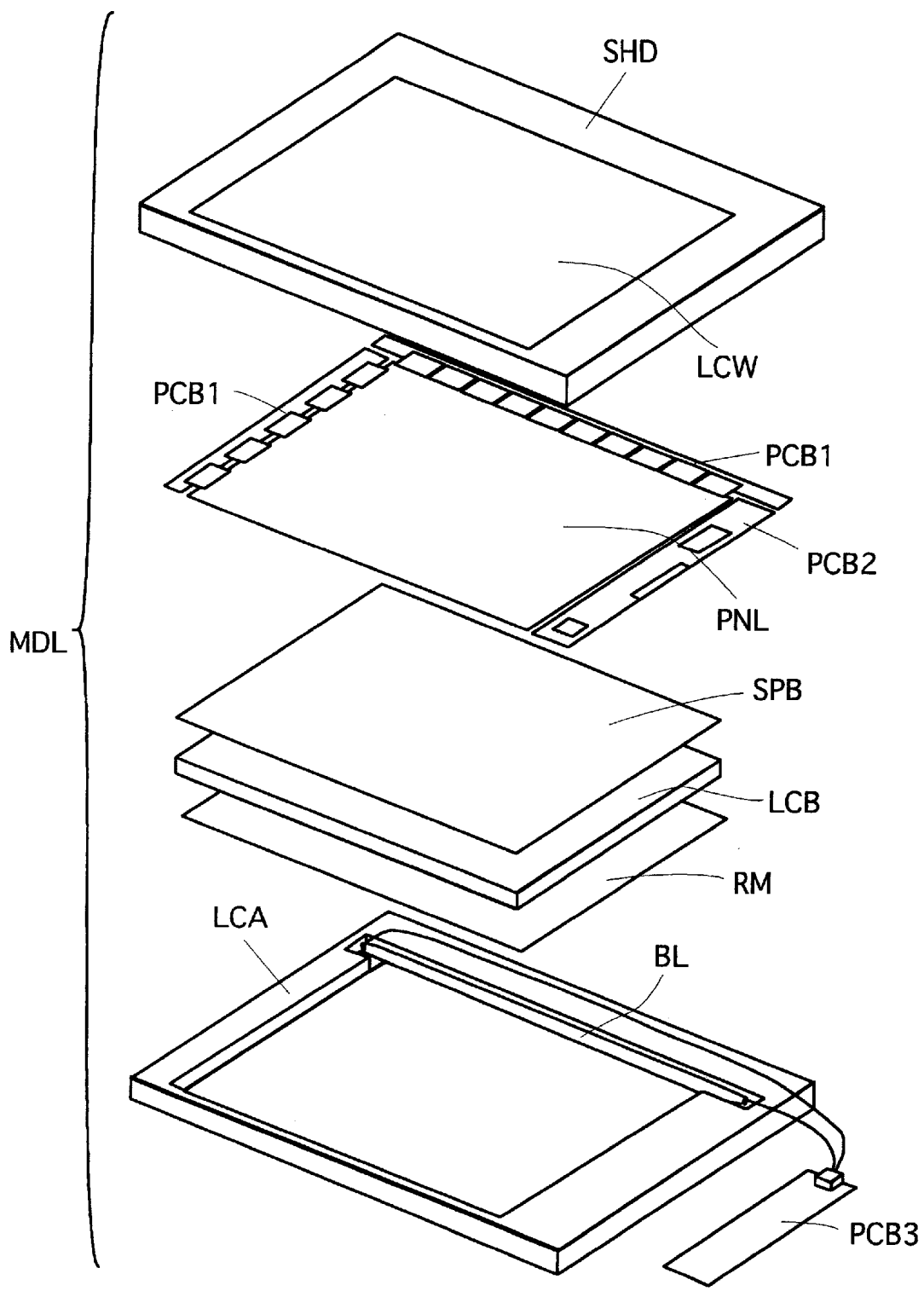
FIG. 18 is an exploded perspective view of a liquid crystal display module.

FIG. 18 is an exploded perspective view showing respective components or elements of a liquid crystal display module MDL.

SHD is a frame-like shield casing (metal frame) formed of a metal plate; LCW is its display window; PNL, a liquid crystal display panel; SPB, an optical diffusion plate; LCB, a photoconductor RM, a reflector plate; BL, a backlight fluorescent tube; LCA, a backlight casing, wherein respective members are laminated or stacked in the layout relationship shown in the drawing for assembly of the module MDL.

The module MDL is arranged so that the entire device is fixed by more than one nail-and-hook combination as provided at the shield case SHD.

The backlight case LCA has a shape that permits internal accommodation of the backlight fluorescent tube BL and optical diffusion plate SPB plus photoconductor LCB as well as reflector plate RM, whereby the photoconductor LCB and reflector plate RM plus optical diffusion plate SPB convert the light from the backlight fluorescent tube BL as disposed along the lateral plane of the photoconductor LCB into uniform or coherent backlight on the display plane for outward projection toward the liquid crystal display panel PNL.

The backlight fluorescent tube BL is operatively associated with an inverter circuit board PCB3 connected thereto thus providing a power supply of the backlight fluorescent tube BL.

As apparent from the foregoing, in this embodiment, making the pixel electrodes transparent enables the maximum optical transmissivity to improve by approximately 30% (31.8% in this embodiment) during white displaying.

More practically, with this embodiment, the optical transmissivity was improved from approximately 3.8% obtained when employing opaque pixel electrodes up to about 5.0% as a result of employment of transparent pixel electrodes.

Additionally, it becomes possible to simultaneously fabricate the ITO film for improvement of the reliability of the elements concerned, which in turn makes it possible to achieve both increased reliability and productivity at the same time.

(Embodiment 2)

Figure 20:
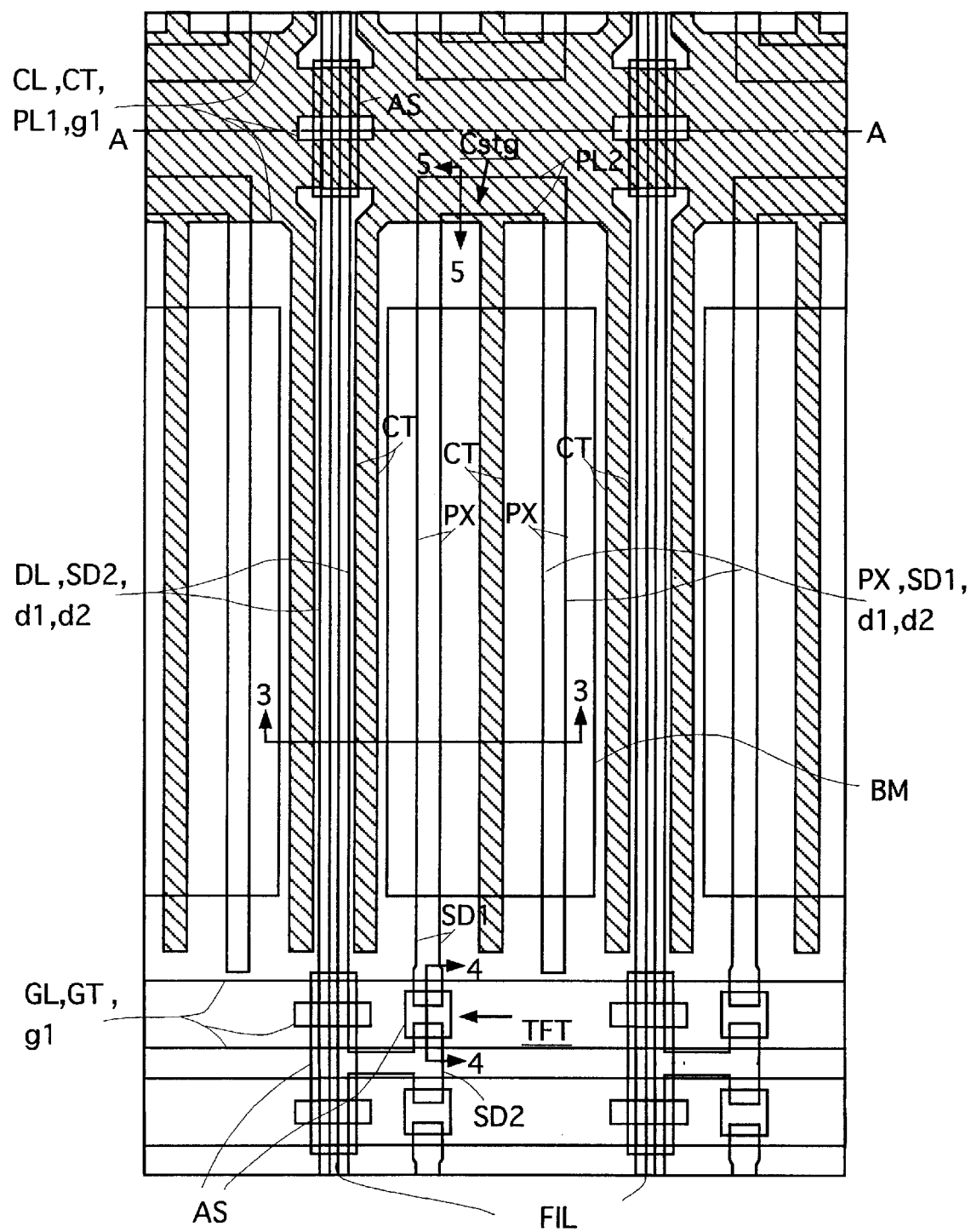
FIG. 20 is a main-part plan view showing one pixel along with its outlying part of a liquid crystal display section of an active-matrix color liquid crystal display device of an embodiment 2 of the present invention.

This embodiment is the same as the embodiment 1 stated above except for the following points. A plan view diagram of pixels is shown in FIG. 20. Hatched portions in the drawing designate a transparent conductive film g2.

<<Pixel Electrode PX>>

In this embodiment the pixel electrode PX is constituted from a second conductive film d2 that is the same in layer as the source electrode SD1 and drain electrode SD2, and a third conductive layer d3. In addition, the pixel electrode PX is formed integrally with the source electrode SD1.

<<Counter Electrode CT>>

In this embodiment the counter electrode CT is comprised of a transparent conductive film g2. This transparent conductive film g2 is made of a sputtering-fabricated transparent conductive film (Indium-Tin-Oxide ITO: Nesa film) as in the embodiment 1, and is formed to a thickness ranging from 100 to 2,0000 Å (in this embodiment, a film thickness of about 1,400 Å).

<<Contra-voltage Signal Line CL>>

The contra-voltage signal line CL is formed by a transparent conductive film g2, and is designed so that it is integral with the counter electrode CT.

<<Gate Terminal Section>>

In this embodiment, the transparent conductive layer g2 for protection of the surface of an Al layer g1 of gate terminal GTM, while improving the reliability of connection with the TCP (Tape Carrier Package, is formed at the same step with the forming of counter electrode CT. The arrangement is identically the same as that of embodiment 1, and is as shown in FIGS. 7A, 7B.

<<Drain Terminal DTM>>

In this, embodiment the transparent conductive layer g2 of drain connection terminals DTM is made of a transparent conductive film ITO that was formed simultaneously during formation of counter electrodes CT, as in the case of the gate terminals GTM. While the arrangement is slightly different from embodiment 1 in the up/down relationship of layers involved, such difference is not essential and for this reason its illustration is omitted herein.

<<Counter Electrode Terminal CTM>>

The transparent conductive layer g2 overlying the conductive layer g1 of counter electrode terminals CTM is comprised of a transparent conductive film ITO that was formed at the same process step with the forming of counter electrodes CT, in a way similar to that of other terminals. The arrangement is no longer dissimilar to that of embodiment 1, and is as shown in FIGS. 9A, 9B.

<<Manufacturing Method>>

In this embodiment the process order is such that the step F is between the step B and step C of the embodiment 1. For the order of processes, the process order of from FIG. 12 to FIG. 15 becomes the order of A→B→F→C→D→E→G→H. The mask pattern is such that the scan signal line G1, scan electrode GT and contra-voltage signal line CL are separated while a pattern of the transparent conductive layer g2 of each terminal and a pattern of the contra-voltage signal line CL are formed in the same mask.

With such an arrangement, letting the counter electrode be transparent makes it possible to improve the maximum transmissivity by about 16% (in this embodiment 15.9%), which in turn permits the transmissivity of the liquid crystal display panel PNL to become 4.4%, or more or less.

(Embodiment 3)

Figure 21:
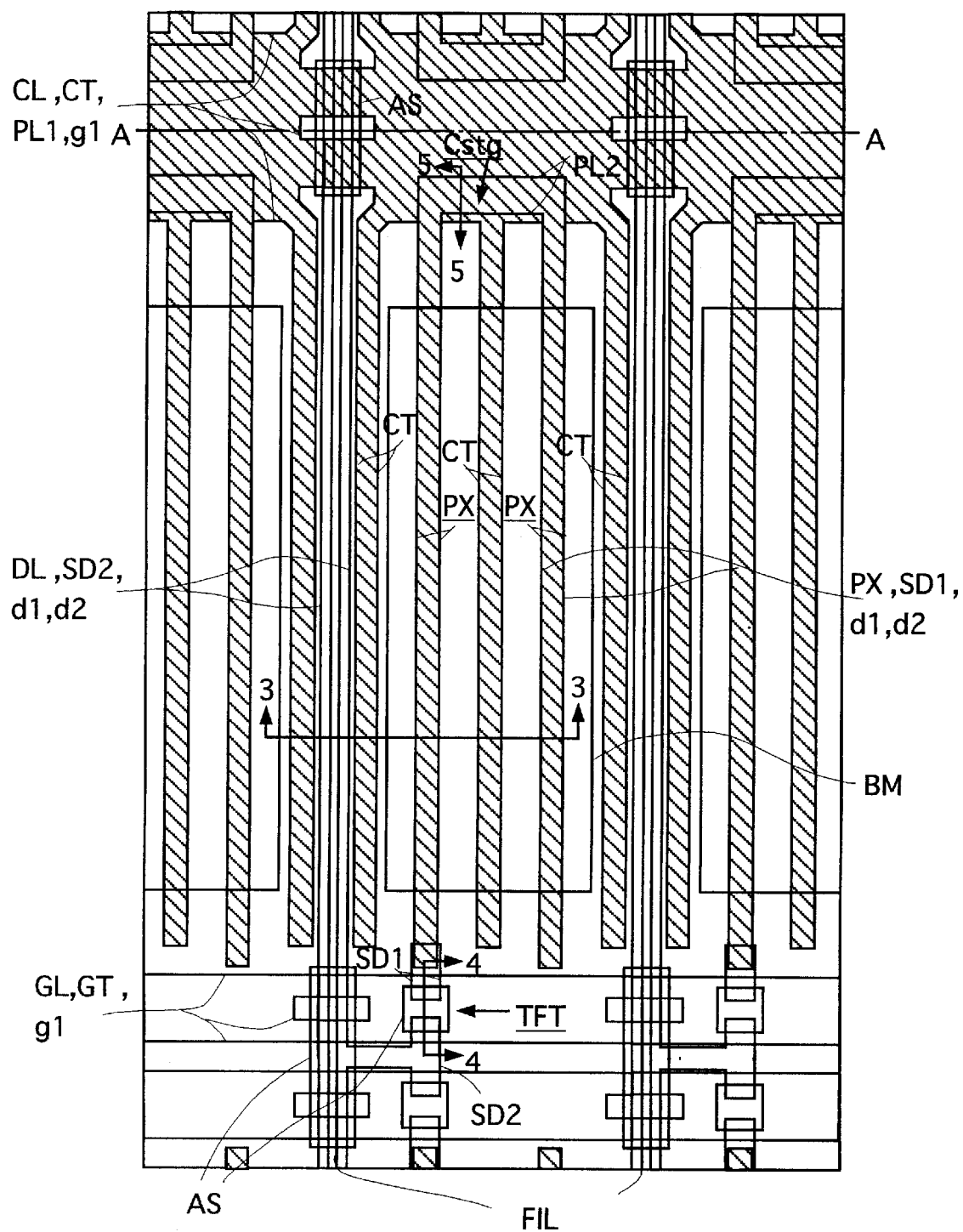
FIG. 21 is a main-part plan view showing one pixel along with its outlying part of a liquid crystal display section of an active-matrix color liquid crystal display device of an embodiment 3 of the present invention.

This embodiment is the same as the embodiment 1 and embodiment 2 except for the following points. A plan view diagram of pixels is shown in FIG. 21. Hatched portions in the drawing indicate a transparent conductive film g2.

<<Counter Electrode CT>>

In this embodiment the counter electrode CT is comprised of a transparent conductive film g2. This transparent conductive film g2 is made of a sputtering-fabricated transparent conductive film (Indium-Tin-Oxide ITO: Nesa film) as in the embodiment 1, and is formed to a thickness of from 100 to 2,000 Å (in this embodiment, a film thickness of about 1,400 Å).

<<Contra-voltage Signal Line CL>>

The contra-voltage signal line CL is formed of a transparent conductive film g2, and is designed so that it is integral with the counter electrode CT.

<<Manufacturing Method>>

In this embodiment the order of process steps is such that the step F is added between the step B and step C of embodiment 1. For the order of processes, the process order of from FIG. 12 to FIG. 15 becomes the order of A→B→F→C→D→E→F→G→H. The mask pattern is such that a pattern of the scan signal line G1 and scan electrode GT and that of the contra-voltage signal line CL are formed in independent masks.

With this embodiment, letting both the pixel electrode and the counter electrode be transparent makes it possible to further improve the maximum transmissivity during white displaying by about 50% (in this embodiment 47.7%) beyond the embodiment 1 or embodiment 2, resulting in the liquid crystal display panel PNL being about 5.6% in transmissivity.

(Embodiment 4)

Figure 22:
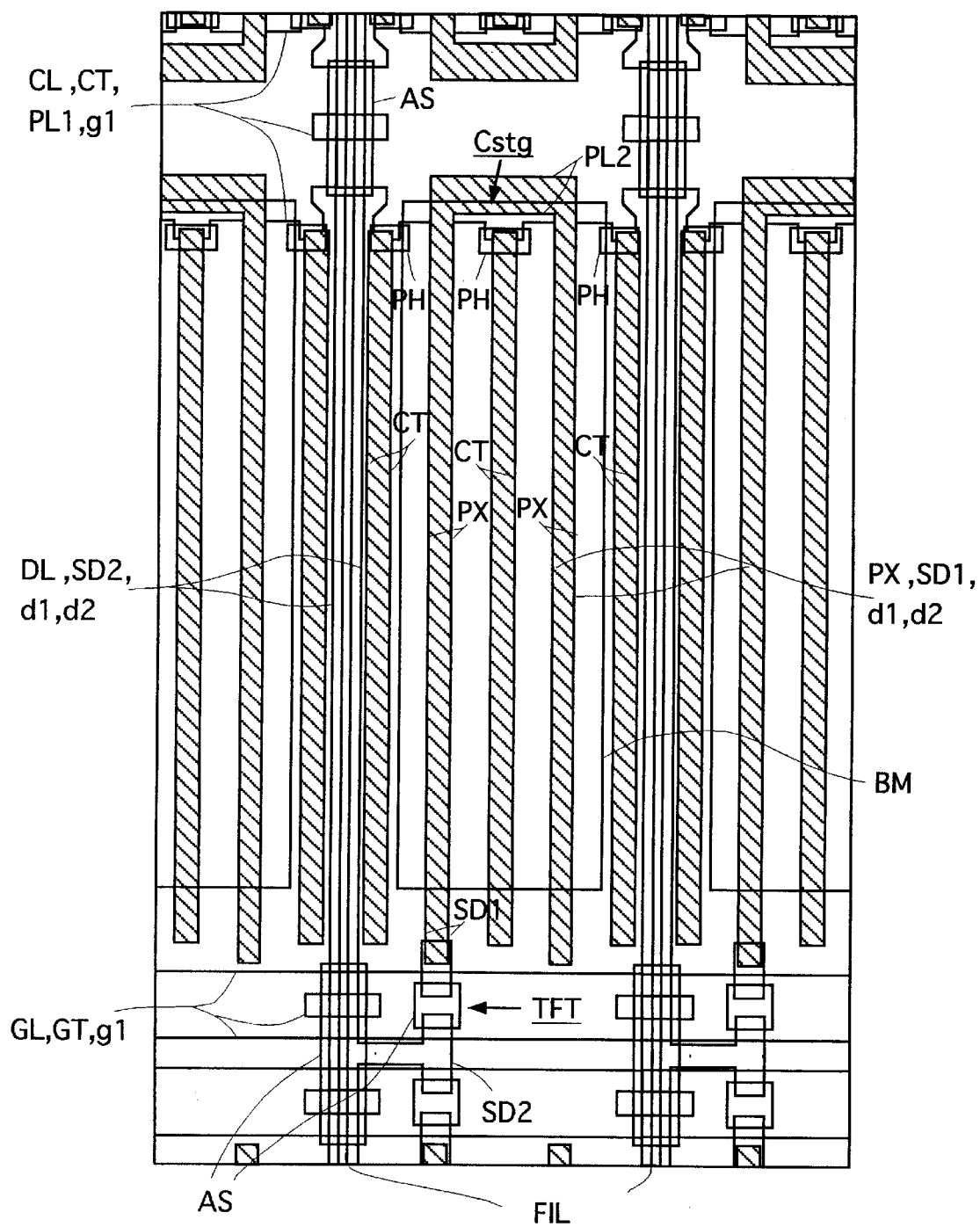
FIG. 22 is a main-part plan view showing one pixel along with its outlying part of a liquid crystal display section of an active-matrix color liquid crystal display device of an embodiment 4 of the present invention.

This embodiment is the same as the embodiment 1 and embodiment 3 except for the following points. A plan view diagram of pixels is shown in FIG. 22. Hatched portions in the drawing indicate a transparent conductive film g2.

<<Contra-voltage Signal Line CL>>

The contra-voltage signal line CL is comprised of a conductive transparent film g1. In this embodiment, Cr is used for the conductive film g1. Additionally, in order to connect between the contra-voltage signal line CL and the counter electrode CT, anodization is not carried out. In addition, a through-hole PH is formed in the gate insulation film GI. In addition, the conductive film g1 may be made from Ta, Ti, Mo, W, Al or an alloy thereof other than Cr, or alternatively it may be formed of a clad structure including a lamination of elements.

<<Manufacturing Method>>

In this embodiment the step B of the embodiment 1 is deleted. In addition, the through-hole PH is formed at the step E while forming both the pixel electrode PX and the counter electrode CT simultaneously using the same mask.

In this embodiment, in addition to the effects of the embodiment 1 and embodiment 3, reducing the resistivity of the contra-voltage signal line CL provides for a smooth transmission of a voltage between counter electrodes; and reducing the voltage distortion makes it possible to suppress crosstalk (lateral smear) occurring in the horizontal direction.

In addition, forming the pixel electrode PX and counter electrode CT simultaneously using the same mask permits the step F as performed two times in the embodiment 4 to be formulated into a single step, thereby improving the productivity as well.

(Embodiment 5)

Figure 23:
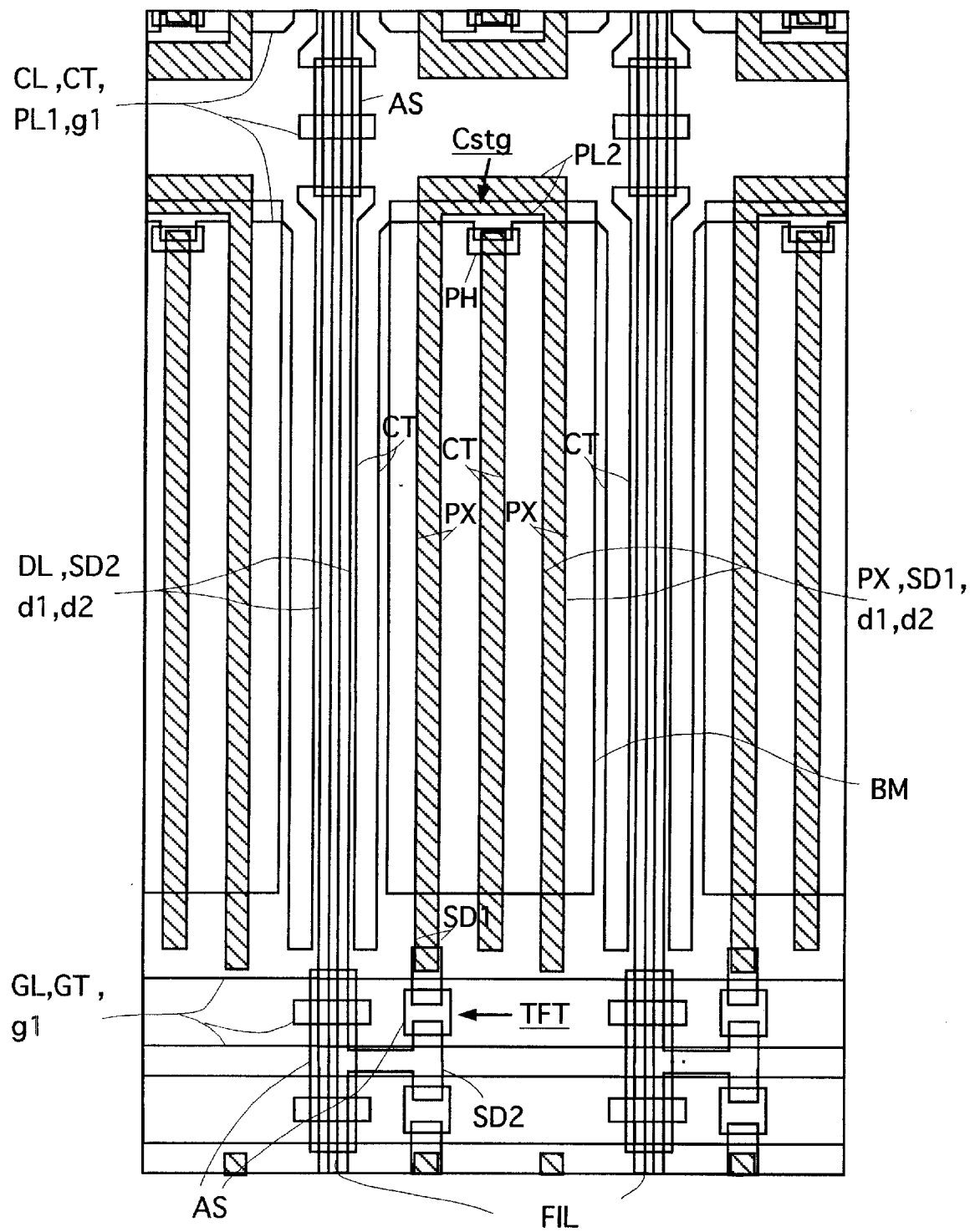
FIG. 23 is a main-part plan view showing one pixel along with its outlying part of a liquid crystal display section of an active-matrix color liquid crystal display device of an embodiment 5 of the present invention.

This embodiment is the same as the embodiment 1 and embodiment 4 except for the following points. A plan view diagram of pixels is shown in FIG. 23. Hatched portions in the drawing indicate a transparent conductive film g2.

<<Counter Electrode CT>>

In this embodiment, only the central counter electrode CT is made of a transparent conductive film g2. Those counter electrodes that neighbor image signal lines are each formed of a metal film in a way integral with the contra-voltage signal lines.

In this embodiment, in addition to the effects of the embodiment 1 and embodiment 4, it becomes possible by making opaque the counter electrodes neighboring the image signal lines to suppress crosstalk associated with image signals. The reason for this is as indicated in the section of the operation.

(Embodiment 6)

A respective one of the embodiments 2 and 3 is arranged such that both the counter electrode signal line CL and the counter electrode CT are formed of the transparent conductive layer g2.

Figure 24A:
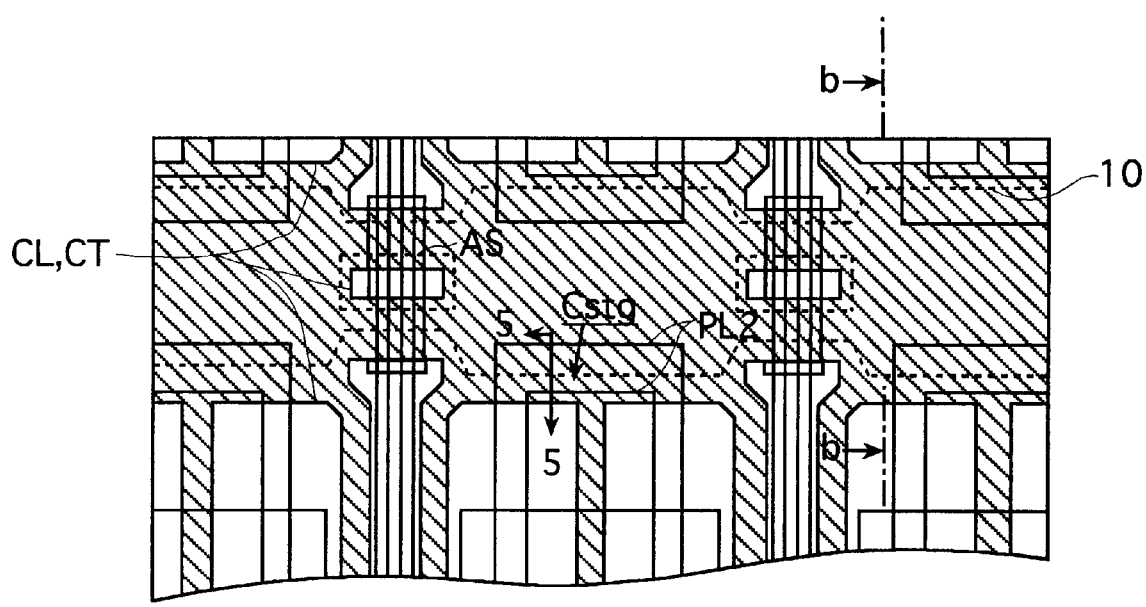
FIGS. 24A–C are partial main-part plan view, a sectional view and a main-part plane view, respectively, which show one pixel along with its outlying part of a liquid crystal display section of an active-matrix color liquid crystal display device of an embodiment 6 of the present invention.
Figure 24B:
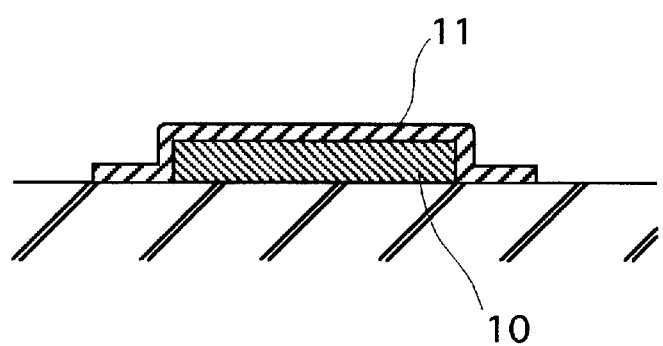
Figure 24C:
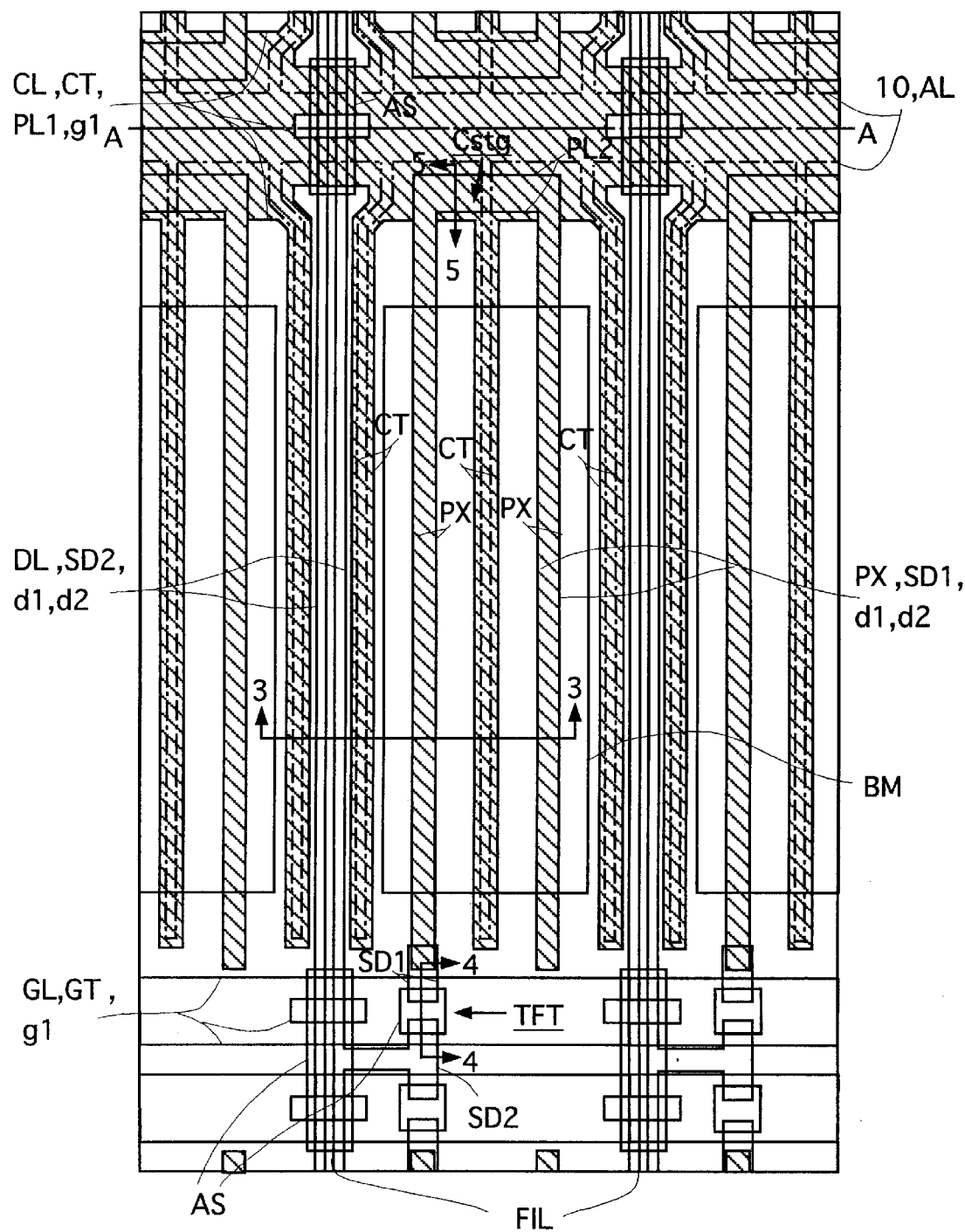

In this case, this embodiment is able to achieve significant reduction of the resistance value of the counter electrode signal line CL by employing an arrangement shown in. FIGS. 24A–C.

FIG. 24A is a plan view diagram showing part of the counter electrode signal line CL of FIG. 20, while FIG. 24B is a sectional diagram taken along line b—b of FIG. 24A.

In the drawing, a difference from FIG. 20 is that the counter electrode signal line CL consists of a double-layer structure, wherein an Al layer 10 that is less in resistance value is formed as its lower layer with an ITO film 11 formed overlying this Al layer 10 so that it completely covers the Al layer 10. And, the counter electrode CT is constituted from an extension portion of said ITO film 11.

With such an arrangement, it is possible to achieve reduction of the resistivity of the counter electrode signal line CL while at the same time preventing electrical short-circuiting between it and another conductive layer (e.g. image signal line DL) through an interlayer dielectric film due to the presence of a beard-like projection, called a whisker, which occurs in the Al layer 10.

More specifically, while it has been known that the Al layer 10 would experience generation of a whisker during fabrication of the interlayer dielectric film overlying the layer with respect to the image signal line DL resulting in creation of the harmful effect stated above, it has been affirmed that such whisker production will no longer take place when forming the ITO film to completely cover this Al layer 10.

Furthermore, in FIG. 24C the counter electrode CT is constituted from a double or duplex lead-in this embodiment, a lead of an ITO film 11 is formed covering a lead of the Al layer 10. Because the vicinity of the center line of such lead is low in transmissivity even where a voltage is applied between electrodes, any aperture ratio reduction will hardly occur even where an opaque metal lead is disposed as in this example.

By employing the duplex lead for either the counter electrode or the pixel electrode, it is possible to greatly suppress open circuit defects of electrodes which will become problematic in large-size screens.

(Embodiment 7)

<<Active-Matrix Liquid Crystal Display Device>>

An explanation will be given of an embodiment which applies the present invention to an active-matrix color liquid crystal display device. Note here that in the drawings to be explained below, those elements having the same functions are designated by the same reference characters, and any repetitive explanation thereof will be omitted.

<<Planar Arrangement of Matrix Section (Pixel Section)>>

Figure 25:
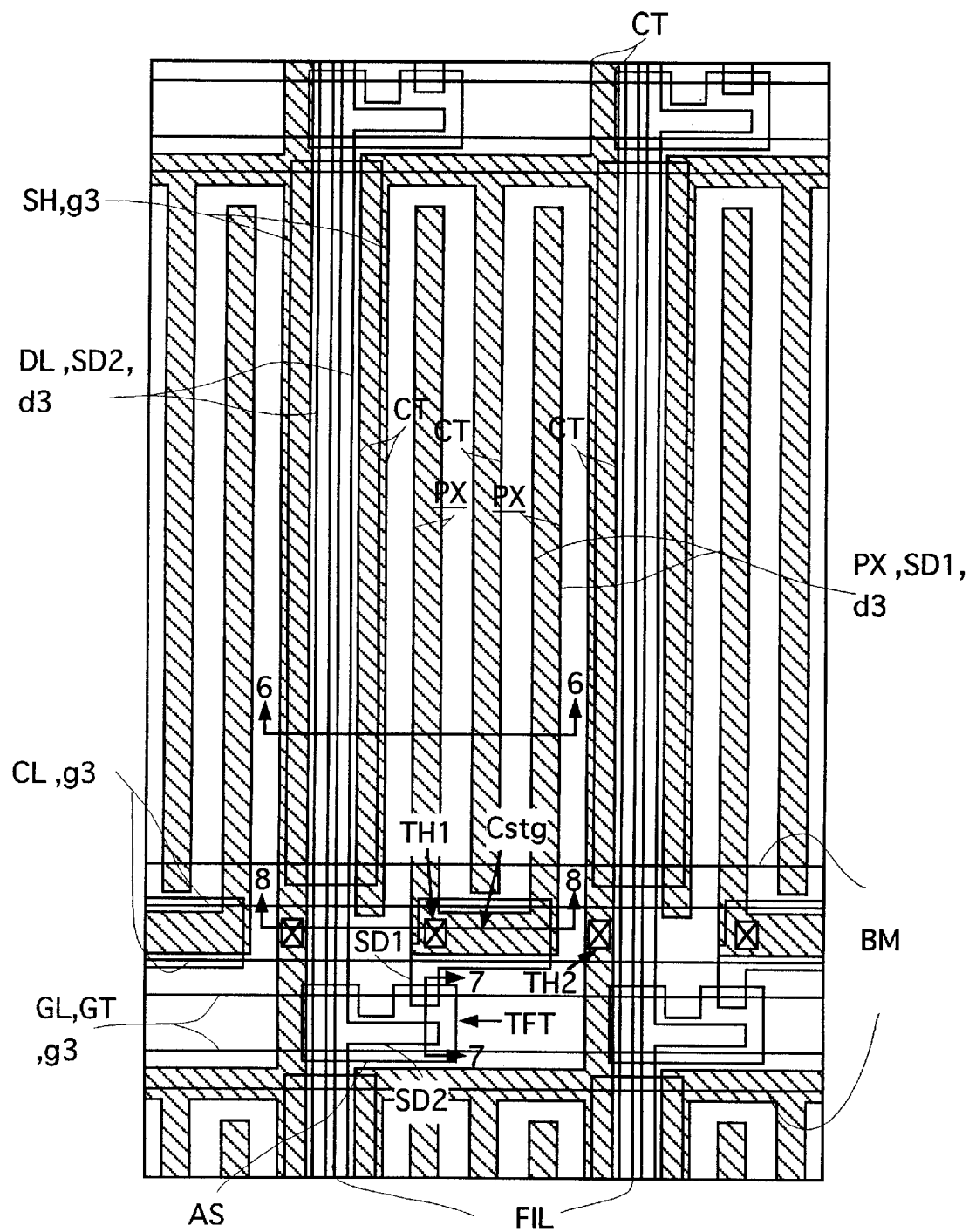
FIG. 25 is a main-part plan view showing one pixel along with its outlying part of a liquid crystal display section of an active-matrix color liquid crystal display device of an embodiment 7 of the present invention.

FIG. 25 is a plan view diagram showing one pixel along with the nearby portions of the active-matrix color liquid crystal display device of the present invention. (Hatched portions in the drawing designate a transparent conductive film i1).

As shown in FIG. 25, each pixel is disposed within a crossover or intersection region (within a region surrounded by four signal lines) of a scan signal line (gate signal line or horizontal signal line) G1, a contra-voltage signal line (counter electrode lead) CL, and two neighboring image signal lines (drain signal lines or vertical signal lines) DL. Each pixel includes a thin-film transistor TFT, storage capacitor Cstg, pixel electrode PX, and counter electrode CT. The scan signal line G1 and contra-voltage signal line CL extend laterally in the drawing, and a plurality of similar lines are disposed in the up/down direction. The image signal line DL extends in the up/down direction, and plural similar lines are disposed in the lateral direction. The pixel electrode PX is formed of a transparent conductive film i1 and is electrically connected to the thin-film transistor TFT via a source electrode SD1; and the counter electrode CT also is formed of the transparent conductive film i1 and is electrically connected to the contra-voltage signal line CL.

The pixel electrode PX and the counter electrode CT are designed to oppose each other for control of the optical state of a liquid crystal LC by using an electric field between each pixel electrode PX and counter electrode CT to thereby control the display. The pixel electrode PX and counter electrode are arranged to have a comb-like shape, each of which becomes an elongate electrode in the up/down direction of the drawing.

The line number 0 of counter electrodes CT within a single pixel is designed so that it has the relation of O=P+1 with no exceptions with respect to the line number (number of comb teeth) of pixel electrodes PX (in this embodiment, O=3, and P=2). This setup is in order to alternately dispose the counter electrodes CT and pixel electrodes PX and also force a counter electrode CT to neighbor an image signal line DL with no exceptions. In this way, it becomes possible for the counter electrode CT to shield electric flux lines from such image signal line DL to ensure that an electric field between the counter electrode CT and pixel electrode PX receive no influence from an electric field created from the image signal line DL. As counter electrodes CT are constantly supplied with a voltage potential from the outside via contra-voltage signal lines CL to be described later, the potential remains stabilized. Due to this, even when adjacent to the image signal line DL, any potential variation hardly occurs. In addition, due to this, the geometric position of the pixel electrode PX becomes far from the image signal line DL; therefore, any possible parasitic capacitance between the pixel electrode PX and image signal line DL decreases significantly, thereby also enabling suppression of variation of a pixel electrode potential Vs due to an image signal voltage(s). These characteristics in turn make it possible to suppress crosstalk (image quality defects called the longitudinal smear) occurring in the up/down direction.

Let each pixel electrode PX and counter electrode CT be 6 μm in electrode width. This is in view of the fact that a sufficiently larger value than the thickness, 3.9 µm, of a liquid crystal layer to be later described is set in order to apply a sufficient electric field to the entire liquid crystal layer with respect to the thickness direction of the liquid crystal layer while letting it be as fine as possible in order to enlarge the aperture ratio. In addition, the electrode width of image signal lines DL is 8 µm, which is slightly wider than that of pixel electrodes PX and counter electrodes CT in order to prevent an open circuit. Here, the electrode width of image signal lines DL is set at a specified value that is less than or equal to twice the electrode width of the neighboring counter electrode CT. Alternatively, in cases where the electrode width of image signal lines DL was determined from the productivity of the yield, the electrode width of counter electrodes CT that neighbor image signal lines DL is set to be greater than or equal to half of the electrode width of image signal lines DL. This is in order to allow the counter electrodes CT on both sides to absorb electric flux lines generated from image signal lines DL respectively. For good absorption of electric flux lines produced from a certain electrode width, it is required to use an electrode that has its electrode width equal to or wider than such certain electrode width. Accordingly, by taking into consideration that the counter electrodes CT on both sides may absorb those electric flux lines generated from half (4 µm for each) of the electrode of an image signal line DL respectively, the electrode width of a counter electrode CT neighboring upon an image signal line DL is set to be greater than or equal to ½. This eliminates generation of crosstalk due to the influence of image signals—in particular, in the up/down direction (longitudinal crosstalk).

Scan signal lines G1 are designed to have an electrode width set to satisfy the resistance value that permits a scanning voltage to be sufficiently applied to the gate electrode GT of a pixel on the terminate end side (on the opposite side of a scan electrode terminal GTM to be described later). Regarding contra-voltage signal lines CL also, the electrode width is set to satisfy the resistance value that permits a contra-voltage to be sufficiently applied to the counter electrode CT of a terminate-end pixel (a pixel farthest from common bus lines CB1 and CB2 to be later described, i.e. a pixel lying midway between CB1 and CB2).

On the other hand, the electrode distance between a pixel electrode PX and counter electrode CT is varied with the liquid crystal material being used. This is in order to guarantee that, in view of the fact that the electric field intensity for achievement of the maximum transmissivity is different for different liquid crystal materials, the setup of the electrode distance as per a liquid crystal material lets the maximum transmissivity be obtainable within the range of the maximal amplitude of a signal voltage set by the withstanding voltage of the image signal drive circuit being used (signal-side driver). When using a liquid crystal display material to be described later, the electrode distance becomes 16 µm.

<<Sectional Structure of Matrix Section (Pixel Section)>>

Figure 26:
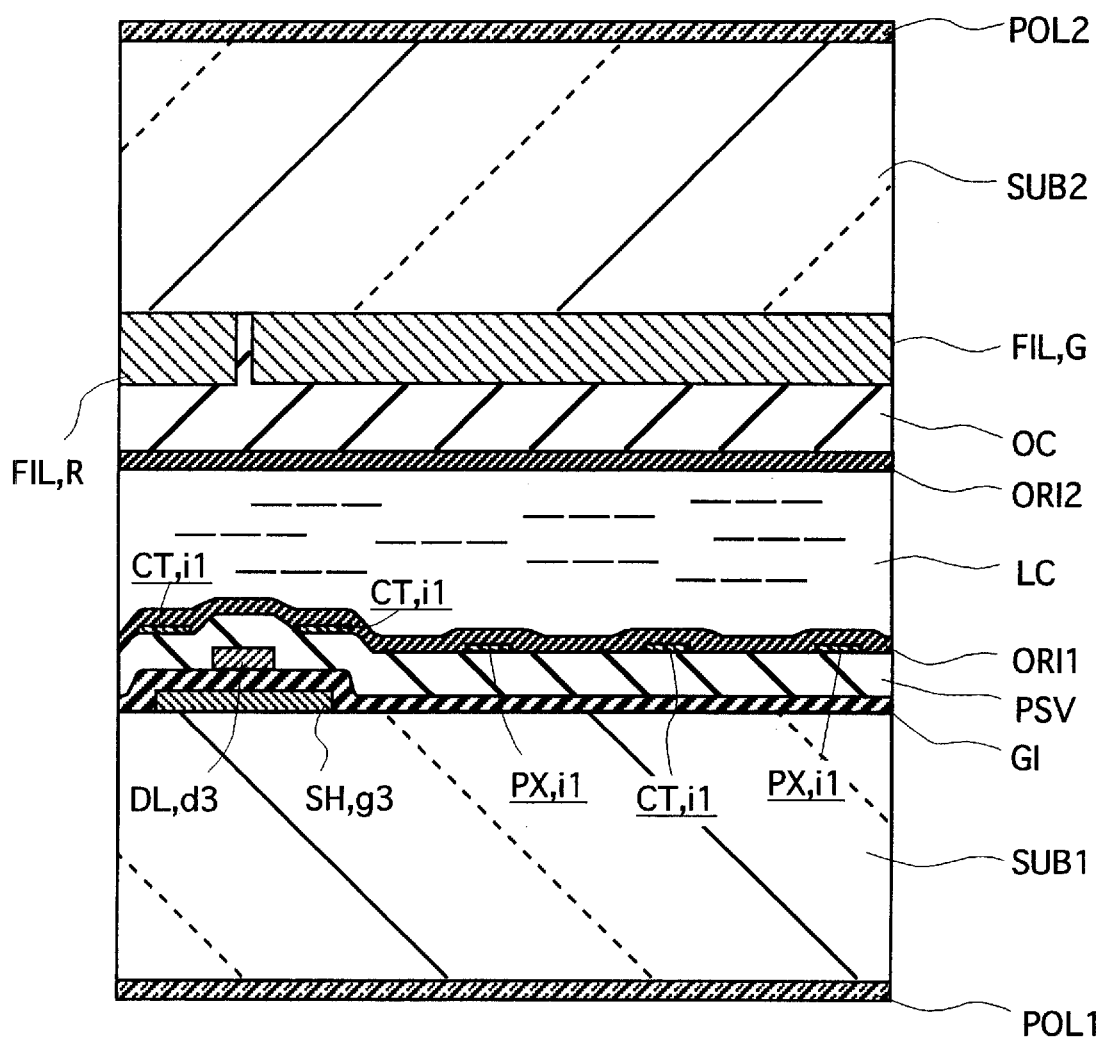
FIG. 26 is a sectional view taken along a line 6—6 of FIG. 25.
Figure 27:
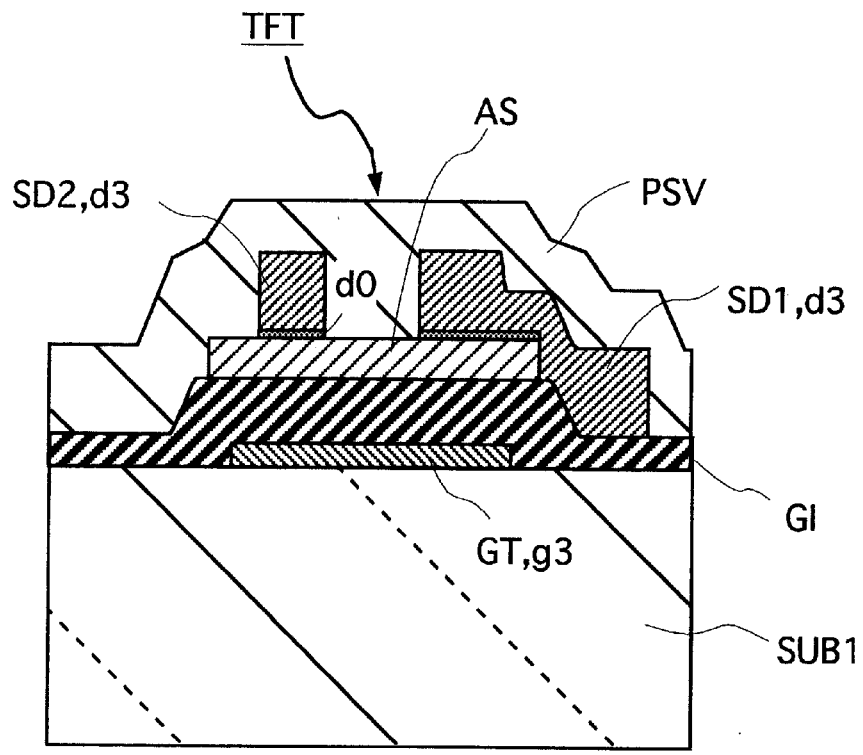
FIG. 27 is a sectional view of a thin-film transistor element TFT taken along line 7—7 of FIG. 25.

FIG. 26 is a sectional diagram at cut line 6—6 of FIG. 25; FIG. 27 is a sectional diagram of a thin-film transistor TFT at line 7—7 of FIG. 25; and FIG. 28 is a sectional diagram of a storage capacitor Cstg at line 8—8 of FIG. 25.

Figure 28:
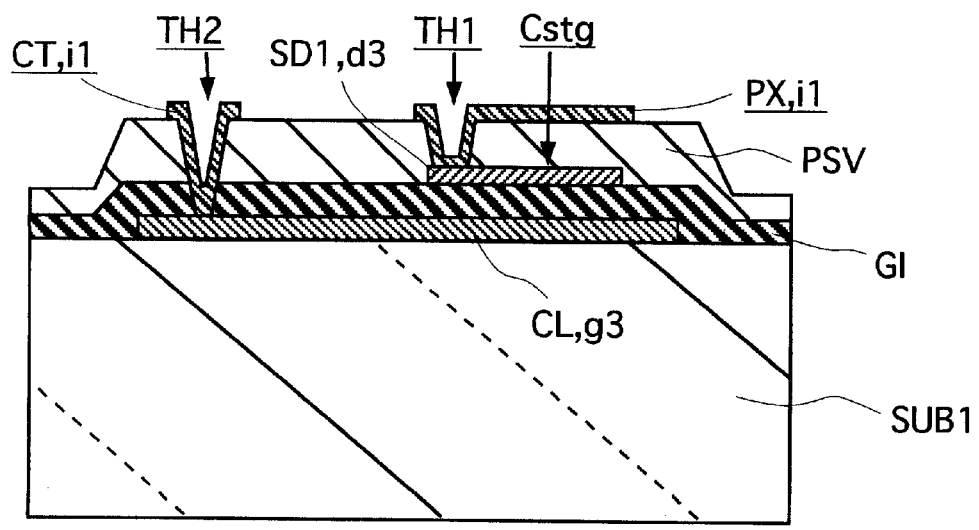
FIG. 28 is a sectional view of a storage capacitor Cstg taken along line 8—8 of FIG. 25.

As shown in FIG. 26 to FIG. 28, a thin-film transistor TFT and storage capacitor Cstg plus electrode group are formed on the side of the lower transparent glass substrate SUB1 with a liquid crystal layer LC being used as a reference, whereas a color filter FIL and optical shield black matrix pattern BM are formed on the side of the upper transparent glass substrate SUB2.

In addition, alignment films ORI, ORI2 for controlling the initial alignment of the liquid crystal are provided on the inside (liquid crystal LC side) surfaces of the transparent glass substrates SUB1, SUB2, respectively, whereas polarizer plates (Cross Nicol layout) with polarization axes laid out at right angles to each other are provided on the outer surfaces of the transparent glass substrates SUB1, SUB2, respectively.

<<TFT Substrate>>

A detailed explanation will first be given of an arrangement on the side of the lower transparent glass substrate SUB1 (TFT substrate).

<<Thin-Film Transistor TFT>>

A thin-film transistor TFT operates in a way such that upon application of a positive bias to its gate electrode GT, the channel resistance between the source and drain decreases; and, in the absence of any biasing thereto, the channel resistance increases.

As shown in FIG. 27, the thin-film transistor TFT has a gate electrode GT, gate insulation film GI, i-type semiconductor layer AS made of i-type (intrinsic: without doping any impurity for determining the conductivity type) amorphous silicon (Si), and a pair of a source electrode SD1 and drain electrode SD2. Additionally, in view of the fact that the source and drain are inherently determinable by a bias polarity therebetween and that in circuitry of this liquid crystal display device its polarity will be inverted during operations, it should be understood that the source and drain are interchangeable during operations. However, in the explanation given below, one of them will be fixedly referred to as the "source", whereas the other is referred to as the "drain" for purposes of convenience only.

<<Gate Electrode GT>>

The gate electrode GT is formed to be continuous with a scan signal line G1, wherein a partial region of the scan signal line G1 is arranged to become the gate electrode GT. The gate electrode GT is the part that is beyond the active regions of the thin-film transistor TFT. In this embodiment the gate electrode GT is formed of a single-layer conductive film g3. The conductive film g3 may be a sputter-fabricated chromium-molybdenum alloy (Cr—Mo) film, although the invention is not exclusively limited thereto.

<<Scan Signal Line G1>>

The scan signal line G1 is formed of a conductive film g3. This conductive film g3 of the scan signal line G1 is fabricated at the same process step with the formation of the conductive film g3 of the gate electrode GT so that these elements are formed integrally with each other. This scan signal line G1 permits supply of a gate voltage Vg from external circuitry to the gate electrode GT. In this example the conductive film g3 may be a sputter-fabricated chromium-molybdenum alloy (Cr—Mo) film. Note that the scan signal line G1 and gate electrode GT should not be limited only to the chromium-molybdenum alloy; for example, these may be designed to have a double-layered structure of aluminum or aluminum alloy wrapped by chromium-molybdenum for resistivity reduction. Furthermore, its crossover portion with an image signal line DL may be made fine in order to reduce the possibility of short-circuiting with the image signal line DL; or, alternatively, a crotch or Y-bent configuration may be employed in order to enable cutaway separation by laser trimming even upon occurrence of short-circuiting.

<<Contra-voltage Signal Line CL>>

The contra-voltage signal line CL is formed of a conductive film g3. This contra-voltage signal line CL's conductive film g3 is formed at the same process step with the conductive film g3 of gate electrode GT and scan signal line G1 plus counter electrode CT, and is arranged to be able to offer electrical connectivity to the counter electrode CT. This contra-voltage signal line CL is for supplying a contra-voltage Vcom from external circuitry to the counter electrode CT.

In addition, the contra-voltage signal line CL should not be limited to chromium-molybdenum alloys only; for example, it may be designed to have a double-layered structure of aluminum or aluminum alloy wrapped by chromium-molybdenum for resistivity reduction.

Furthermore, its crossover portion with an image signal line DL may be made thinner in order to reduce the possibility of short-circuiting with the image signal line DL; or, alternatively, a crotch or Y-bent configuration may be employed in order to enable cutaway separation by laser trimming even upon occurrence of short-circuiting.

<<Dielectric Film GI>>

The dielectric film GI is for use as a gate insulation film for giving an electric field to the semiconductor layer AS along with the gate electrode GT at the thin-film transistor TFT. The dielectric film GI is formed to overlie the gate electrode GT and scan signal line G1. As the dielectric film GI, a silicon nitride film is chosen which was formed by plasma CVD for example to a thickness ranging from 2,500 to 4,500 Å (in this embodiment, about 3,500 Å). The dielectric film GI also functions as an interlayer dielectric film between the scan signal line G1 and contra-voltage signal line CL on one hand and the image signal line DL on the other hand to thereby contribute to electrical isolation of them. In addition, the dielectric film GI is patterned for all-at-a-time fabrication by using the same photomask as that for a protective film PSV1 to be later described.

<<i-Type Semiconductor Layer AS>>

The i-type semiconductor layer AS is made of amorphous silicon and is formed to a thickness of from 200 to 2,500 Å (about 1,200 Å in this embodiment).

A layer d0 is an N(+) type amorphous silicon semiconductor layer with phosphorus (P) doped therein for ohmic contact, which is left only at a portion where the i-type semiconductor layer AS is present on the lower side, while a conductive layer d3 exists on the upper side thereof.

The i-type semiconductor layer AS and layer d0 are also provided between both intersections (crossover sections) of the scan signal line G1 and contra-voltage signal line CL with respect to the image signal line DL. The i-type semiconductor layer AS at these intersections suppresses short-circuiting between the scan signal line G1 and contra-voltage signal line CL and the image signal line DL at such cross points.

<<Source Electrode SD1, Drain Electrode SD2>>

Each of the source electrode SD1 and drain electrode SD2 is constituted from a conductive film d3 in contact with the N(+) type semiconductor layer d0.

The conductive film d3 may be a chromium-molybdenum alloy (Cr—Mo) film that is formed by sputtering to a thickness of from 500 to 3,000 Å (about 2,500 Å in this embodiment). As the Cr—Mo film is inherently low in stress, a film thickness can be formed comparatively thickly, which in turn contributes to achievement of low resistivity of the leads. The Cr—Mo film is also excellent in adhesiveness with the N(+) type semiconductor layer d0. The conductive film d3 may be formed of a high-melting-point metal (Mo, Ti, Ta, W) film or high-melting-point metal silicide (MOSi$_2$, TiSi$_2$, TaSi$_2$, WSi$_2$) film in place of the Cr—Mo film; or, alternatively, it may be designed to have a multilayer structure with aluminum or the like.

After having patterned the conductive film d3 using a mask pattern, the conductive film d3 is used as a mask to remove the N(+) type semiconductor layer d0. In other words, specified portions of the N(+) type semiconductor layer d0 residing on the i-type semiconductor layer AS which exclude those at the conductive film d1 and conductive film d2 are removed in a self-align fashion. At this time, since the N(+) type semiconductor layer d0 is etched so that all portions corresponding to its thickness are removed, the i-type semiconductor layer AS will also be slightly etched away at its surface portion; the extent of such etching may be controlled by adjustment of the etching time.

<<Image Signal Line DL>>

The image signal line DL is comprised of a conductive film d3 that is at the same layer of the source electrode SD1 and drain electrode SD2. In addition, the image signal line DL is formed integrally with the drain electrode SD2. In this example the conductive film d3 may be a chromium-molybdenum alloy (Cr—Mo) film that is formed by sputtering to a thickness of from 500 to 3,000 Å (about 2,500 Å in this embodiment). As the Cr—Mo film is low in stress, a film can be formed comparatively thickly, which in turn contributes to achievement of low resistivity of the leads. The Cr—Mo film is also excellent in adhesiveness with the N(+) type semiconductor layer d0. The conductive film d3 may be formed of a high-melting-point metal (Mo, Ti, Ta, W) film or high-melting-point metal silicide (MOSi$_2$, TiSi$_2$, TaSi$_2$, WSi$_2$) film in the alternative of the Cr—No film, or, alternatively, it may be designed to have a multilayer structure with aluminum or the like.

<<Storage Capacitor Cstg>>

The conductive film d3 is formed to overlap the contra-voltage signal line CL at a source electrode SD2 portion of a thin-film transistor TFT. As apparent from FIG. 28 also, this overlapping constitutes a storage capacitor (electrolytic capacitive element) Cstg with the source electrode SD2 (d3) as its one electrode and with the contra-voltage signal CL as its remaining electrode. The dielectric film of the storage capacitor is formed of the film GI that is used as the gate insulation film of the thin-film transistor TFT.

As shown in FIG. 25, when looking planarly, the storage capacitor Cstg is formed at part of the contra-voltage signal line CL.

<<Protective Film PSV1>>

A protective film PSV1 is provided to overlie the thin-film transistor TFT. The protective film PSV1 is formed to mainly protect the thin-film transistor TFT from humidity or the like, and so one that is high in transparency and good in moisture vapor resistance is used. The protective film PSV1 is made of a silicon oxide film or silicon nitride film as fabricated by a plasma CVD apparatus, for example, to a film thickness ranging from '0.3 to 1 μm or therearound.

The protective film PSV1 has been removed to expose the external connection terminals DTM, GTM. With regard to a relation of the thicknesses of the protective film PSV1 and the gate insulation film GI, the former is made thick in light of the protection effect, whereas the latter is rendered thinner in view of the mutual conductance of the transistor. In addition, the protective film PSV1 is patterned for simultaneous fabrication by use of the same photomask as that for the dielectric film GI. In addition, through-holes TH2 and TH1 are provided at a pixel section, for electrical connection between the contra-voltage signal line CL and a counter electrode CT to be later discussed and also for electrical connection between the source electrode SD2 and pixel electrode PX. At the through-hole TH2, a hole is defined extending to the g3 layer due to simultaneous fabrication of the protective film PSV1 and dielectric film GI; and, at the through-hole TH1, a hole is defined reaching the d3 layer due to blocking by d3.

<<Pixel Electrode PX>>

The pixel electrode PX is formed of a transparent conductive layer il. This transparent conductive film il is made of a transparent conductive film (Indium-Tin-Oxide ITO: Nesa film) formed by sputtering to a thickness of 100 to 2,000 Å (in this embodiment, about 1,400 Å). In addition, the pixel electrode PX is connected via the through-hole TH1 to the source electrode SD2.

Making the pixel electrode transparent as in this embodiment leads to improvement of the maximum optical transmissivity when performing white displaying due to rays of light passing through such portion; thus, it becomes possible to generate a brighter display than in the case of using opaque pixel electrodes. At this time, as will be described later, the polarizer plate layout is arranged (in the normally-black mode) so that liquid crystal molecules retain their initial alignment state in the absence of a voltage applied thereto to achieve black displaying under such condition; consequently, even though the pixel electrodes are made transparent, no light rays penetrate such portions to thereby enable displaying of black with good quality. This in turn makes it possible to improve the maximum transmissivity while achieving a sufficient contrast ratio.

<<Counter Electrode CT>>

The counter electrode CT is formed of a transparent conductive layer il. This transparent conductive film il is made of a transparent conductive film (Indium-Tin-Oxide ITO: Nesa film) formed by sputtering to a thickness of 100 to 2,000 Å (in this embodiment, about 1,400 Å). In addition, the counter electrode CT is connected via the through-hole TH2 to the contra-voltage signal line CL.

The counter electrode CT is arranged so that a contra-voltage Vcom is applied thereto. In this embodiment the contra-voltage Vcom is set at a selected potential level which is lower by a specified degree than an intermediate DC voltage potential that is midway between the minimum level of drive voltage Vdmin and maximum level of drive voltage Vdmax as applied to the image signal line DL, which specified degree corresponds to a feed-through voltage ΔVs generated when turning off the thin-film transistor TFT, although an AC voltage may alternatively be applied thereto in cases where it is required that the power supply voltage of an integrated circuit for use in image signal drive circuitry be reduced in potential down at one half thereof.

<<Color Filter Substrate>>

Next, turning back to FIG. 25 and FIG. 26, a detailed explanation will be given of an arrangement of the side of the upper transparent glass substrate SUB2 (color filter substrate).

<<Optical Shield Film BM>>

An optical shield film BM (so-called black matrix) is formed on the side of the upper transparent glass substrate SUB2 for preventing reduction of the contrast ratio or the like which otherwise occurs due to outward emission of transmission light from unnecessary gaps (gaps other than that between the pixel electrode PX and counter electrode CT) toward the display plane side. The optical shield film BM also functions to prevent either external light or backlight rays from falling onto the i-type semiconductor layer AS. More specifically, the i-type semiconductor layer AS of the thin-film transistor TFT is sandwiched by the optical shield film BM and the gate electrode GT of relatively large size which are at the upper and lower locations to thereby eliminate hitting of externally incoming natural light and backlight rays.

The optical shield film BM shown in FIG. 25 is arranged so that it linearly extends along the lateral direction over the thin-film transistor TFT. This pattern is one example; however, alternatively, it may be designed into a matrix form with openings defined like holes. At certain portions at which the electric field direction is disturbed such as comb-shaped electrode ends, the display at such portions; is in one-to-one correspondence to image information within pixels so that black is obtained in the case of black and white for white; accordingly, such can be utilized as part of the display. In addition, a gap between the counter electrode CT and image signal line DL in the up/down direction of the drawing is optically shielded by a light shield layer SH that was formed at the same process step of the gate electrode GT. Whereby, the up/down-directional light shielding in the right/left or lateral direction can be optically shielded with a high accuracy equivalent to the alignment accuracy of TFT processes, which in turn makes it possible to establish a boundary of the light shield layer SH between electrodes of counter electrodes CT that neighbor image signal lines DL thereby enabling further enlargement of the opening as compared to the case of optical shielding due to an optical shield film BM that depends on the positional alignment accuracy of the upper and lower substrates.

The optical shield film BM has a shielding effect with respect to light and is formed of a highly insulative film for elimination of any bad influence on an electric field between the pixel electrode PX and counter electrode CT; and, in this embodiment, it is made of a resist material mixed with black pigment formed to a thickness of about 1.2 $\mu$m.

The optical shield film BM is linearly formed in the lateral direction with respect to those pixels in each row so that effective display regions at each row are partitioned by this line. Thus, the contour line of each row pixel is made clear by the optical shield film BM. In other words, the optical shield film BM functions as the black matrix while also functioning to optically shield the i-type semiconductor layer AS.

The optical shield film BM is also formed at the periphery to have a window frame-like shape, whose pattern is formed in a way continuous with the pattern of the matrix section shown in FIG. 25. The optical shield film BM at the periphery is extended to the outside of a seal section SL thereby preventing leakage light, such as reflection light due to practical mount equipment, such as personal computers, from entering the matrix section, while at the same time preventing the light such as backlight from leaking toward the outside of the display area. On the other hand, this optical shield film BM is limited in location so that it resides within an inside area that is smaller by about 0.3 to 1.0 mm than the edge of the substrate SUB2, and also is formed excluding cutaway regions of the substrate SUB2.

<<Color Filter FIL>>

Same as the embodiment 1.

<<Overcoat Film OC>>

Same as Embodiment 1.

<<Liquid Crystal layer, Alignment Film & Polarizer Plate>>

Same as Embodiment 1.

<<Configuration of Matrix Vicinity>>

Same as Embodiment 1.

<<Gate Terminal Section>>

FIG. 29A is a plan view showing a connection structure from the display matrix's scan signal line G1 up to its external connection terminal GTM, while FIG. 29B shows a cross-section at line B—B of FIG. 29A. Note that the drawing corresponds to the FIG. 5 right center vicinity, wherein a hatched part is represented by one straight line shape for purposes of convenience.

In the drawing the Cr—Mo layer g3 is hatched for clarity purposes only.

The gate terminal GTM is comprised of the Cr—Mo layer g3 and a transparent conductive layer il that is used for protecting the surface and for improving the reliability of connection with a TCP (Tape carrier Package). This transparent conductive film il employs a transparent conductive film ITO that was formed at the same process step with the forming of the pixel electrode PX.

In the plan view diagram, the dielectric film GI and protective film PSV1 are formed on the right side of its boundary, wherein the terminal section DTM placed at the left end is arranged to be exposed from them for enabling electrical contact with external circuitry. Although in the drawing only one pair of the gate line G1 and gate terminal is depicted, in the actual implementation, a plurality of such line pairs are laid out in the up/down direction as shown in FIG. 29A to constitute the terminal group Tg (FIG. 5), wherein the left end of the gate terminal is extended beyond the cutting region of the substrate to be short-circuited by a lead SHg (not shown) during the manufacturing processes. This is useful for elimination of electrostatic breakdown during rubbing of the alignment film ORI1 or the like.

<<Drain Terminal DTM>>

FIG. 30A is a plan view diagram showing connection from the image signal line DL to its external connection terminal DTM; and FIG. 30B shows across-section at line B—B of FIG. 30A. Note that the drawing corresponds to the FIG. 5 upper right vicinity, and that, although the direction of the drawing is changed for convenience purposes, the right end direction corresponds to the upper end of the substrate SUB1.

"TSTd" denotes a test terminal to which external circuitry is not connected and which is widened to have a width greater than that of the lead section to thereby permit contacting by a probe needle or the like. Similarly, the drain terminal DTM also is widened to be wider in width than the lead portion to enable connection with external circuitry. External connection drain terminals DTM are laid out in the up/down direction; and, as shown in FIG. 5, the drain terminals DTM constitute the terminal group Td (suffix eliminated) and are designed to further extend beyond the cut line of the substrate SUB1, all of which are short-circuited by a lead SHd (not shown) during the manufacturing processes for prevention of electrostatic breakdown. As shown in FIG. 8, test terminals TSTD are formed at alternate ones of the image signal lines DL.

The drain connection terminal DTM is formed of a transparent conductive layer il, and is connected to an image signal line DL at a certain part from which the protective film PSV1 is removed. This transparent conductive film il makes use of a transparent conductive film ITO that was formed at the same process step of forming pixel electrodes PX as in the case of the gate terminal GTM.

An extension lead from the matrix section up to the drain terminal section DTM is such that a layer d3 is arranged at the same level as the image signal line DL.

<<Counter Electrode Terminal CTM>>

Figure 31A:
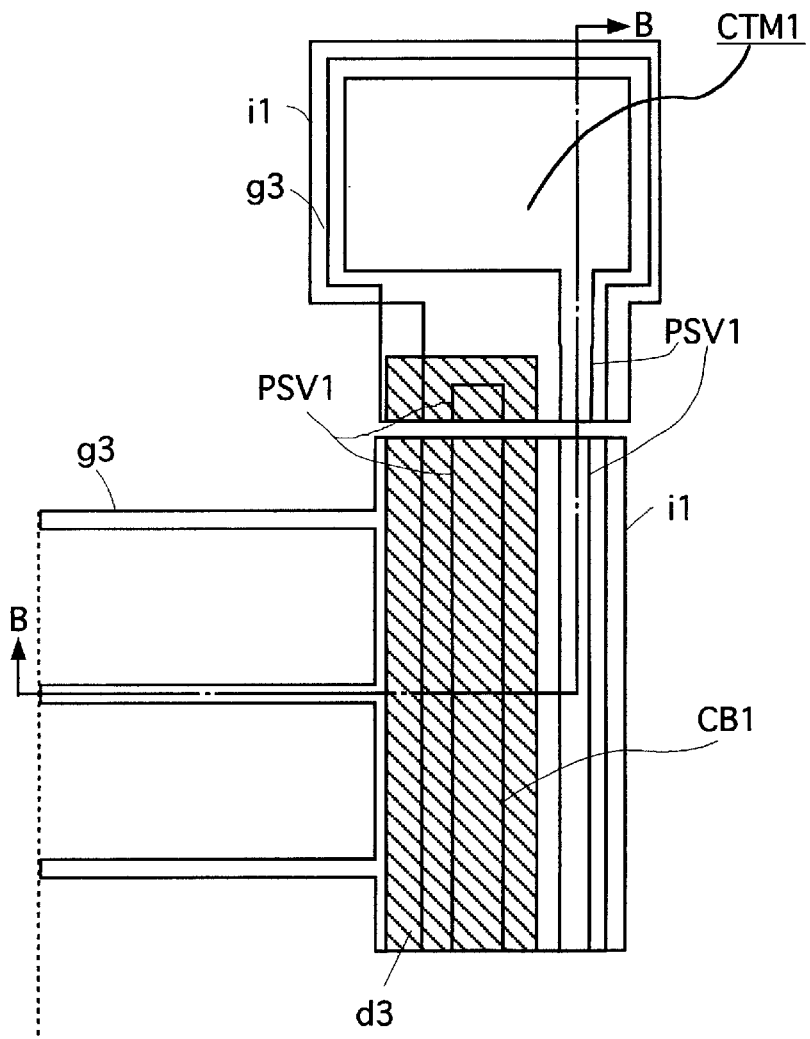
FIG. 31A is a plan view showing a nearby part of a connect section of a common electrode terminal CTM1 and common bus line CB1 as well as common voltage signal line CL.
Figure 31B:
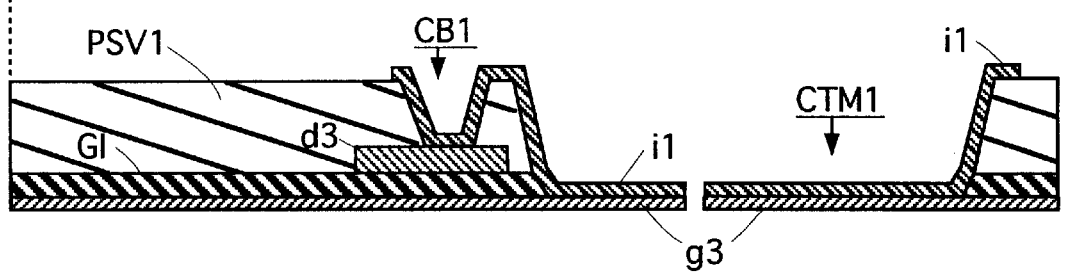
FIG. 31B is a sectional view thereof.

FIG. 31A is a plan view diagram showing connection from the contra-voltage signal CL up to its external connection terminal CTM; and FIG. 31B shows a cross-section at line B—B of FIG. 31A. Note that the drawing corresponds to the upper left part of FIG. 5 or thereabout.

Respective contra-voltage signal lines CL are bundled by a common bus line CB to be drawn out toward the counter electrode terminal CTM. The common bus line CB is structured from a lamination of a conductive layer 3 on the conductive layer g3 with the transparent conductive film il electrically connected between them. This is in order to reduce the resistivity of the common bus line CB to ensure that a contra-voltage is sufficiently supplied from external circuitry to each contra-voltage signal line CL. In the structure shown herein, a feature thereof lies in the ability to reduce the resistance of the common bus line without newly loading any extra conductive layers.

The counter electrode terminal CTM is structured from the conductive layer g3 and the transparent conductive layer il as laminated thereon. This transparent conductive film il employs a transparent conductive film ITO that was formed at the same process step of forming pixel electrodes PX, as in other terminals. The conductive layer g3 is covered with the transparent conductive layer il, which is excellent in durability, in order to let the transparent conductive layer il protect its surface for elimination of electrolytic corrosion. In addition, connection of the transparent conductive layer il with the conductive layer g3 and conductive layer d3 is effected by conduction via a through-hole(s) as formed in the protective film PSV1 and dielectric film GI.

Figure 32A:
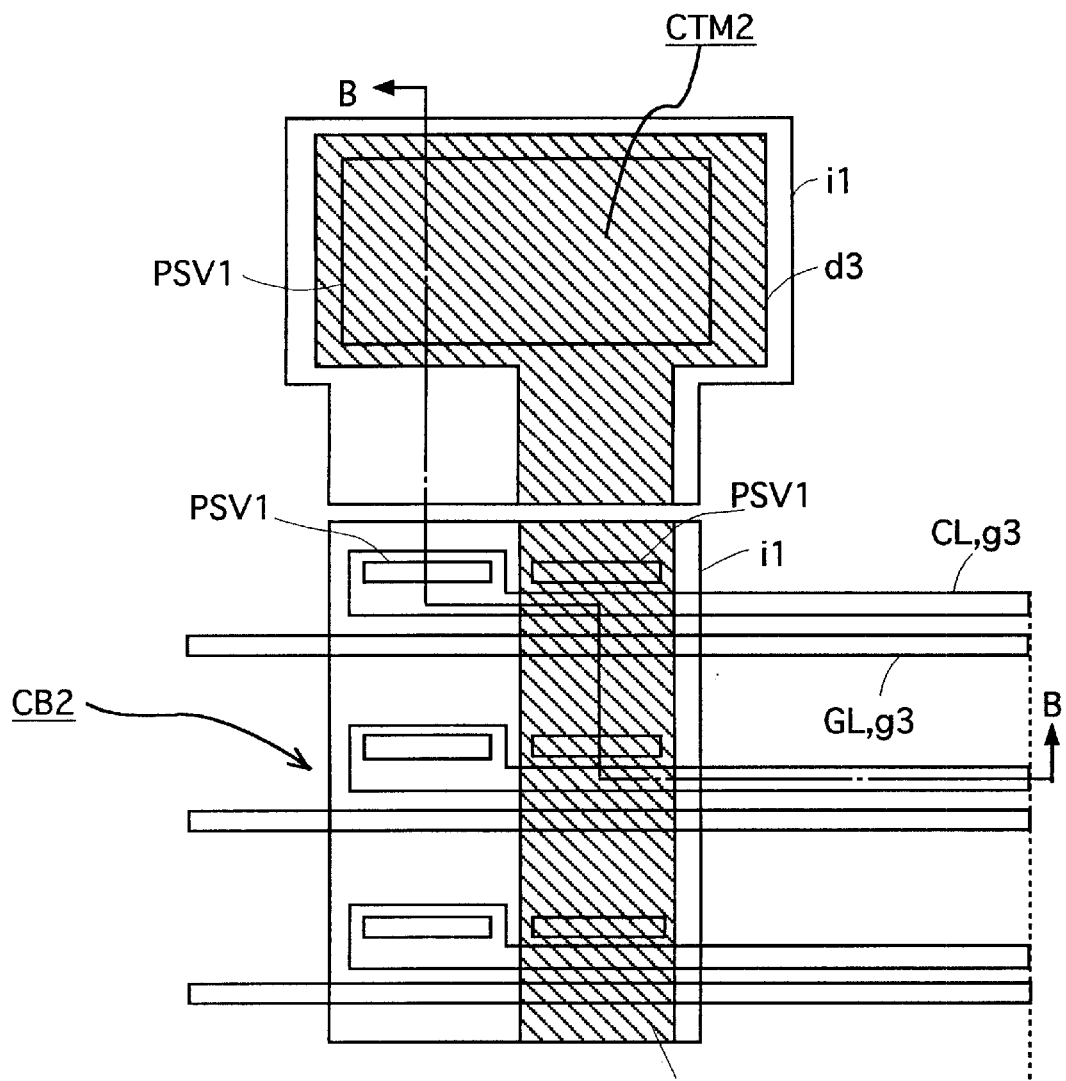
FIG. 32A is a plan view showing a nearby part of a connect section of a common electrode terminal CTM2 and common bus line CB2 plus common voltage signal line CL.
Figure 32B:
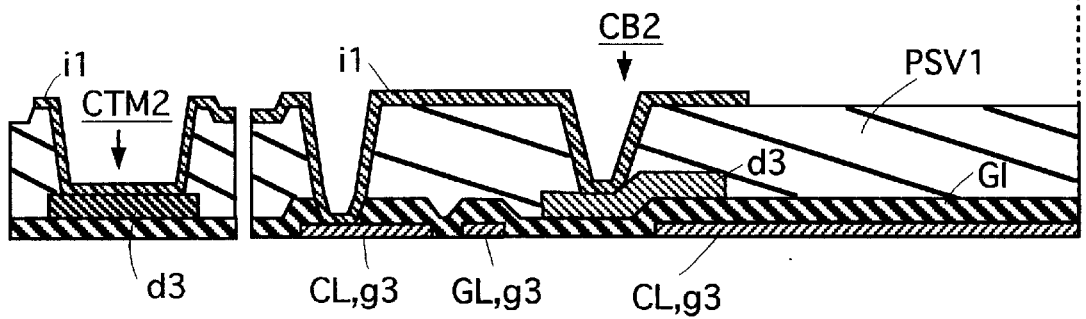
FIG. 32B is a sectional view thereof.

On the other hand, FIG. 32A is a plan view showing connection from another end of the contra-voltage signal CL up to its external connection terminal CTM2; and FIG. 32B is a sectional view taken along line B—B of FIG. 32A. Note that the drawing corresponds to the upper right part of FIG. 5 or thereabout. Here, at the common bus line CB2, the remaining ends (on the gate terminal GTM side) of respective contra-voltage signal lines CL are bundled to be drawn out toward the counter electrode terminal CTM2. A difference from the common bus line CB1 lies in forming the conductive layer d3 and transparent conductive layer il for electrical insulation is provided with the scan signal line G1. In addition, electrical insulation with the scan signal line G1.

<<Display Device Overall Equivalent Circuit>>

Figure 33:
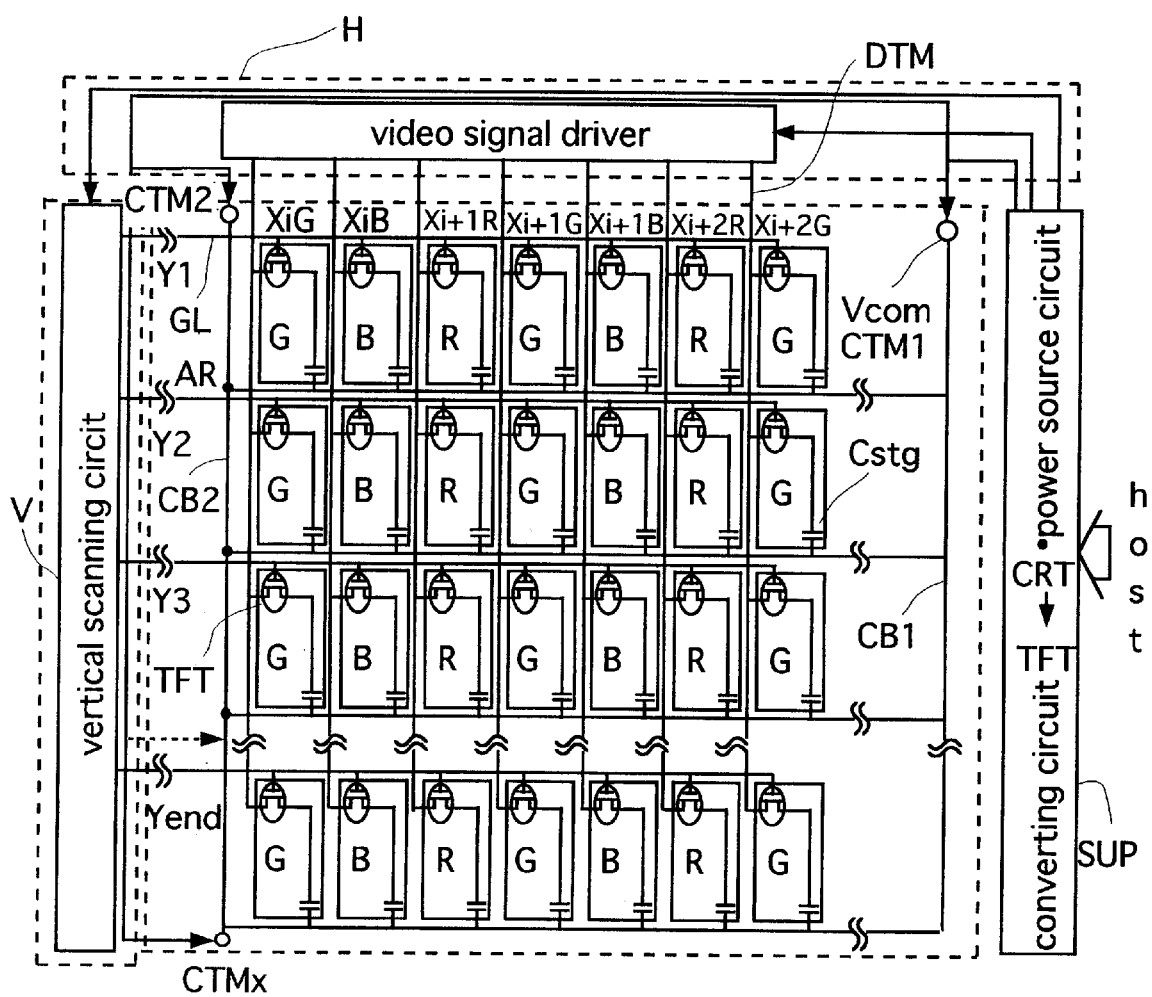
FIG. 33 is a circuit diagram including a matrix section and its periphery of the active-matrix color liquid crystal display device of the present invention.

An equivalent circuit of the display matrix section and its peripheral circuit connection diagram are shown in FIG. 33. Although this drawing is a circuit diagram, it has been illustrated in a way corresponding to the actual geometric layout. "AR" is a matrix array with a plurality of pixels laid out two-dimensionally.

In the drawing, "X" denotes image signal lines DL to which with suffices "G", "B" and "R" are appended, which stand for green, blue and red pixels, respectively. "Y" denotes scanning signal lines G1 with suffices 1, 2, 3, . . . , "end" are appended to denote the order of sequence of the scan timing.

The scan signal lines Y (suffix eliminated) are connected to a vertical scanning circuit V, while the image signal lines X (suffix omitted) are coupled to an image signal driving circuit H.

"SUP" denotes circuitry that includes a power supply circuit for obtaining a plurality of stabilized voltage sources voltage-divided from a single voltage source along with a circuit or circuits for conversion of information for a CRT (cathode-ray tube) from a host (upper-level or "supervisory" arithmetic processing device) into information for use with a TFT liquid crystal display device.

<<Driving Method>>

Figure 34:
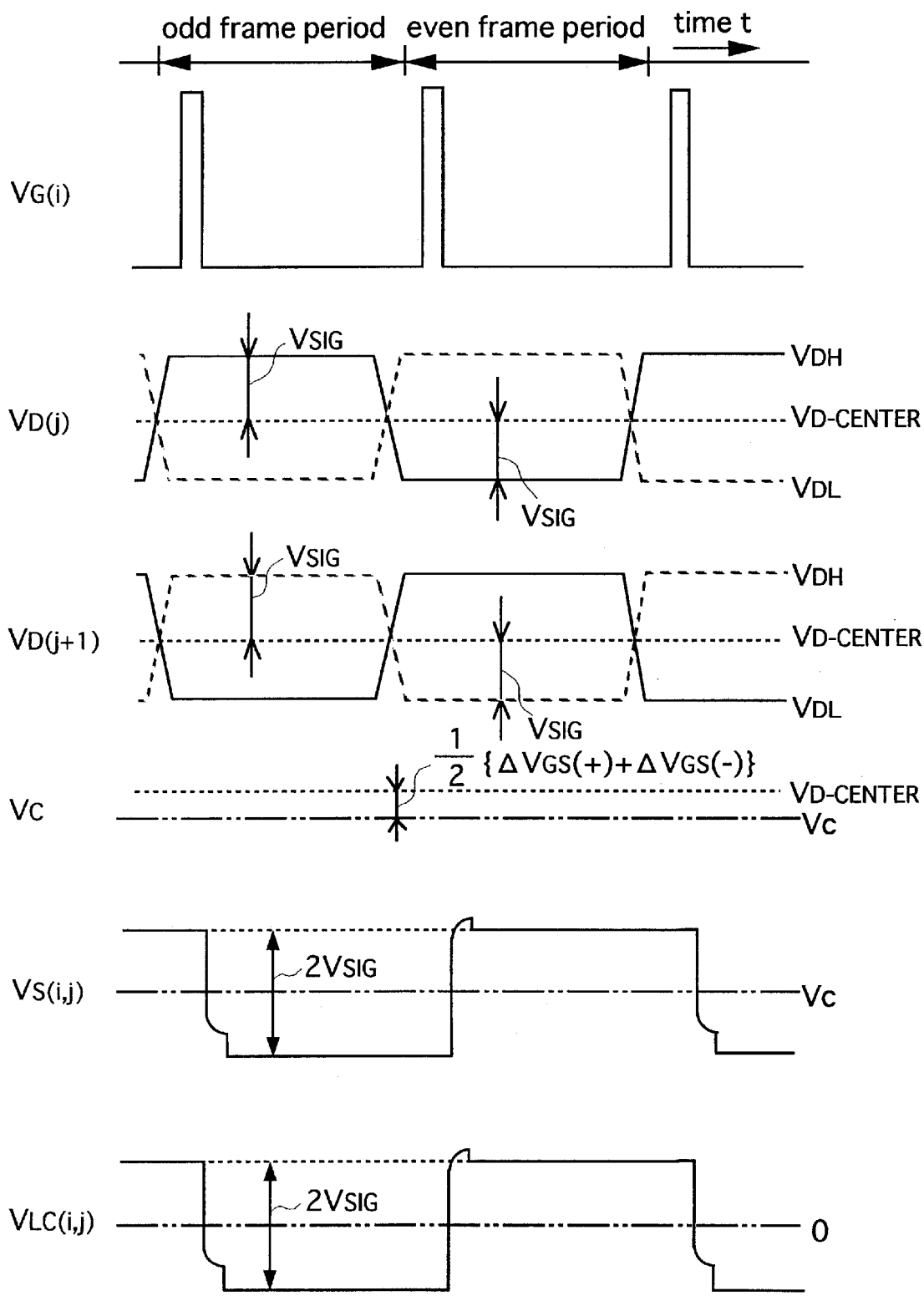
FIG. 34 is a diagram showing drive waveforms of the active-matrix color liquid crystal display device of the present invention.

Several drive waveforms of the liquid crystal display device of this embodiment are shown in FIG. 34. Assume that a contra-voltage Vc is kept constant in potential. A scan signal Vg takes the ON level once per scan period, and during the remaining periods, it is at the OFF level. An image signal voltage is applied in a way such that the positive polarity and negative polarity are inverted once per frame for transmission to a single pixel at an amplitude equal to twice the voltage required to be applied to the liquid crystal layer. Here, the image signal voltage Vd is inverted in polarity on a one-per-column basis; and, such polarity inversion is also done on a one-per-row basis. This results in achievement of an arrangement that lets polarity-inverted pixels neighbor each other in the up/down and right/left directions, thereby making it possible to inhibit flicker and crosstalk (smear). In addition, the contra-voltage Vc is set at a selected potential that is potentially lower by a predefined degree from the center voltage of polarity inversion of the image signal voltage. This is in order to compensate for a feed-through voltage occurring when the thin-film transistor element is switched from ON to OFF, and is performed in order to apply to the liquid crystal an AC voltage with a smaller DC component. This is because upon application of DC, the liquid crystal might suffer from severe after imaging and degradation or the like.

In addition thereto, use of an AC voltage as the contra-voltage makes it possible to lower the maximum amplitude of an image signal voltage, which in turn makes employment of image signal drive circuits (signal-side drivers) that are low in withstanding voltage possible.

<<How Storage Capacitor Cstg Works>>

Same as Embodiment 1.

<<Manufacturing Method>>

An explanation will next be given of a method of manufacturing the substrate SUB1 assembly of the above-mentioned liquid crystal display device with reference to FIG. 35 to FIG. 37. Note that in these drawings, the characters centrally indicated therein are process names abbreviated, wherein a flow of fabrication process steps is shown while indicating on its left side a cross-section of the thin-film transistor TFT part shown in FIG. 27 along with a cross-section at or near the gate terminal shown in FIG. 29 on the right side. Except for a process step B and step D, step A-step I are partitioned in a way corresponding to each photographic processing, wherein any one of such process steps indicates the stage where the fabrication processing after the photographic process has been completed with a photoresist removed already. Note here that the term "photographic processing" as used herein refers to a series of operations from deposition of a photoresist through selective exposure using a mask up to development thereof, and any repetitive explanation will be omitted. An explanation will be given in accordance with the process steps thus partitioned.

Figure 35:
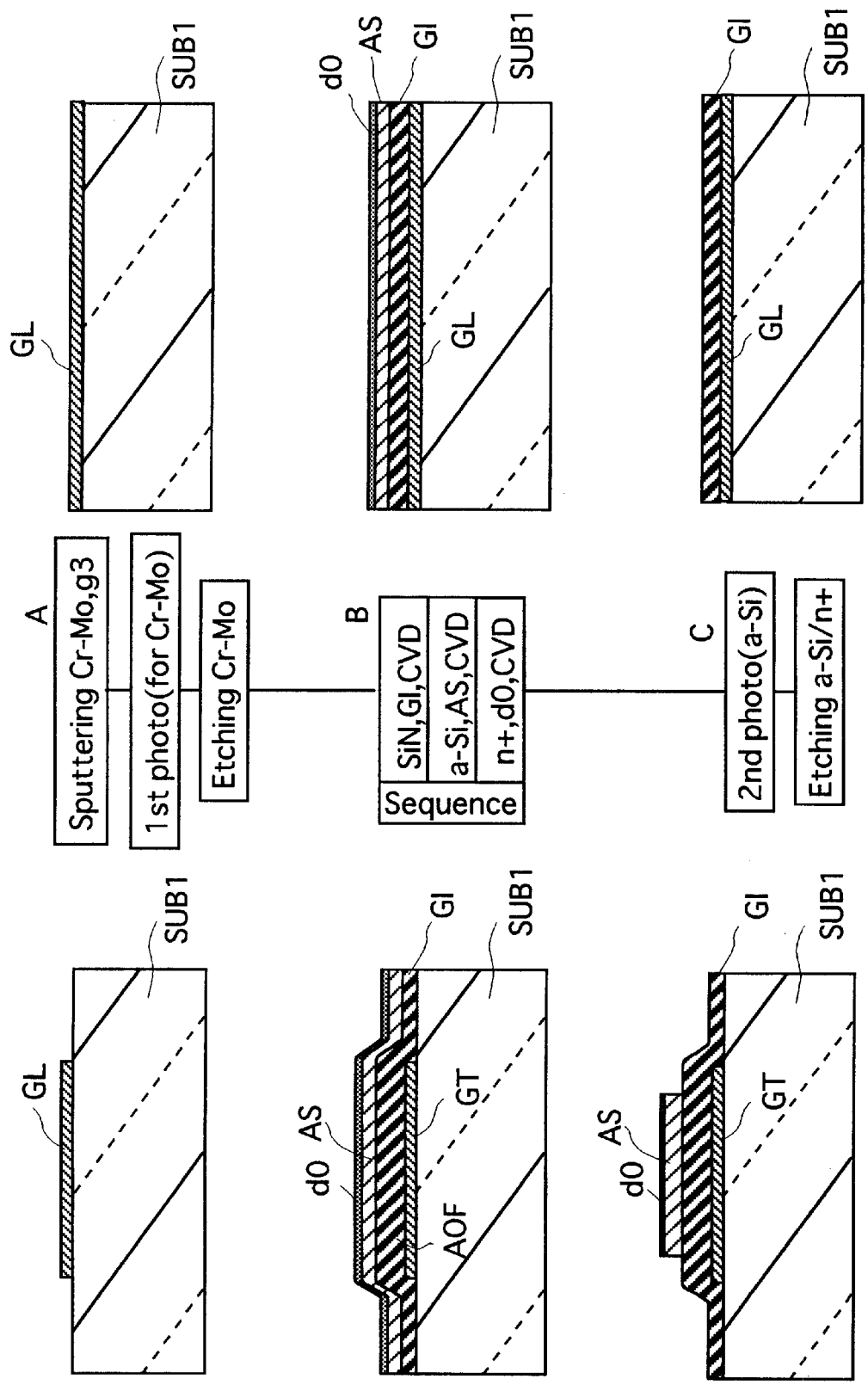
FIG. 35 is a flow chart showing some major steps A–C in the manufacture of a substrate SUB1 side part along with corresponding sectional views of a pixel section and of a gate terminal section.

Step A, FIG. 35

A conductive film g3 made of Cr—Mo or the like is provided by sputtering on the lower transparent glass substrate SUB1 comprised of AN635 glass (Trade Name), to a thickness of 2,000 Å. After photographic processing, the conductive film g3 is selectively etched by use of ammonium cerium (IV) nitrate. Thus, gate electrodes GT, scan signal lines G1, contra-voltage signal lines CL, gate terminals GTM, first conductive layer of common bus lines CB1, first conductive layer of counter electrode terminals CTM1, and more than one bus line SHg (not shown) for connection of the gate terminals GTM are formed.

Step B, FIG. 35

After having introduced into a plasma CVD apparatus an ammonia gas and shiran gas plus nitrogen gas to provide a Si nitride film of 3,500 Å thick and then having introduced into the plasma CVD apparatus a shiran gas and hydrogen gas to provide an i-type amorphous Si film of 1,200 Å thick, a hydrogen gas and phosphine gas are introduced into the plasma CVD apparatus to thereby provide an N(+) type amorphous Si film to a thickness of 300 Å.

Step C, FIG. 35

After photographic processing, the N(+) amorphous Si film and i-type amorphous Si film are selectively etched by using $SF_6$ and $CCl_4$ as dry etching gases to thereby form more than one island of an i-type semiconductor layer AS.

Figure 36:
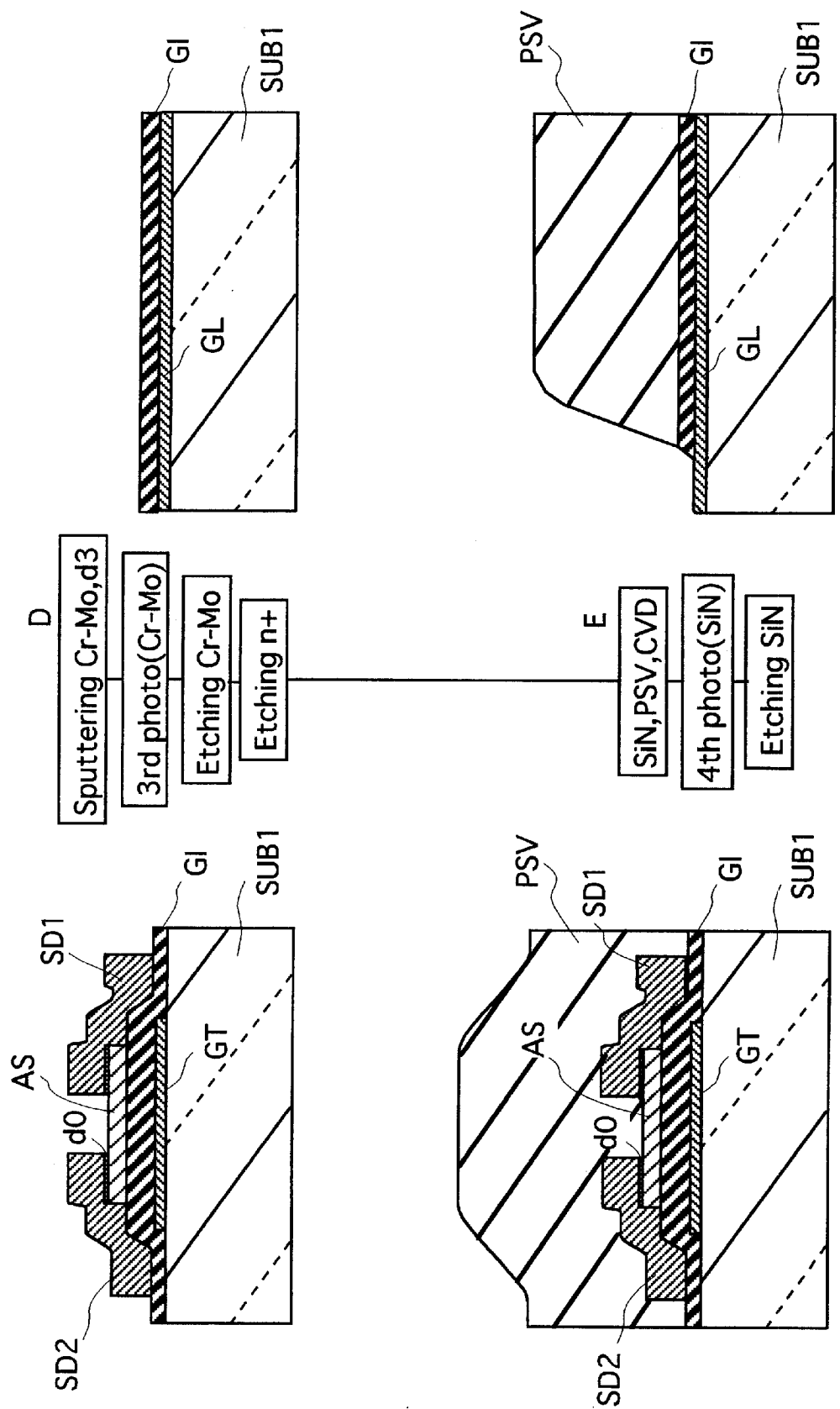
FIG. 36 is a flowchart showing some major steps D–E in the manufacture of the substrate SUB1 side part along with corresponding sectional views of the pixel section and gate terminal section.

Step D, FIG. 36

A conductive film d3 made of Cr is provided by sputtering to a thickness of 3000 Å. After photographic processing, the same liquid as that used at the step A is used to etch the conductive film d3 to thereby form image signal lines DL, source electrodes SD1, drain electrodes SD2, a first conductive layer of common bus lines CB2, and more than one bus line SHd (not shown) for short-circuiting the drain terminals DTM. Next, $CCl_4$ and $SF_6$ are introduced into the dry etching apparatus to etch the N(+) type amorphous Si film for selective removal of an N(+) type semiconductor layer d0 between the source and drain.

Step E, FIG. 36

An ammonia gas and shiran gas plus nitrogen gas are introduced into the plasma CVD apparatus to provide a Si nitride film 0.4 μm thick. After photographic processing, a protective film PSV1 and dielectric film GI are patterned by selectively etching the Si nitride film using $SF_6$ as a dry etching gas.

Figure 37:
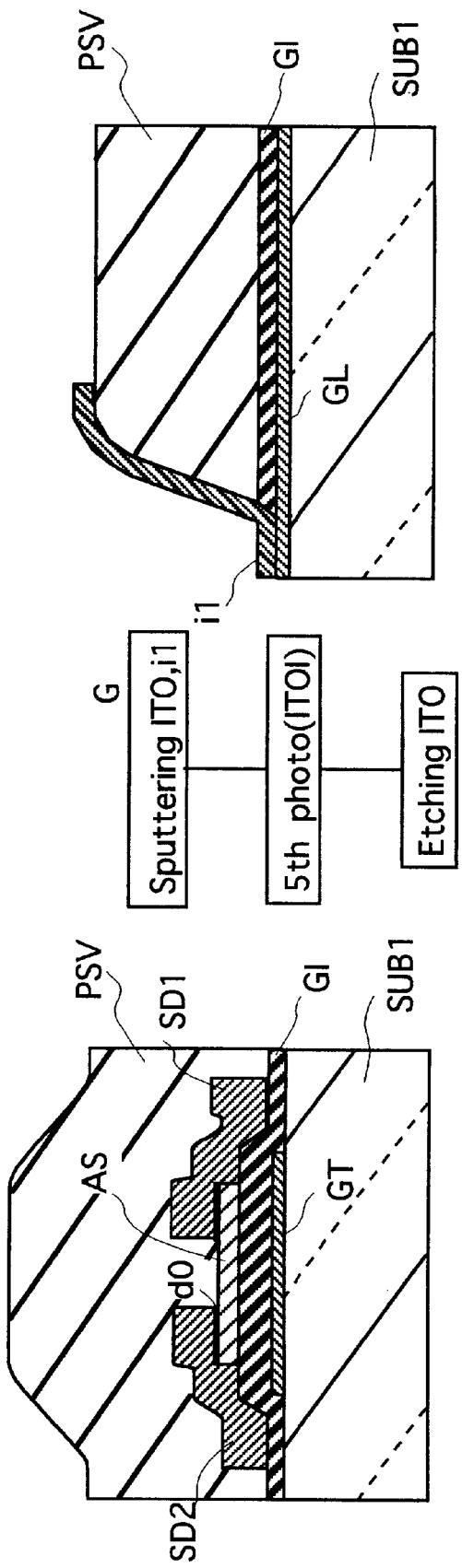
FIG. 37 is a flowchart showing a step F in the manufacture of the substrate SUB1 side part along with corresponding sectional views of the pixel section and gate terminal section.

Step F, FIG. 37

A transparent conductive film i1 made of an ITO film is provided by sputtering to a thickness of 1,400 Å. After photographic processing, the transparent conductive film i1 is selectively etched using as an etching liquid a mixed acid liquid of hydrochloric acid and nitric acid, thereby forming the uppermost layer of gate terminals GTM along with the second conductive layer of drain terminals DTM and counter electrode terminals CTM1 and CTM2.

<<Display Panel PNL & Driver Circuit Board PCB1>>

Same as Embodiment 1.

<<TCP's Connection Structure>>

Same as Embodiment 1.

<<Driver Circuit Board PCB2>>

Same as Embodiment 1.

<<Overall Arrangement of Liquid Crystal Display Module>>

Same as Embodiment 1.

As apparent from the foregoing, in this embodiment, making the comb-shaped electrodes transparent in the same way as in the embodiment 3 makes it possible to achieve the maximum optical transmissivity to effect an improvement by about 50% during generation of a white display, while letting the liquid crystal display panel PNL become about 5.7% in transmissivity.

In addition, it becomes possible to simultaneously fabricate the ITO film for improvement of the reliability of elements, which in turn makes it possible to achieve both an improved reliability and productivity at the same time.

A further advantage of this embodiment is that unlike the embodiments 1–6 above, the embodiment is designed to employ the process of forming an ITO film overlying the protective film PSV1 which in turn makes it possible to bring the counter electrode at the uppermost layer while retaining good shield efficiency of leakage electric fields from image signal lines with crosstalk reduced.

A still further advantage is that the absence of any protective film PSV1 in the pathway of electric flux lines for driving liquid crystals between electrodes leads to elimination of any possible voltage reduction at such protective film PSV1 which in turn has enabled the maximal drive voltage value for liquid crystal drive to decrease in potential from 7.5 Volt as in the embodiment 1 down to 5.0 Volt as in this example.

With the scheme for driving liquid crystals by applying an electric field extending substantially in parallel to the substrate surface, the protective film must appear twice in the pathway of electric flux lines between electrodes so that the process required can be simplified while improving productivity.

(Embodiment 8)

Figure 38:
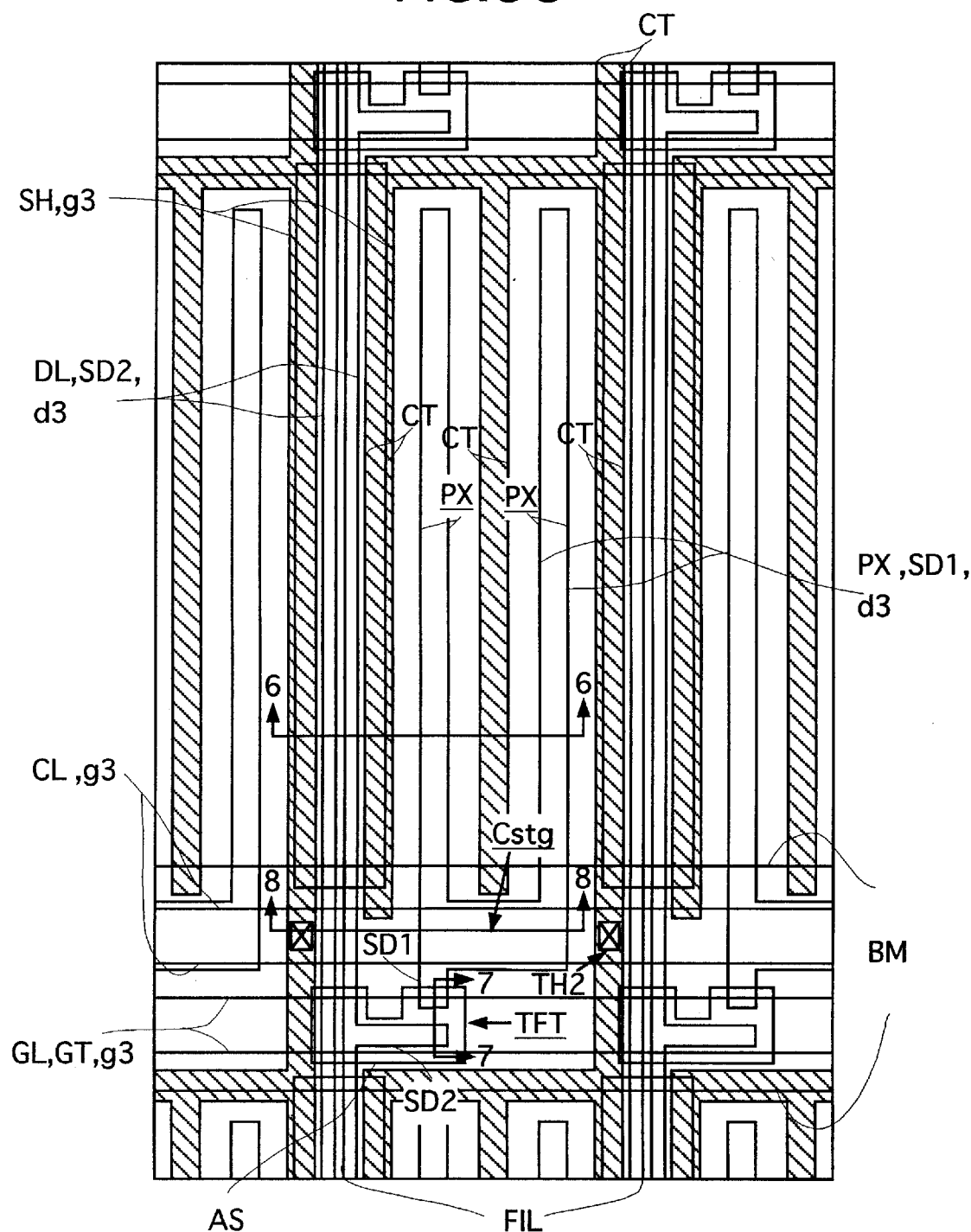
FIG. 38 is a main-part plan view showing one pixel along with its outlying part of a liquid crystal display section of an active-matrix color liquid crystal display device of an embodiment 8 of the present invention.

This embodiment is the same as the embodiment 7 except for the following points. A plan view of pixels is shown in FIG. 38. Hatched portions in the drawing designate a transparent conductive film il.

<<Pixel Electrode PX>>

In this embodiment the pixel electrode PX is constituted from a conductive film d3 that is in the same layer as the source electrode SD1 and drain electrode SD2. In addition, the pixel electrode PX is formed integrally with the source electrode SD1.

With this embodiment, in addition to the effects of embodiment 1, it is possible to avoid contact defects between the pixel electrode PX and source electrode SD1 although this comes at a sacrifice of the optical transmissivity. Another advantage is that since one of the electrodes is covered with the dielectric film (protective film PSV1), the possibility that a DC current flows in liquid crystals in the presence of alignment film defects decreases resulting in elimination of liquid crystal deterioration or the like, thus improving the reliability.

(Embodiment 9)

Figure 39:
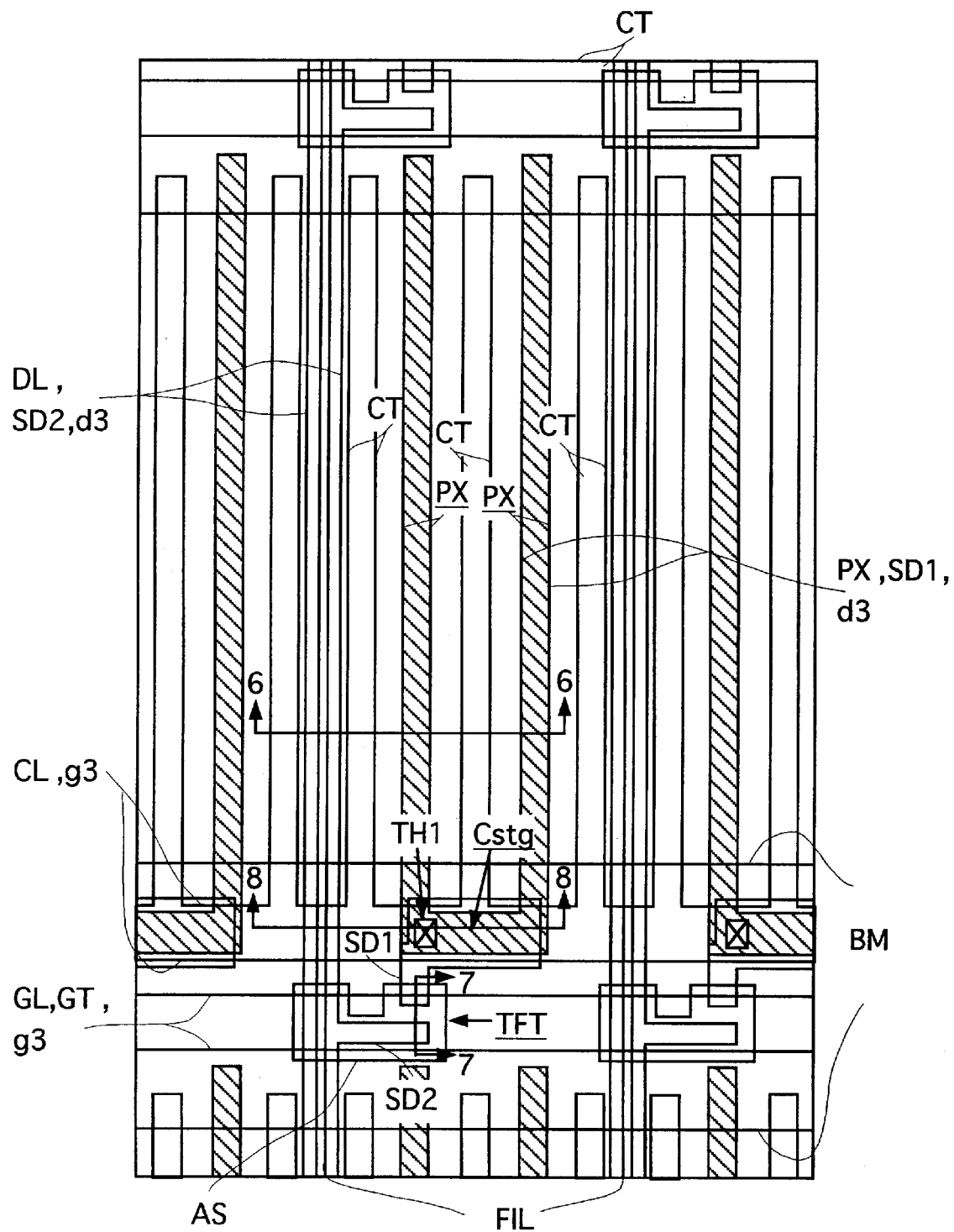
FIG. 39 is a main-part plan view showing one pixel along with its outlying part of a liquid crystal display section of an active-matrix color liquid crystal display device of an embodiment 9 of the present invention.

This embodiment is the same as the embodiment 7 except for the following points. A plan view of pixels is shown in FIG. 39. Hatched portions in the drawing indicate a transparent conductive film il.

<<Counter Electrode CT>>

In this embodiment the counter electrode CT is comprised of a conductive film g3 that is integral with the contra-voltage signal line CL.

With this embodiment, in addition to the effects of the embodiment 1, it is possible to avoid contact failures between the counter electrode CT and contra-voltage signal line CL although this does come at a sacrifice of the transmissivity. Another advantage is that since one of the electrodes is covered with the dielectric film (protective film PSV1), the possibility that a DC current flows in liquid crystals in the presence of alignment film defects decreases resulting in elimination of liquid crystal deterioration, thereby improving the reliability.

(Embodiment 10)

Figure 40:
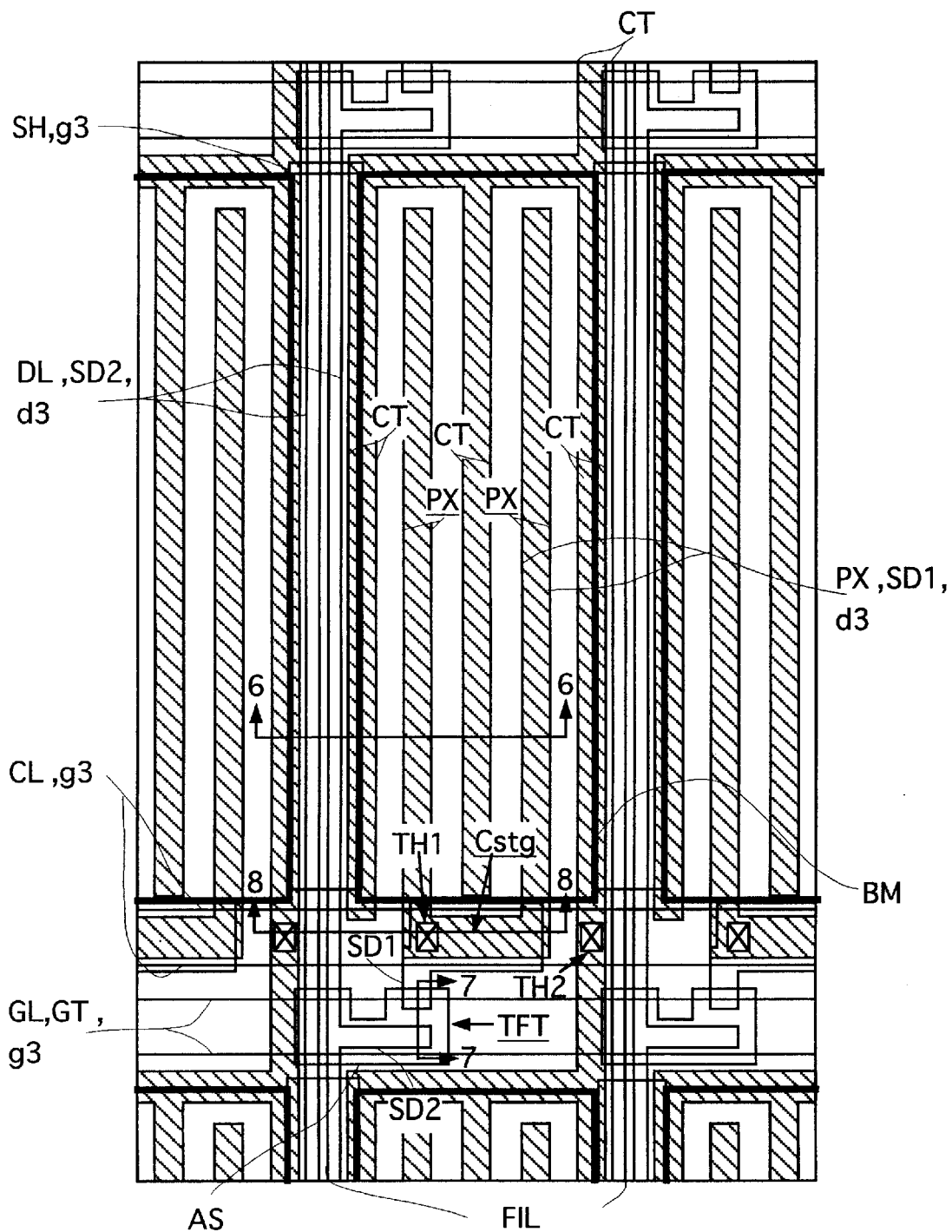
FIG. 40 is a main-part plan view showing one pixel along with its outlying part of a liquid crystal display section of an active-matrix color liquid crystal display device of an embodiment 10 of the present invention.

This embodiment is the same as the embodiment 7 except for the following points. A plan view of pixels is shown in FIG. 40. Hatched portions in the drawing indicate a transparent conductive film il.

<<Optical Shield Film BM>>

An optical shield film BM (so-called black matrix) is formed on the side of the upper transparent glass substrate SUB2 for preventing reduction of the contrast ratio or the like which otherwise occurs due to outward emission of transmission light from unnecessary gaps (gaps other than that between the pixel electrode PX and counter electrode CT) toward the display plane side. The optical shield film BM also functions to prevent rays of either external light or backlight from falling onto the i-type semiconductor layer AS. More specifically, the i-type semiconductor layer AS of the thin-film transistor TFT is sandwiched by the optical shield film BM and the gate electrode GT of larger size which are at the upper and lower locations to thereby eliminate hitting of externally incoming natural light and backlight rays.

The optical shield film BM shown in FIG. 40 is arranged to extend in the up/down-and-right/left directions over the thin-film transistor TFT while having a matrix-like shape with holes defined at openings. At certain portions at which the electric field direction is disturbed such as comb-shaped electrode ends, display at such portions is in one-to-one correspondence to image information within pixels so that black is obtained in the case of black and white is obtained for white; accordingly, such can be utilized as part of the display.

Another advantage of this embodiment is that unlike the embodiment 7, the optical shield film BM has a shielding ability against light rays, and is formed of a high-conductivity film to ensure that any electric field of/from image signal lines DL hardly affects the electric field between the pixel electrode PX and counter electrode CT—in this embodiment, it was comprised of a three-layered lamination structure consisting of chromium oxide ($CrO_x$) and chromium nitride (CrN), plus chromium (Cr), which structure is formed from the surface of the opposed substrate SUB1 to a thickness of about 0.2 $\mu$m. At this time the chromium oxide ($CrO_x$) is used to suppress reflection on the display plane. Additionally, the chromium (Cr) is provided at the uppermost layer of optical shield layer BM to permit external supply of a voltage to the optical shield film BM.

The optical shield film BM is linearly formed in the right/left direction with respect to those pixels in each row so that effective display regions at each row are partitioned by this line. Thus, the contour of each row pixel is made clear by the optical shield film BM. In other words, the optical shield film BM functions as a black matrix while simultaneously functioning to optically shield the i-type semiconductor layer AS.

The optical shield film BM is also formed at the periphery into a window frame-like shape, whose pattern is formed in a way continuous with the pattern of the matrix section shown in FIG. 25. The optical shield film BM at the periphery is extended to outside of a seal section SL thereby preventing leakage light, such as reflection light due to practical mount equipment, such as personal computers, from entering the matrix section, while at the same time preventing the light such as backlight from leaking toward the outside of the display area. On the other hand, this optical shield film BM is limited in location so that it resides within an inside area smaller by about 0.3 to 1.0 mm than the edge of the substrate SUB2, and also is formed excluding cutaway regions of the substrate SUB2.

<<Overcoat Film OC>>

Same as Embodiment 1. Note however that one or more through-holes may be formed to enable a voltage potential to be given to the optical shield film BM. It is preferable that as the voltage potential, connection be effected to the contra-voltage Vc.

An advantage of this embodiment is that in addition to the effects of the embodiment 7, letting the optical shield film BM shield any influence of electric fields from image signal lines DL prevents an electric field, from being affected between the pixel electrode PX and counter electrode CT. This eliminates crosstalk with image signal lines DL, which in turn enables avoidance of comet-tail-like blurred on-screen image quality defects (smear). Additionally, it is also possible to downsize the region for optical shielding by the light shield layer SH and the transparent counter electrodes CT as disposed on the opposite sides of an image signal line DL, which in turn enables achievement of higher transmissivity.

(Embodiment 11)

Figure 43A:
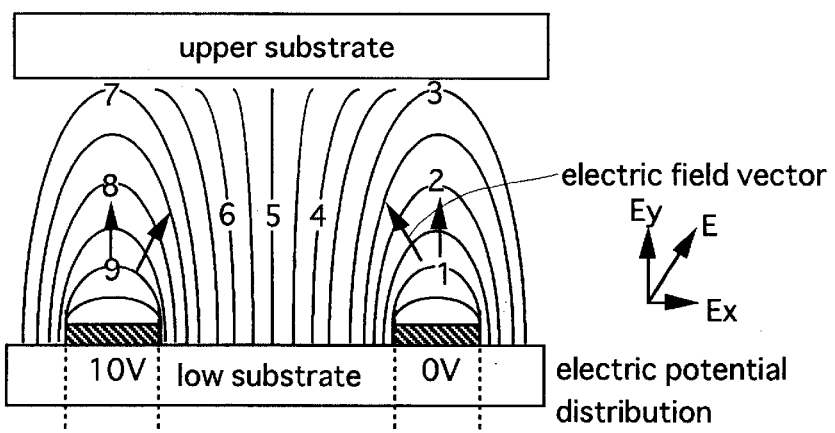
Figure 43B:
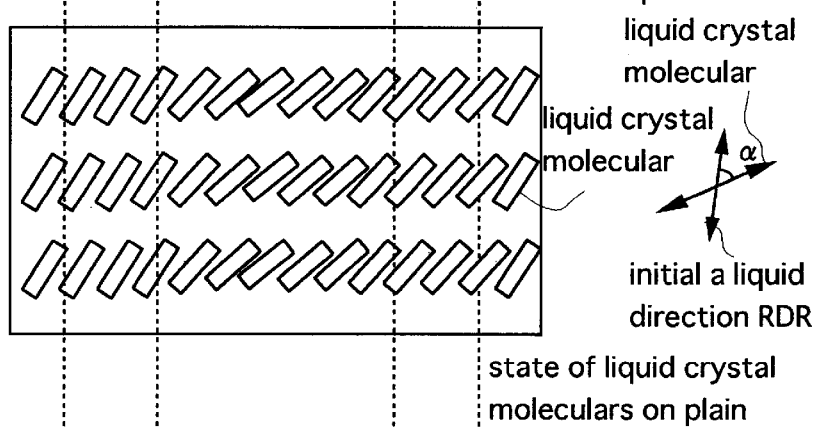
Figure 43C:
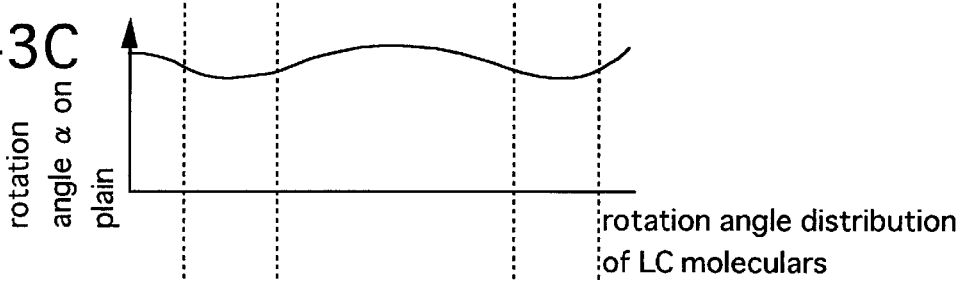
Figure 43D:
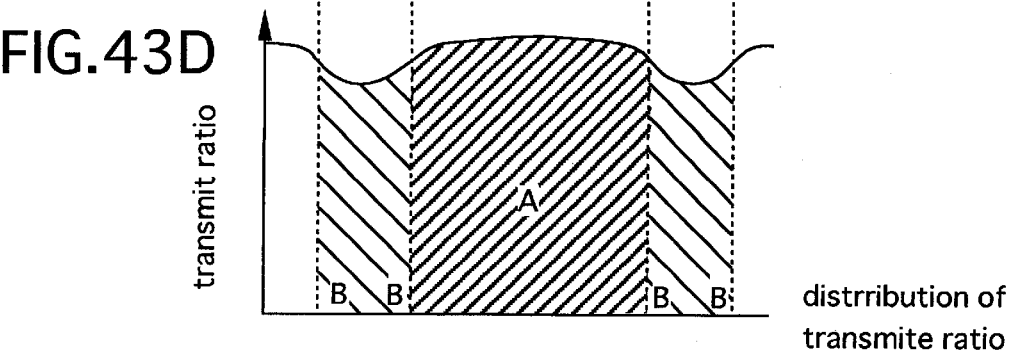
Figure 44:
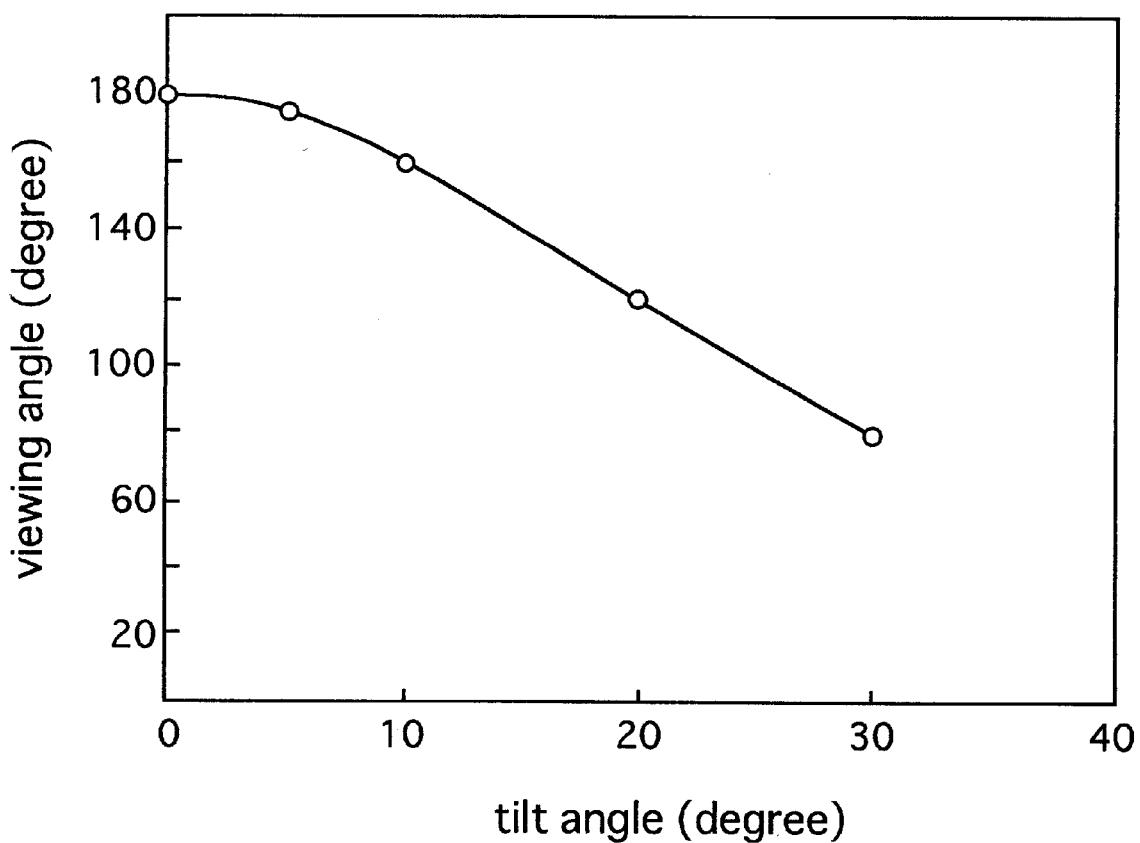
FIG. 44 is a characteristic diagram of a simulation result showing a tilt angle of liquid crystal molecules within a liquid crystal layer along with a viewing angle region which becomes greater than or equal to 10 in contrast ratio with respect to all directions in a liquid crystal display device of the lateral electric field type.

FIGS. 43A to 43D are diagrams showing principles relating to aperture ratio improvement of an active-matrix color liquid crystal display device in accordance with this embodiment, wherein FIG. 43A is a characteristic diagram showing a potential distribution inside of a liquid crystal layer upon application of a voltage to the electrodes, FIG. 43B is a diagram showing a realignment state of liquid crystal molecules near or around the center of the liquid crystal layer, FIG. 43C is a characteristic diagram showing a rotation angle α of liquid crystal molecules shown in FIG. 43B, and FIG. 43D is one example of a characteristic diagram showing a distribution of transmissivity of light passing through the upper/lower polarizer plates and upper/lower substrates plus a liquid crystal layer on electrodes and between electrodes.

Here, the same as the embodiment 7 are provided except for the points which follow.

In this embodiment, approximately $2 \times 10^{-12}$ N (Newton) was used as the twist elastic modulus K2 of the liquid crystal layer.

Figure 41A:
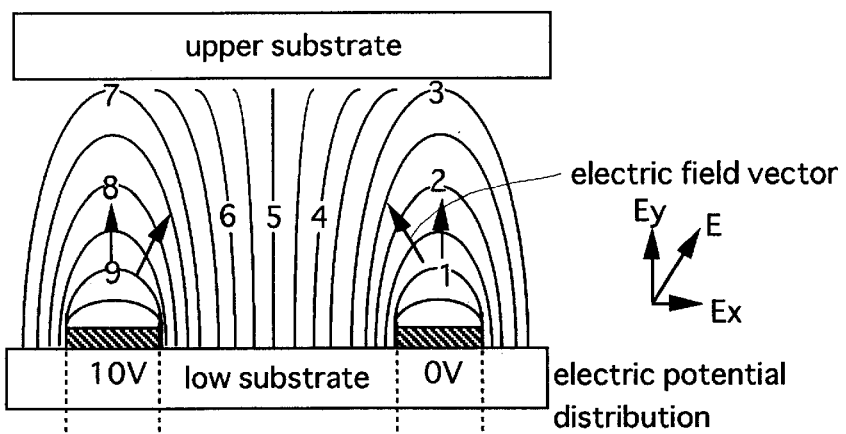
Figure 41B:
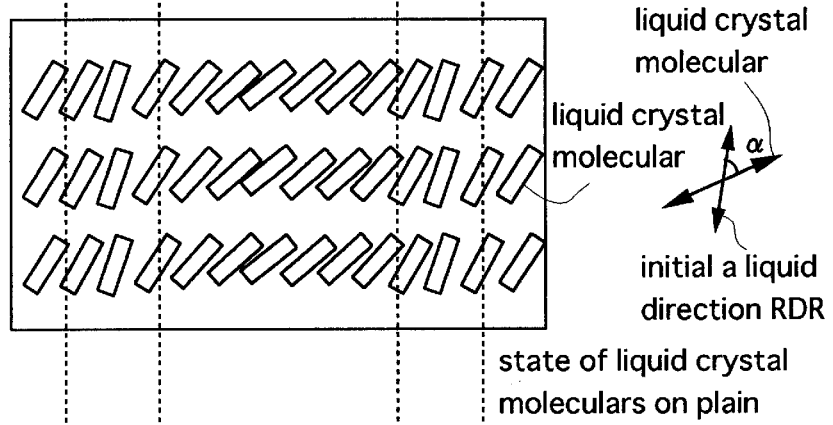
Figure 41C:
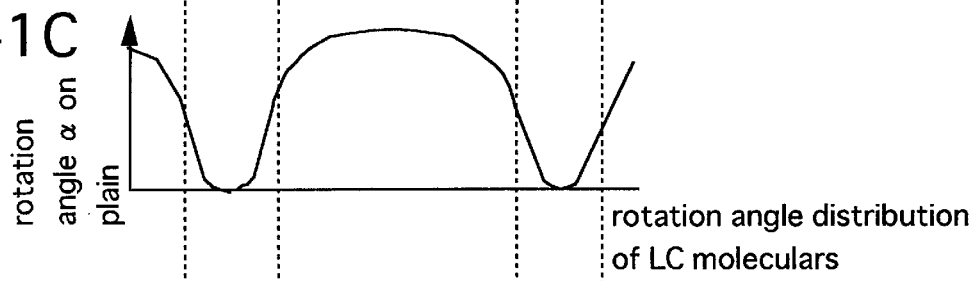
Figure 41D:
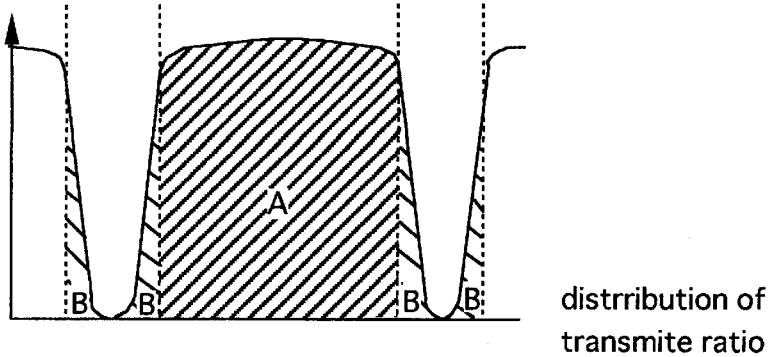
Figure 42A:
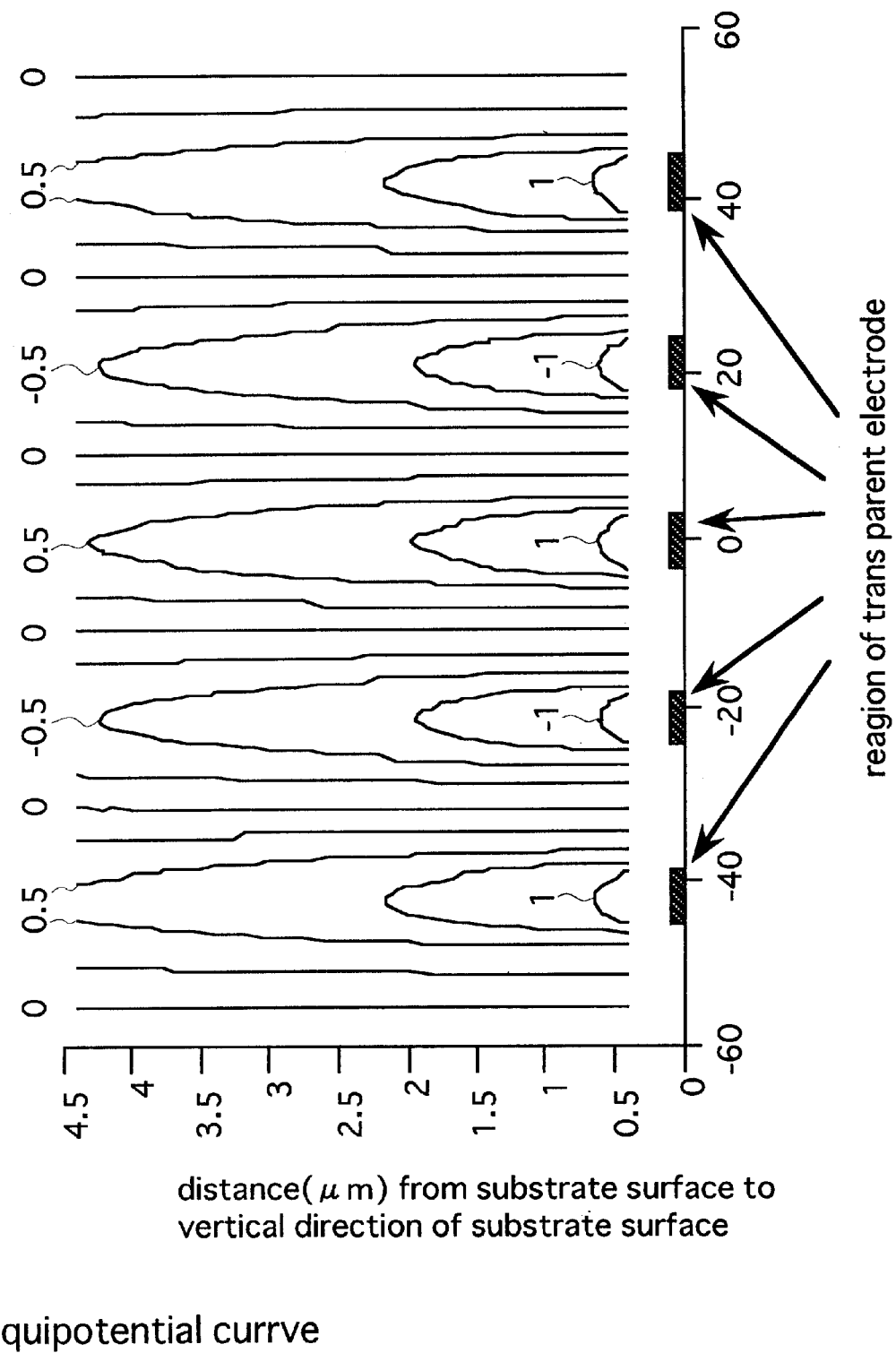
Figure 42B:
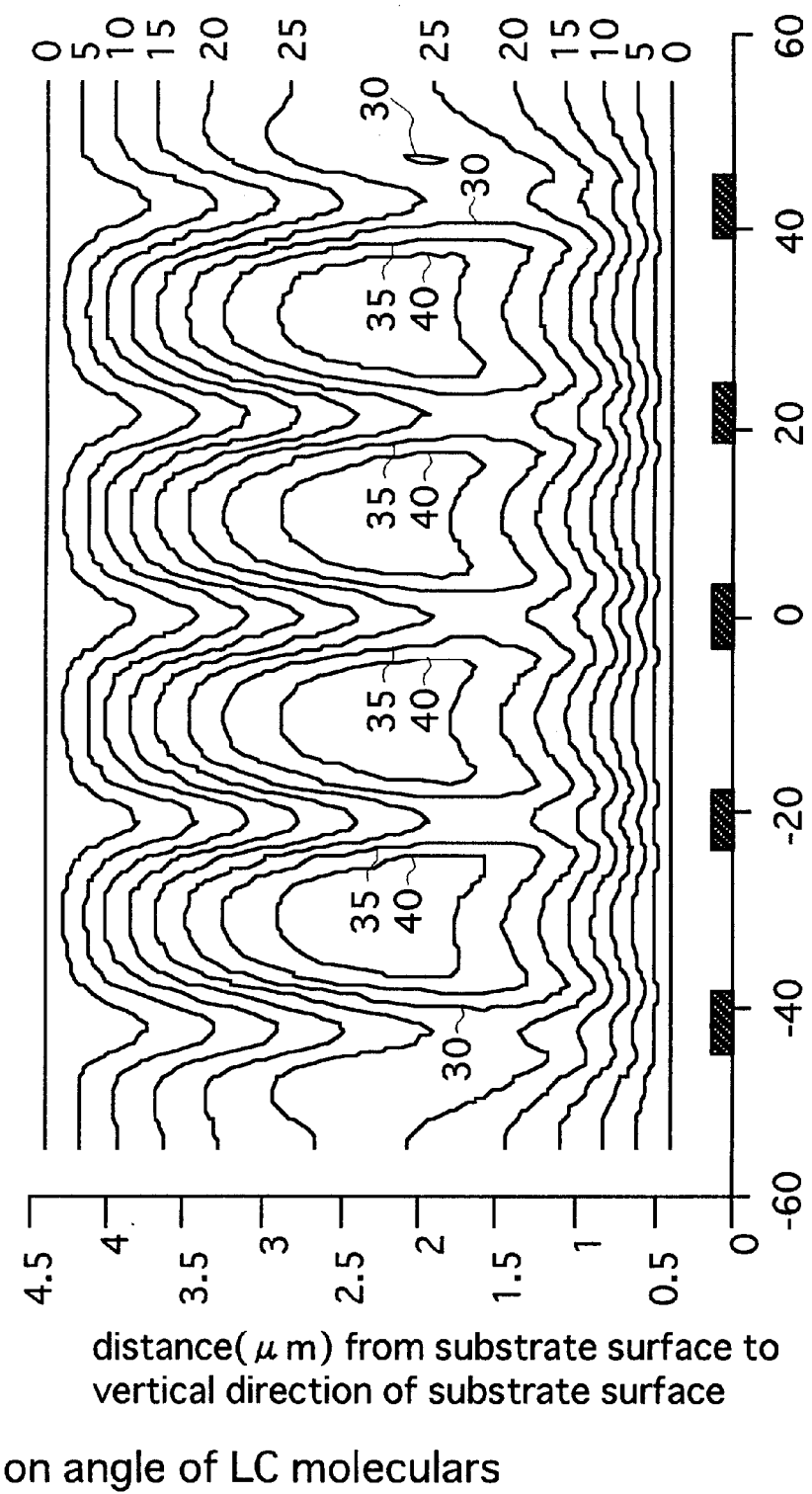
FIG. 42B and FIG. 42C show one example of the rotation angle α of liquid crystal molecules within a liquid crystal layer upon application of an electric field thereto along with the tilt (rise-up) angle thereof.
Figure 42C:
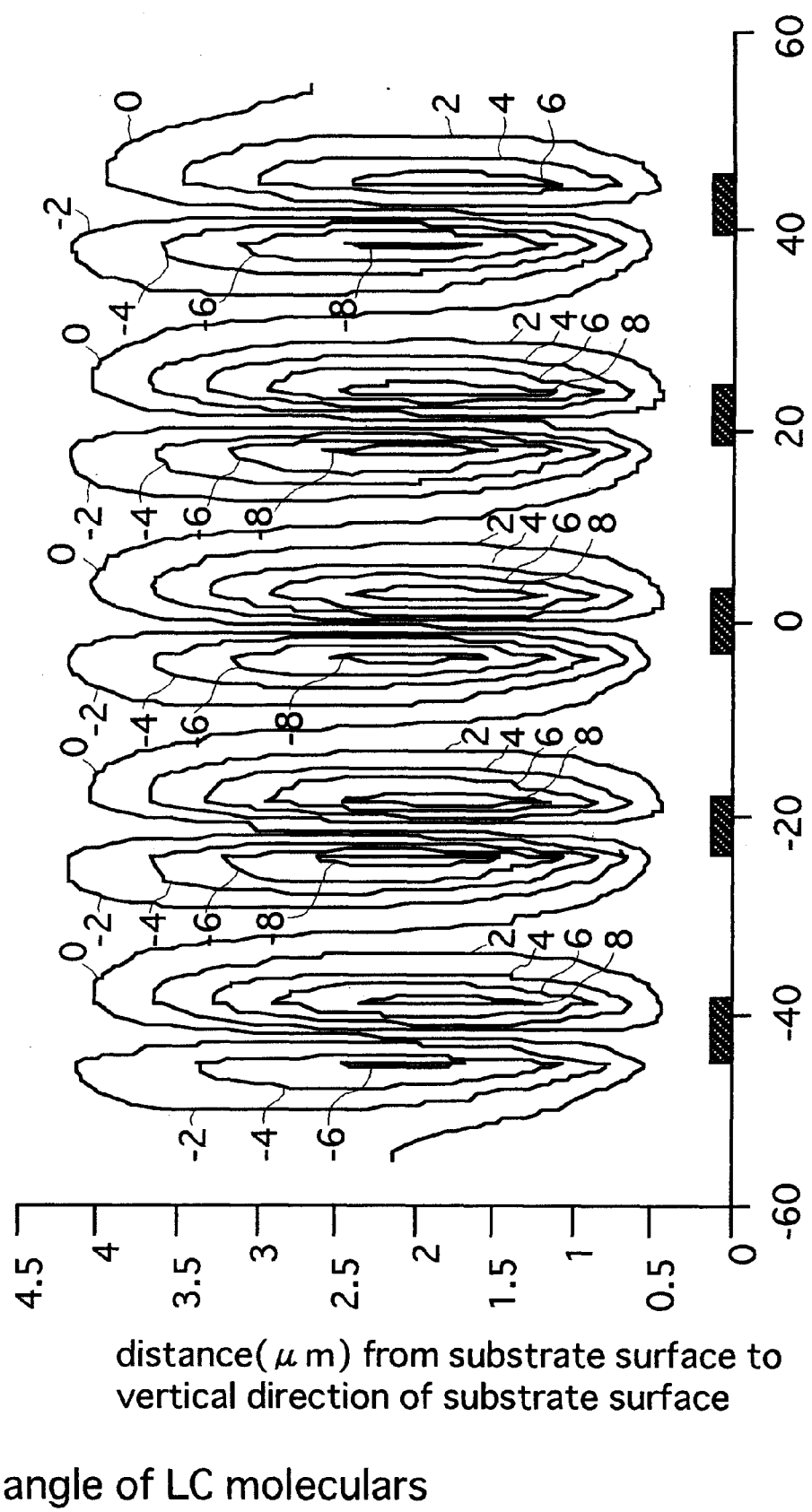

When such a relatively large value of for example $10 \times 10^{-12}$ N (Newton) is used as the twist elastic modulus K2, almost all of the liquid crystal molecules at the center over electrodes are kept at zero in rotation angle α as shown in FIG. 41B, resulting in the transmissivity at the center over such electrodes approximating a value of a dark display.

On the other hand, it has been found that in this embodiment the liquid crystal molecules at the center over electrodes also attempt to rotate causing more than 50% of the average transmissivity of the transmissivity of a portion "A" between electrodes to become the average-value transmissivity of the transmissivity at a portion "B" over electrodes.

Consequently, the average transmissivity as a whole becomes the average-value transmissivity of the transmissivities at the portions A+B, which is significantly increased.

As has been described above, the present invention is applicable to devices which employ liquid crystals and offers practical utility in the liquid crystal device manufacturing industry.

What is claimed is:

1. An active matrix liquid crystal display device having a pixel electrode and a counter electrode for generating an electric field component extending approximately parallel to a substrate surface between said pixel electrode and said counter electrode to control twistable liquid crystal molecules of a liquid crystal layer to thereby generate a display, characterized in that at least one of the pixel electrode and the counter electrode is a transparent electrode, that an initial alignment state of said twistable liquid crystal layer and a polarization axis of a polarizer plate are arranged to let said display device increase in optical transmissivity with an increase in said electric field component, and that the average tilt angle of liquid crystal molecules on or over the transparent electrode of said twistable liquid crystal layer is less than or equal to 10 degrees even upon application of an electric field.

* * * * *